US012713204B2

(12) United States Patent
Loda

(10) Patent No.: US 12,713,204 B2
(45) Date of Patent: Aug. 18, 2026

(54) DIGITAL ASSET LOCATION SYSTEM

(71) Applicant: Oshkosh Corporation

(72) Inventor: David C. Loda, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 293 days.

(21) Appl. No.: 18/232,049

(22) Filed: Aug. 9, 2023

(65) Prior Publication Data

US 2024/0056772 A1 Feb. 15, 2024

Related U.S. Application Data

(60) Provisional application No. 63/396,807, filed on Aug. 10, 2022.

(51) Int. Cl.
*H04W 4/029* (2018.01)
*H04B 17/318* (2015.01)
*H04W 4/38* (2018.01)

(52) U.S. Cl.
CPC .......... *H04W 4/029* (2018.02); *H04B 17/318* (2015.01); *H04W 4/38* (2018.02)

(58) Field of Classification Search
CPC ....... H04W 4/029; H04W 4/38; H04W 4/024; H04B 17/318; H04B 17/27; H04B 17/3913
USPC ........................................................ 455/456.1
See application file for complete search history.

(56) References Cited

U.S. PATENT DOCUMENTS 9,613,233 B1 * 4/2017 Landon ................ G06Q 10/087
9,938,693 B1 4/2018 Reed et al.
10,059,003 B1 8/2018 Linnell et al.
2004/0024644 A1 * 2/2004 Gui ...................... G06Q 20/203 705/28
2009/0119001 A1 * 5/2009 Moussaeiff ...... G08G 1/096838 707/E17.014
2012/0320204 A1 * 12/2012 Dahlin ............... G08G 1/09623 348/148
2014/0209676 A1 * 7/2014 Reynolds ................ B60R 99/00 235/385
2017/0256289 A1 9/2017 Smith
2018/0249298 A1 * 8/2018 Jain ......................... G06V 20/36
2019/0020862 A1 1/2019 Kim
(Continued)

*Primary Examiner* — Don N Vo
(74) *Attorney, Agent, or Firm* — Foley & Lardner LLP

(57) ABSTRACT

A system and method for ubiquitous global asset management is disclosed. This is comprised of a centralized, remotely accessible computer application displaying current, past, and predicting future geolocation of wirelessly tagged assets such as tools, components, finished goods, etc., throughout an organization's digital ecosystem. It integrates geolocation technologies to determine 3D positioning information of assets such as indoor BLE, outdoor LoRa WAN, private cellular networks and other wireless technologies. Geopositioned data is published to a centralized data pool for consumption by other applications. Usage includes indoor such as a factory or warehouse as well as outdoor supply depots, staging areas, supplier locations and enroute. The system also identifies geolocations in 3D using a smart device without tagging, such as a fixed asset location. Assets can be found using any system connected device. This provides an organization with ubiquitous tracking and asset migration patterns to optimize manufacturing and supply chain operations.

9 Claims, 52 Drawing Sheets

(56) References Cited

U.S. PATENT DOCUMENTS

| | | | | |
|---|---|---|---|---|
| 2021/0320731 | A1* | 10/2021 | Babu ..................... | H04W 4/029 |
| 2021/0374633 | A1 | 12/2021 | Alayamani et al. | |
| 2025/0392882 | A1 | 12/2025 | Sweeney | |

* cited by examiner

THIS PAGE SHOWS AN OVERVIEW OF THE HEALTH OF THE INSTALLED SIRL SYSTEM AT THE SPECIFIC LOCATION, INCLUDING WHICH GATEWAYS AND SATELLITE NODES ARE WORKING PROPERLY, AND WHICH ONES ARE DOWN.

3600

3602 Connect to a sensor network configured to detect tagged assets and smart devices 3604 Receive a selection of one or more assets from a first smart device 3606 Receive a selection of a time period via the first smart device 3608 Generate a heatmap representing the locations of the one or more assets within the time period AZURE GOV CLOUD
IOT HUB
SERVICE BUS
SIRL APPLICATION
AZURE DATABASE POSTGRESQL SERVER
AZURE BLOB
MANAGEMENT PORTAL
EXPRESSROUTE
SSID:
EXTERNAL
SIRL SMART DEVICE
CONNECTIONLESS BLE
HTTPS 443
MQTTS 8883
SIRL GATEWAY
SIRL SATELLITE
BLE TAGS

EXTERNAL

SSID:

1

BLE TAGS

2

CONNECTIONLESS BLE

SIRL SATELLITE

3

SIRL GATEWAY

4

SIRL SMART DEVICE

HTTPS 443

MQTTS 8883

EXPRESSROUTE

AZURE GOV CLOUD

11

HUB SUBSCRIPTION VNET PALO ALTO

5

IOT HUB

6

SERVICE BUS

7

SIRL APPLICATION

8

AZURE DATABASE POSTGRESQL SERVER

9

AZURE BLOB

10

MANAGEMENT PORTAL

DIGITAL ASSET LOCATION SYSTEM

CROSS-REFERENCE TO RELATED PATENT APPLICATION

This application claims the benefit of and priority to U.S. Provisional Patent Application No. 63/396,807, filed on Aug. 10, 2022, the entirety of which is hereby incorporated by reference herein.

BACKGROUND

Work equipment such as lifts and telehandlers, as well as smaller devices including generators, power tools, and unpowered implements sometimes require tracking, tasking, monitoring, and servicing at a manufacturing facility or work site. Tracking the locations of finished products, components, subassemblies, specialized tooling, and the like can improve the efficiency of manufacturing and other operations. Managers and workers typically rely on memory, work instructions, discrete systems, applications, and methods to perform these functions for each asset or piece of equipment. Additionally, the distribution of tools, assets, and equipment, as well as the location of individuals who need to use said equipment in the workplace, is in a constant state of flux, resulting in significant loss of efficiency as much time is wasted searching for the appropriate items.

SUMMARY

The digital asset location system consists of a localized sensor constellation of radio frequency-driven, short-range, indoor satellite nodes which can also be integrated with outdoor technologies such as LoRa WAN, GPS, etc., that create a three-dimensional sensor grid both in and around a manufacturing or warehouse facility. This architecture can then detect and track the precise location of any item tagged with an electronic device including but not limited to one-way or two-way wireless tags or nodes, computing devices such as smartphones, tablets, vehicle telematics devices, factory AGV (Autonomous Guided Vehicle) guidance systems, etc., which can receive, process, and retransmit positioning information to the overall system on a repeating basis. Other electronic positioning means such as video or infrared imaging may also be integrated into the system for secondary positioning information or confirmation as required. A networked system of servers and wireless and/or wired components operating on-premises, in a cloud environment in multiple locations, or a combination of both for redundancy provides the capability of integrating software tools to process, aggregate, and display geospatial information collected by the system relevant to asset behavior across space and time to provide management insights to optimize manufacturing, supply chain, and other organizational operations. The system may also utilize three-dimensional coordinates as enabled by a smart device connected to the system by geo-addressing any desired location, such as a predetermined positioning of an asset in an industrial yard or on a shelving unit, without the use of a tag. Additionally, the system can be integrated into a facility monitoring and alerting system to notify, dispatch, and guide personnel or equipment such as an AGV to any specified location to inspect and perform maintenance, coming pre-equipped with the correct tools and parts. Geofencing may then be used to trigger contextual work instructions or videos based on the location of the inspector or maintainer. The result is a four-dimensional Digital Ecosystem asset positioning system capable of tracking any item in real-time, recording past locations, and leveraging artificial intelligence to predict and map future movements and behavior patterns to enable management intervention should the predicted movements not be desirable. Analyzing and understanding past and present movement patterns of assets and predicting future movements of these assets can improve workflows and processes in these environments.

One exemplary embodiment relates to a method of locating an asset on a worksite. The method includes connecting to a sensor network including a plurality of sensors, each configured to detect radio frequency signals from assets and smart devices. The method further includes receiving, from a first smart device, a selection of a first asset, identifying a location of the first asset, determining the location of the first smart device based on signals detected from the first smart device by a first subset of the plurality of sensors, and providing, to the first smart device, directions from the first smart device to the first asset.

Another exemplary embodiment relates to a system for locating an asset on a worksite. The system includes a sensor network comprising a plurality of sensors, each configured to detect radio frequency signals from assets and smart devices, and a first smart device. The system further includes at least one processor communicatively coupled to the first smart device and the sensor network and configured to receive, from the first smart device, a selection of a first asset, identify a location of the first asset, determine the location of the first smart device based on signals detected from the first smart device by a first subset of the plurality of sensors, and provide, to the first smart device, directions from the first smart device to the first asset.

Another exemplary embodiment relates to a method of moving an asset on a worksite. The method includes connecting to a sensor network including a plurality of sensors, each configured to detect radio frequency signals from assets and smart devices. The method further includes receiving, from a first smart device, a selection of a first asset, determining a location to which the first asset is to be moved, determining a location of the first smart device based on signals detected from the first smart device by the plurality of sensors; and providing directions from the first smart device to the location to which the first asset is to be moved. The directions can be optimized based on a dynamically changing environment.

Another exemplary embodiment relates to a method of receiving location-based work instructions on a worksite. The method includes connecting to a sensor network comprising a plurality of sensors, each configured to detect radio frequency signals from smart devices. The method further includes receiving, from a first smart device, a selection of a first asset, determining the location of the first smart device based on signals detected from the first smart device by the plurality of sensors, and providing work instructions based on the selected first asset and the determined location of the first smart device.

Another exemplary embodiment relates to a method of generating an asset tracking heatmap. The method includes connecting to a sensor network comprising a plurality of sensors, each configured to detect radio frequency signals from detect radio frequency signals from assets and smart devices. The method further includes receiving, from a first smart device, a selection of one or more assets, receiving, from a first smart device, a selection of a time period, and generating a heatmap representing the locations of the one or more assets within the time period.

Another exemplary embodiment relates to a method of leveraging learning algorithms, automated scripts, advanced analytics, artificial intelligence and or other techniques in order to enhance the integration and conversion of data from a variety of sources into human readable information to enable improved decision support. This may include the use of overhead imagery. For example, an airborne camera on a drone may be periodically flown above the factory or storage yard, or cameras inside or outside a factory or warehouse storage area may capture the layout of the worksite. The asset tracking information may be overlaid on the imagery to enhance the geolocation of inventory on a near real-time basis.

Another exemplary embodiment relates to a tracking tag assembly including a housing with a first housing portion coupled to a second housing portion. The first housing portion and the second housing portion form a cavity, a main channel configured to receive an elongated portion of a tool, and at least one cable tie channel extending around the main channel and configured to receive a cable tie. The tracking tag assembly further includes a radio frequency tracking tag positioned in the cavity.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
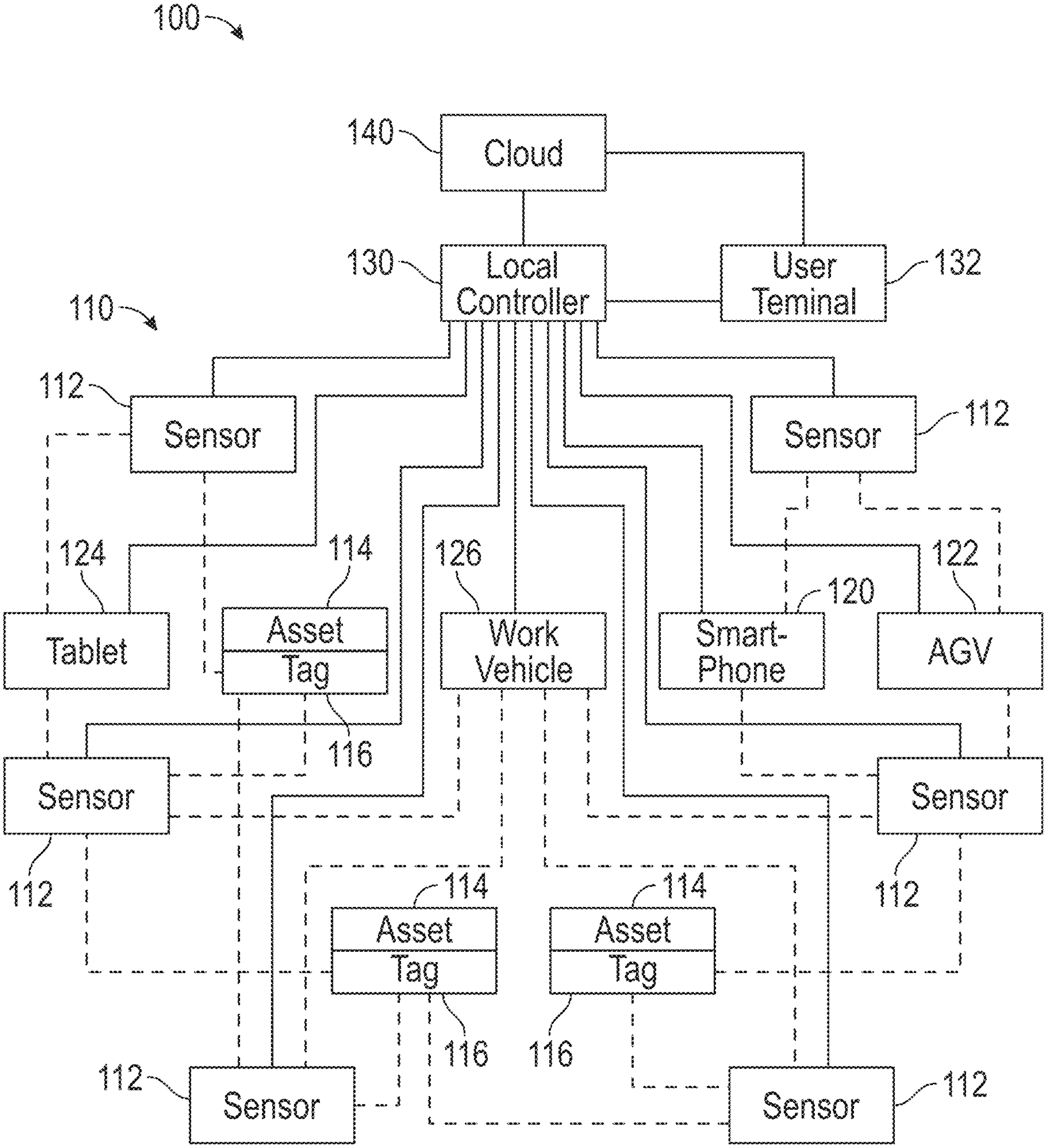
FIG. 1 is a schematic representation of an asset management system, according to some embodiments.

Industrial assets can often be difficult to find and keep track of on large worksites. It is therefore desirable to provide a means to electronically track assets on a work site and integrate, tasking, monitoring, and service support functions on a common platform to improve efficiency and reduce costs.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

One exemplary implementation of the present disclosure relates to system and methods for tracking and managing the geolocation of tagged or untagged industrial assets such as parts, tooling, components, assemblies, products, or vehicles using various wireless tracking technologies. Asset management dashboards and tools are provided on a unified on-premises or cloud-based information technology portal architecture. A digital ecosystem for an asset positioning system is provided, which is capable of tracking any item in real-time, recording past locations, and leveraging artificial intelligence to predict future movements and behavior patterns.

The asset location system consists of a localized array of low and medium-range radio-frequency (RF) sensor nodes (e.g., satellite nodes) that create a three-dimensional (3D) sensor grid both in and around a manufacturing facility, warehouse facility, or jobsite. The sensor nodes may additionally be integrated with outdoor communications technologies such as LoRa (e.g., long-range radio communications), GPS (Global Positioning System), UWB (Ultra-wideband), and/or WAN (wide area network). The sensor array can detect the precise location of any item tagged with an electronic device, including but not limited to one-way or two-way wireless tags or nodes, computing devices such as smart phones and tablets, vehicle telematics devices, and AGV (automatic guided vehicle) guidance systems. The sensor array can receive, process, and retransmit positioning information to an asset management system on a repeating basis. Other electronic positioning means, such as optical or infrared image processing, may also be integrated into the system for secondary positioning information or confirmation. The asset management system may include a networked system of servers and wireless and/or wired components operating on-premises, in the cloud, or a combination of both for redundancy. The asset management system includes software tools to process, aggregate, and display geospatial information collected by the system relevant to asset behavior and migration patterns across space and time to provide management insights to optimize manufacturing, supply chain and other organizational operations.

The asset management system may also communicate with smart devices, such as smartphones and tablets, to detect the location of the smart device and provide location and/or camera snapshot visual information to the smart device. For example, the asset management system may receive information about an asset via the smart device and may provide coordinates or directions to a location to which the asset is to be moved, even if the asset does not include a tracking tag and is not otherwise connected to the system. Additionally, the system can be integrated into a facility monitoring and alerting system to notify, dispatch, and guide personnel or equipment such as an AGV to any specified location to inspect and perform maintenance. Geofencing may also be used to trigger the provision of contextual work instructions or videos to the smart device based on the location of the inspector or maintainer.

Referring now to FIG. 1, an asset management system 100 is shown, according to some embodiments. The asset management system 100 includes an asset location system 110 including an array of asset sensors 112 (e.g., nodes, sensor nodes, etc.). The sensors 112 are each configured to detect signals from assets on a work site, such as a factory, warehouse, or construction site. For example, the sensors 112 may detect tracking tags 116 coupled to various assets 114, such as hand tools, workpieces, vehicles, user devices, or any other object to which a tracking tag may be coupled. Each tracking tag 116 emits a signal, such as a radio-frequency identification (RFID) signal or Bluetooth Low Energy (BLE) signal, which can be detected by the sensors 112. The sensors 112 may detect a strength (e.g., may determine a received signal strength indicator or RSSI) of the signal from the tracking tag 116, which can be used to determine the distance from the tracking tag to the sensors 112. When multiple sensors 112 detect a tracking tag 116, the locations of the sensors 112 and the determined distance from each sensor 112 to the tracking tag 116 may be used to determine the specific location of the tracking tag 116, thereby determining the location of the asset 114. The sensors 112 may also detect other assets that include integrated transmitters and therefore do not require a tracking tag 116. For example, the sensors may be able to detect smartphones 120, AGVs 122, tablets 124, and work vehicles 126. Tracking tags 116 may also be used to track employees or other people on a job site. For example, an employee name badge may include a tracking tag 116 such that the employee's movements can be tracked across a jobsite so that the employee can be located quickly and analysis can be performed to assess productivity.

The sensors 112 may be communicatively coupled to a local controller 130 and/or the cloud 140 (e.g., an offsite computing and server system). In some embodiments, the sensors 112 may communicate with the local controller 130, which in turn may communicate with the cloud 140. In some embodiments, the sensors may transmit sensor data to gateways, which relay the data to the local controller 130 and/or the cloud 140. A user may access system information and perform control functions via a user terminal 132. The local controller may be configured to perform processing functions including determining the locations of assets based on data from the sensors. The local controller 130 and/or the cloud 140 may communicate directly with smart assets (e.g., smartphones 120, AGVs 122, tablets 124, work vehicles 126, etc.) that can connect to the asset management system, for example, via Wi-Fi or a cellular connection. Thus, the local controller 130 can receive data from the sensors 112, determine the locations of various assets, and relay the send the locations to, for example, a smartphone 120 or a tablet 124. A user on the job site can then locate the asset using the smart device. In some embodiments, the system 100 may not include a wired user terminal 132, and users may perform control functions via smart devices such as a smartphone 120 or tablet 124 by wirelessly connecting to the local controller. In some embodiments, the system 100 may not include a local controller 130, and processing functions may be performed on the smartphone 120 or tablet 124 rather than the local controller 130. For example, the smartphone 120, may receive data from the sensors 112 (e.g., via a Wi-Fi router) and the smartphone 120 may be configured (e.g., via software installed on the smartphone 120) to determine the locations of the assets 114 and display the results on the display screen.

In some embodiments, the local controller 130, the sensors 112, and/or the smart devices may include machine or computer-readable media that is executable by a processor to perform the functions of the asset management system 100. As described herein and amongst other uses, the machine-readable media facilitate performance of certain operations to enable reception and transmission of data. For example, the machine-readable media on the local controller 130 may provide an instruction (e.g., command, etc.) to, e.g., acquire data from the sensors 112. In this regard, the machine-readable media may include programmable logic that defines the frequency of acquisition of the data (or, transmission of the data). The computer-readable media may include code, which may be written in any programming language including, but not limited to, Java or the like and any conventional procedural programming languages, such as the "C" programming language or similar programming languages. The computer-readable program code may be executed on one or more processors, local and/or remote. Remote processors may be connected to each other through any type of network (e.g., CAN bus, etc.).

In some embodiments, the local controller 130 may be embodied as hardware units, such as electronic control units. As such, the local controller 130 may be embodied as one or more circuitry components including, but not limited to, processing circuitry, network interfaces, peripheral devices, input devices, output devices, sensors, etc. In some embodiments, the local controller 130 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the local controller 130 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The local controller 130 may also include programmable hardware devices such as field programmable gate arrays, programmable array logic, programmable logic devices or the like. The local controller 130 may include one or more memory devices for storing instructions that are executable by the processor(s) of the local controller 130. In some hardware unit configurations, the local controller 130 may be geographically dispersed throughout separate locations in various hardware components. Alternatively, the local controller 130 may be embodied in or within a single unit or housing.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the local controller 130 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory devices (e.g., memory, memory unit, storage device) used to store instructions for the local controller 130, sensors 112, and/or smart devices may include one or more devices (e.g., RAM, ROM, Flash memory, hard disk storage) for storing data and/or computer code for completing or facilitating the various processes, layers, and modules described in the present disclosure. The memory device may be communicably connected to the processor to provide computer code or instructions to the processor for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

Figure 2:
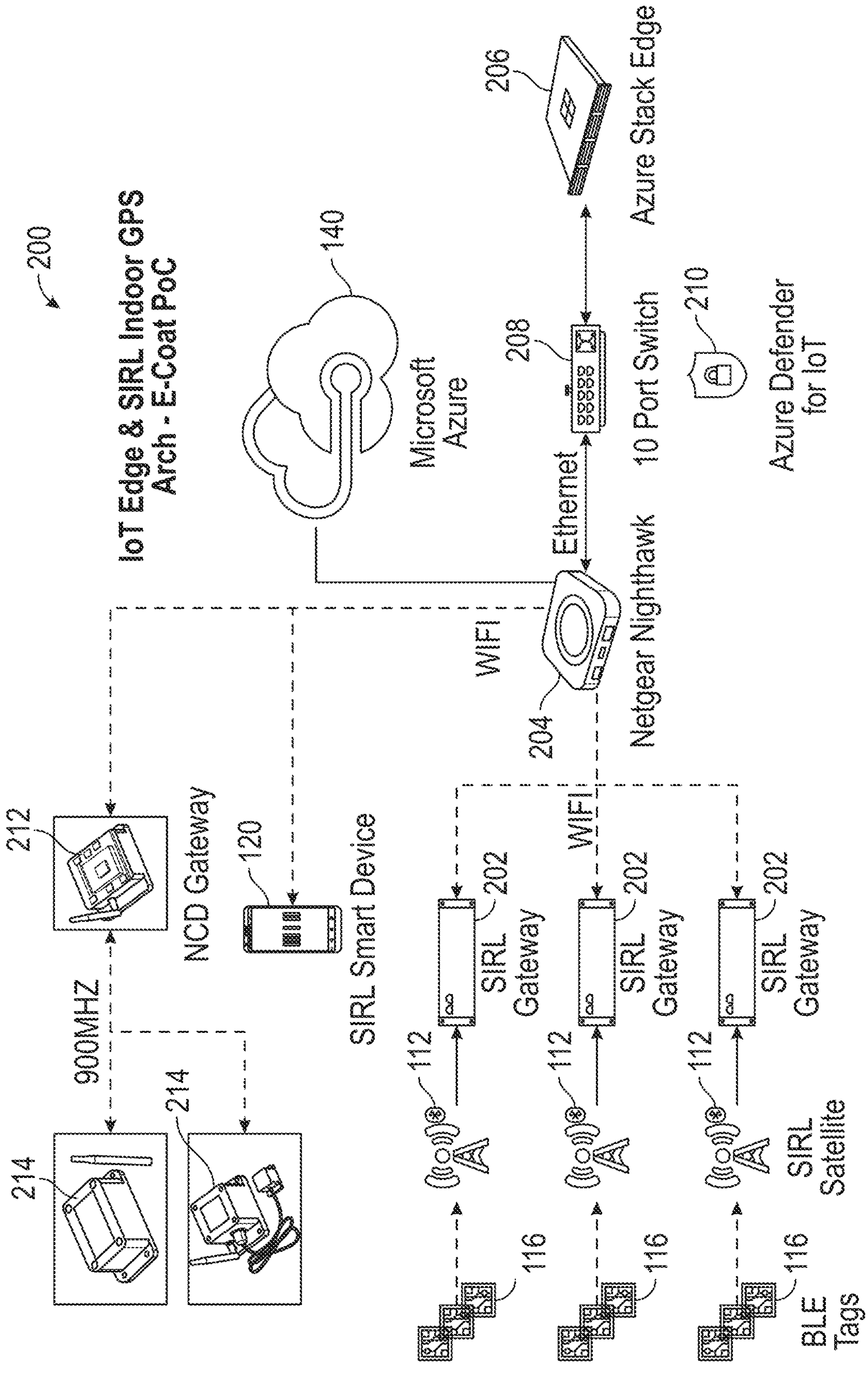
FIG. 2 is a schematic representation of an asset management system, according to some embodiments.

Referring now to FIG. 2, another asset management system 200 (e.g., similar to asset management system 100) is shown, according to some embodiments. Similar to the system 100, the asset management system 200 includes an array of sensors 112 for detecting tracking tags 116 or other radio communication-enabled devices. The system 200 includes several gateways 202 to which the sensors 112 transmit sensor data. Each gateway 202 may be coupled to any number of sensors 112. The gateways 202 are communicatively coupled to a Wi-Fi router 204. The Wi-Fi router 204 may be further communicatively coupled to the cloud 140 (e.g., a cloud computing service such as Microsoft Azure) as well as a local cloud storage gateway 206 (e.g., a Microsoft Azure Stack Edge) that enables redundant local storage and transmission of data to the cloud 140. The Wi-Fi router 204 may be coupled to the local cloud storage gateway 206 via a switch 208 enabled with anti-malware software 210. The Wi-Fi router 204 may also be coupled to a long-range IoT gateway 212. The IoT gateway 212 may communicate with and receive signals from off-site IoT sensors 214. The Wi-Fi router 204 may also be coupled to smart devices such as smartphone 120.

Figure 3:
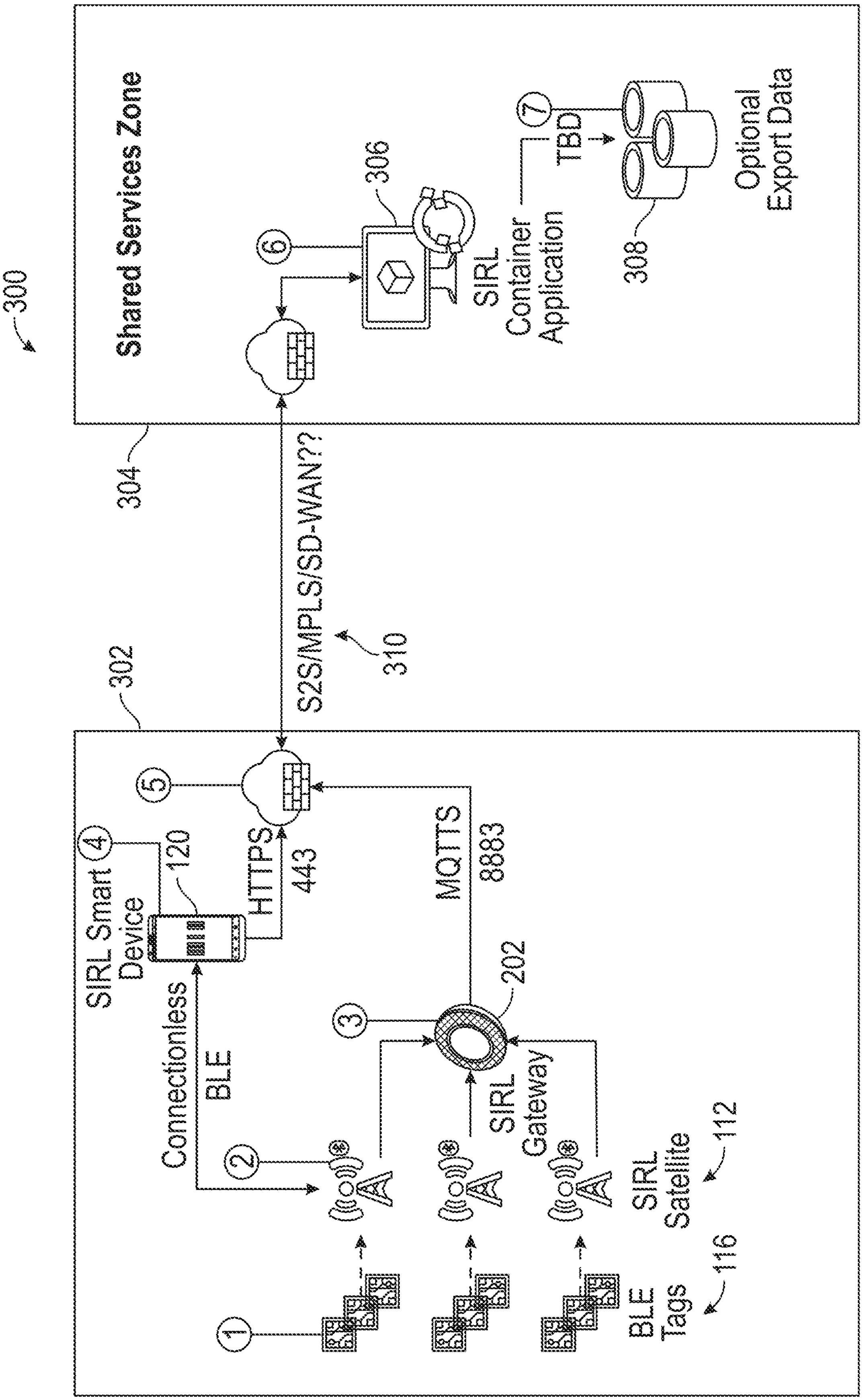
FIG. 3 is a schematic representation of an asset management system, according to some embodiments.

Referring now to FIG. 3, another asset management system 300 (e.g., similar to asset management systems 100, 200) is shown, according to some embodiments. The system 300 shows a worksite 302 (e.g., a first location) including a network of sensors 112 that detect tracking tags 116 and feed sensor data to a gateway 202. The worksite 302 also includes a smartphone 120 enabling user interaction with the system 300. The system 300 includes a shared services site 304 (e.g., a second location) that includes a computing system 306 configured to perform system functions such as determining the locations of tracking tags 116 based on sensor data, performing data analysis, and communicating with the smartphone 120 or other smart devices. The second location 304 also includes a server 308 for storing data, such as historical tracking information and analytics. The system 300 includes a firewall 310 between the shared services site 304 and the work site 302 to protect data from interception and to prevent unapproved access to the system 300. In some embodiments, the system 300 may include several worksites 302 with similar sensor arrays. Each worksite 302 may transmit data to the shared services site 304 and the computing system 306 may perform system functions for each worksite 302. A user may be able to access tracking information for assets on any of the worksites 302 via the smartphone 120.

Tool Tracking Tags

Figure 4:
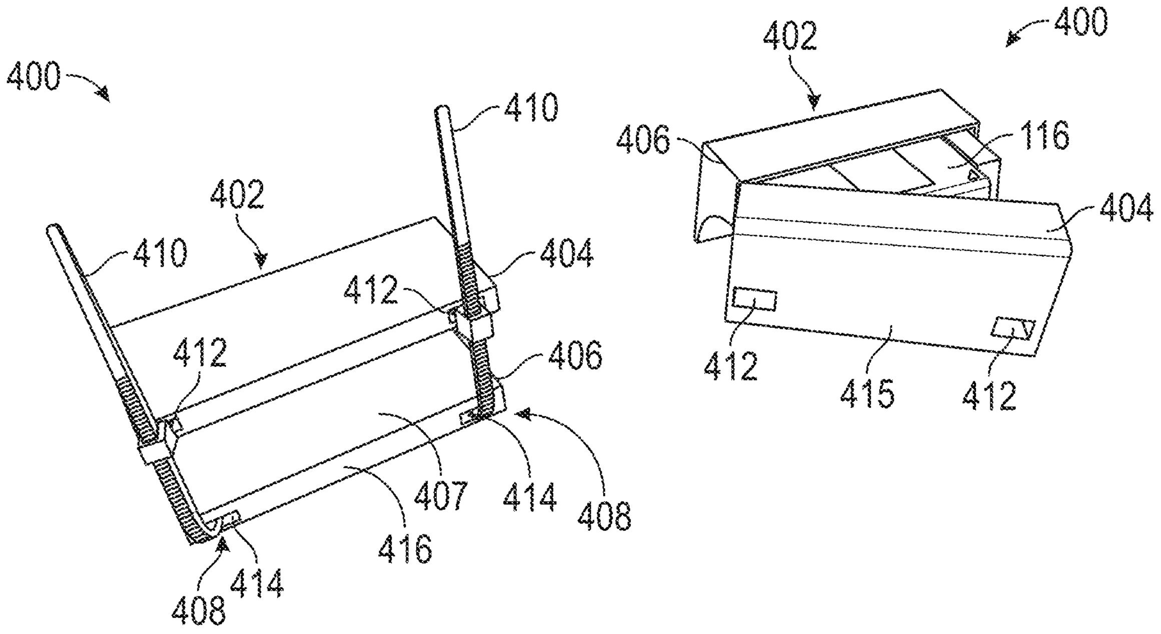
FIG. 4 is an image of two tracking tag assemblies, according to some embodiments.
Figure 5:
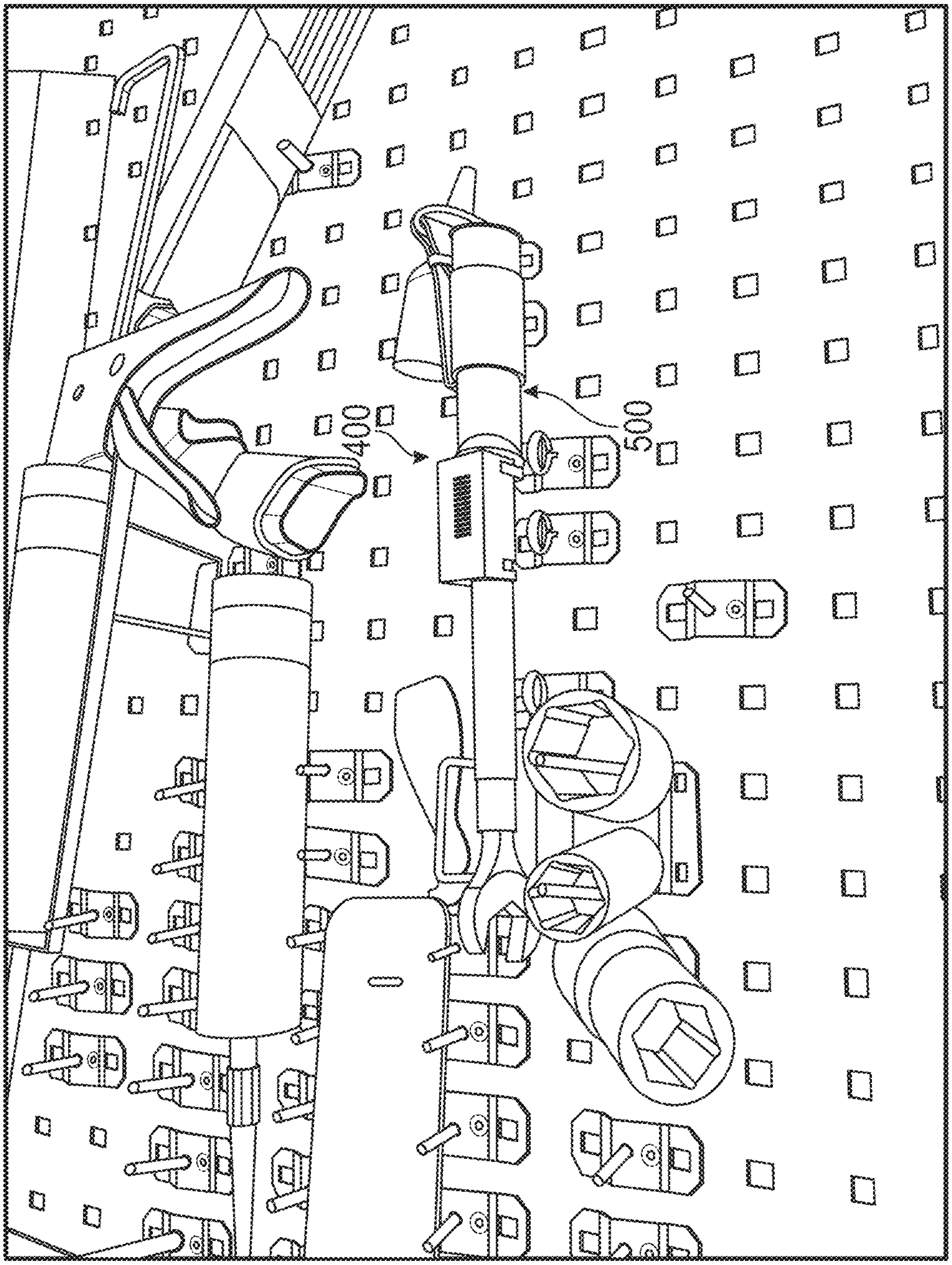
FIG. 5 is an image of a wrench including one of the tracking tag assemblies of FIG. 4, according to some embodiments.
Figure 6:
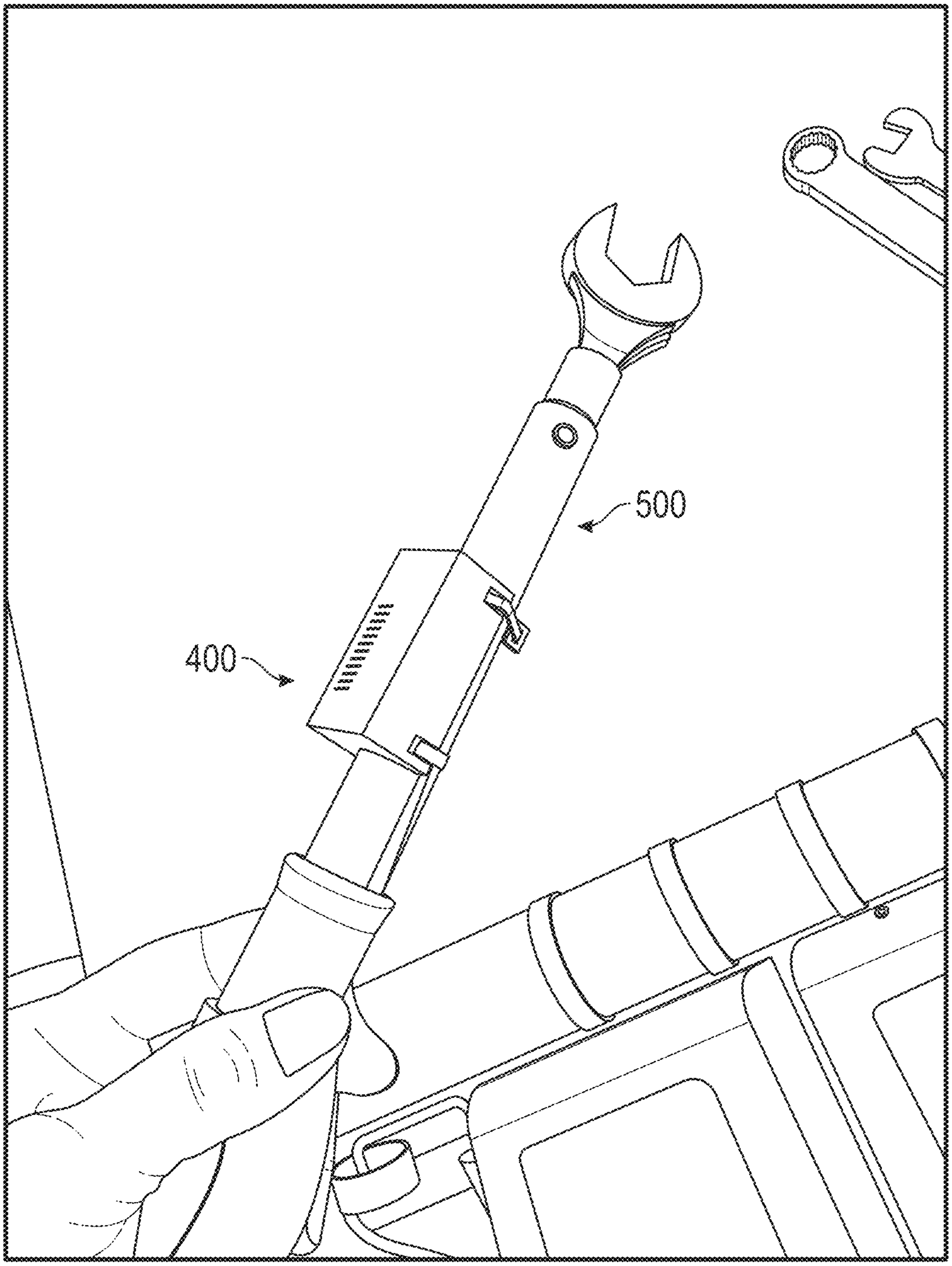
FIG. 6 is an image of the wrench of FIG. 5.

Referring now to FIG. 4, tracking tags assemblies 400 are shown, according to some embodiments. The tracking tag assemblies 400 shown in FIG. 4 are configured to be coupled to a hand tool or to a round member of a larger tool or device. The tracking tag assembly 400 includes a housing 402 including a first portion 404 and a second portion 406. The portions 404, 406 of the housing 402 are configured to enclose a tracking tag 116 (e.g., an RFID tag) that can be detected by the sensors 112. For example, the sensors 112 may transmit signals that activate a transponder in the tracking tag 116. The sensors 112 can then detect the signal generated by the transponder. The portions 404, 406 of the housing 402 may securely snap together, forming a cavity around the tracking tag 116, and may be pulled apart by hand to access the tracking tag 116 when needed. The housing may form a main channel 407 configured to be placed around a cylindrical portion of a hand tool or other device. The portions 404, 406 of the housing 402 may include tie channels 408, each configured to receive a cable tie 410 (e.g., zip tie, etc.). The tracking tag assembly 400 may be positioned on a hand tool or other device with the main channel arranged around a cylindrical or otherwise elongated component of the tool, and cable ties 410 may be inserted into each tie channel around the cylindrical component. The tie channels 408 may extend from a first opening 412 in the first portion 404, through both portions 404, 406 of the housing 402 around the main channel 407, to a second opening 414 in the second portion 406. The cable ties 410 can be inserted through the tie channels 408 and fastened around the cylindrical portion of the tool to secure the tracking tag assembly 400 to the tool. The cable ties 410 also function to secure the two portions 404, 406 of the housing 402 together. In some embodiments, the openings 412, 414 may be positioned on the outside surfaces 415 of the housing 402 rather than on the ends 416 adjacent the main channel 407. FIGS. 5 and 6 show the tracking tag assembly 400 coupled to a torque wrench 500. Small tools like the torque wrench 500 may be difficult to find on a large work site. The tracking tag 116 in the tracking tag assembly 400 makes it easier for a user to determine the location of a specific tool or other asset. For example, a user may access the asset management system 100 via a smartphone 120 and may use an application on the smartphone 120 to search for a specific asset or type of asset (e.g., the torque wrench 500) or select an asset from a list of assets. The user may select the torque wrench 500 from the search results or the list of assets. The application can then identify the location of the tracking tag 116 coupled to the torque wrench 500 so that the user can more easily locate the torque wrench 500. The application may provide directions to the location of the torque wrench 500 and may indicate the distance from the smartphone 120 to the torque wrench 500. Additional features of an application for interacting with the asset management system 100 are discussed below with reference to FIGS. 12-22.

Additional System Components

Figure 7:
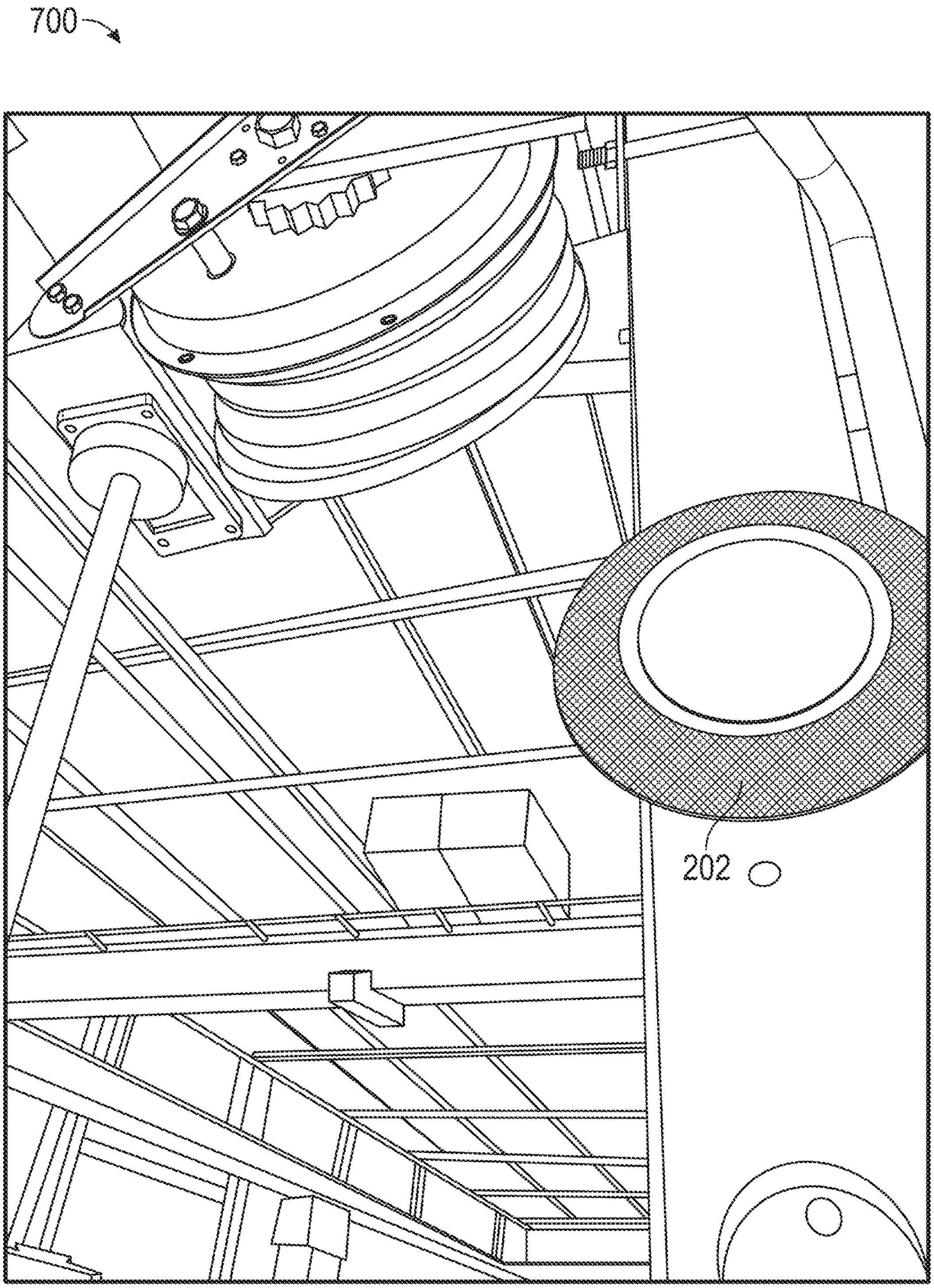
FIG. 7 is an image of an asset management system gateway mounted on a column, according to some embodiments.
Figure 8:
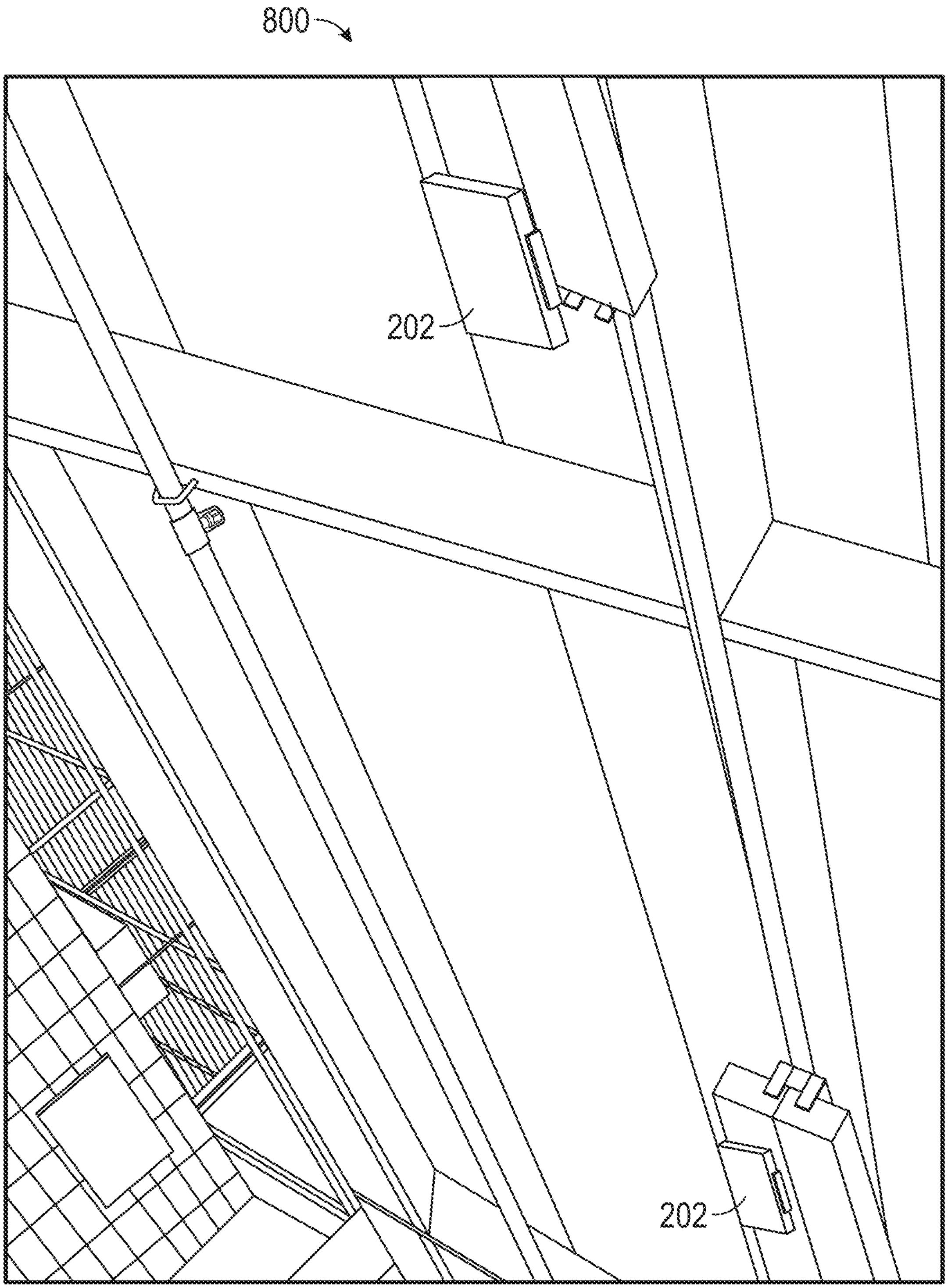
FIG. 8 is an image of asset management system sensor nodes, according to some embodiments.
Figure 9:
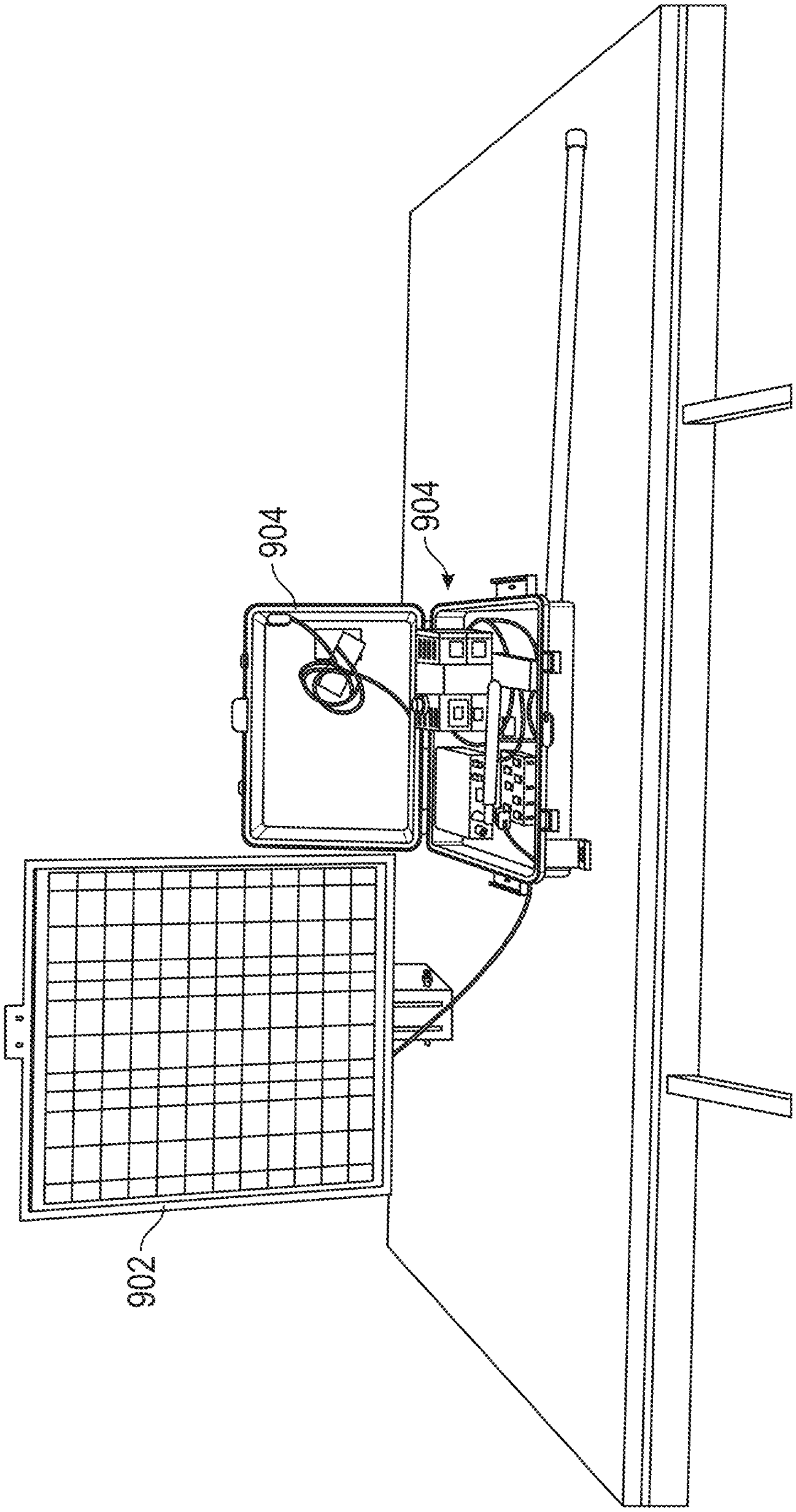
FIG. 9 is an image of a LoRa WAN sensor, according to some embodiments.

Referring now to FIG. 7, a gateway 202 is shown mounted to a column on a work site 700, according to some embodiments. The gateway 202 is configured to receive sensor data from a plurality of sensor nodes 112 and to relay the data to the local controller 130, the computing system 306, and/or to another local or offsite computing system, such as the cloud 140 or the local cloud storage gateway 206. The sensor nodes 112 may be relatively low power, and therefore the gateways 202 are positioned near the sensor nodes 112. The gateways 202 may have more processing power and greater signal strength to send the sensor data a greater distance. FIG. 8 shows sensor nodes 112 installed on a work site 800, according to some embodiments. The sensor nodes 112 may be powered by photovoltaic panels, and as such may be installed below light fixtures where they can be powered by the light emitted from the light fixtures. The sensor nodes 112 are configured to detect asset tracking tags 116 and other radio communication-enabled devices. The sensor nodes 112 may operate at about 3V and about 8 mA. In some embodiments, the nodes may operate using BLE in the 2.4 GHz band (e.g., with a frequency range of 2440 MHz+/−40 MHz). The nodes 112 may be approximately 8.7 inches in length, 8.7 inches in width, and 0.6 inches in height. The sensor nodes 112 may transmit the sensor data to the gateway 202 or a local controller 130. The sensor data may include a list of detected tracking tags 116 and devices and their respective detected signal strengths, which may indicate the distance from the tracking tags 116 to the sensor node 112. FIG. 9 shows a LoRa WAN sensor 902 and an enclosure 904 containing processing and signal transmission components 906. The LoRa WAN sensor 902 may be configured to detect tracking tags 116 and other radio communication-enabled devices at a much longer range than the sensor nodes 112. For example, the LoRa WAN sensor 902 may be able to track the locations of vehicles over a several mile radius in outdoor environments. The tracking tags 116 that are detected by LoRa WAN sensors or via GPS may be larger, powered tracking tags 116 that may emit radio frequencies in the range of 900 MHz. In some embodiments, optical or infrared image processing may also be integrated into the system for secondary positioning information or confirmation. For example, assets may include barcodes that are readable by an optical or infrared sensor, and position information from the sensor nodes 112 can be further refined using the optical or infrared sensors. The sensors may determine distance, for example, based on the detected size of the barcode relative to the image capture area. A barcode that occupies a larger portion of the image capture area is likely closer to the sensor than a barcode that occupies a smaller portion of the image capture area.

Figure 10:
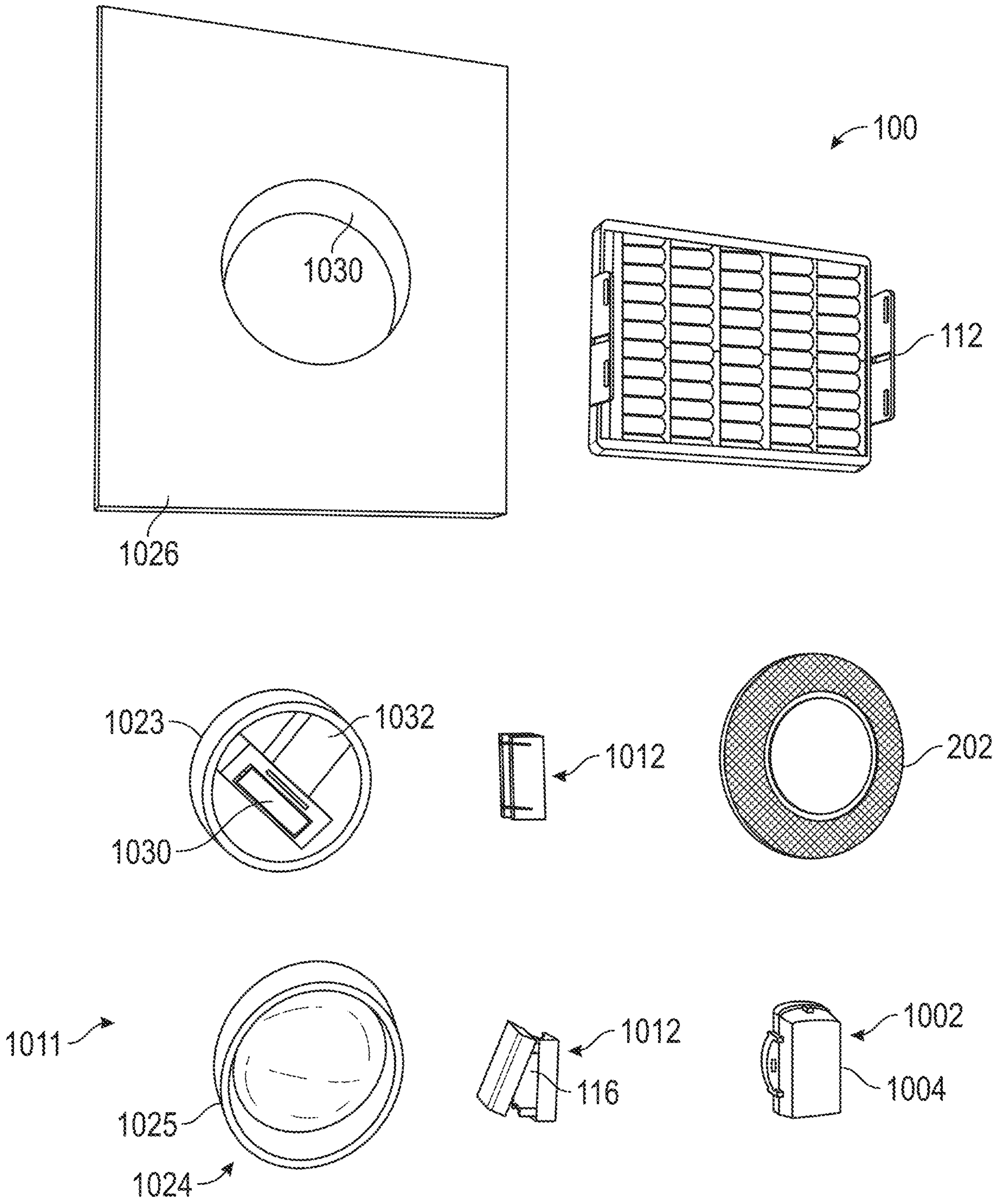
FIG. 10 is an image of various components of an asset management system, according to some embodiments.
Figure 11:
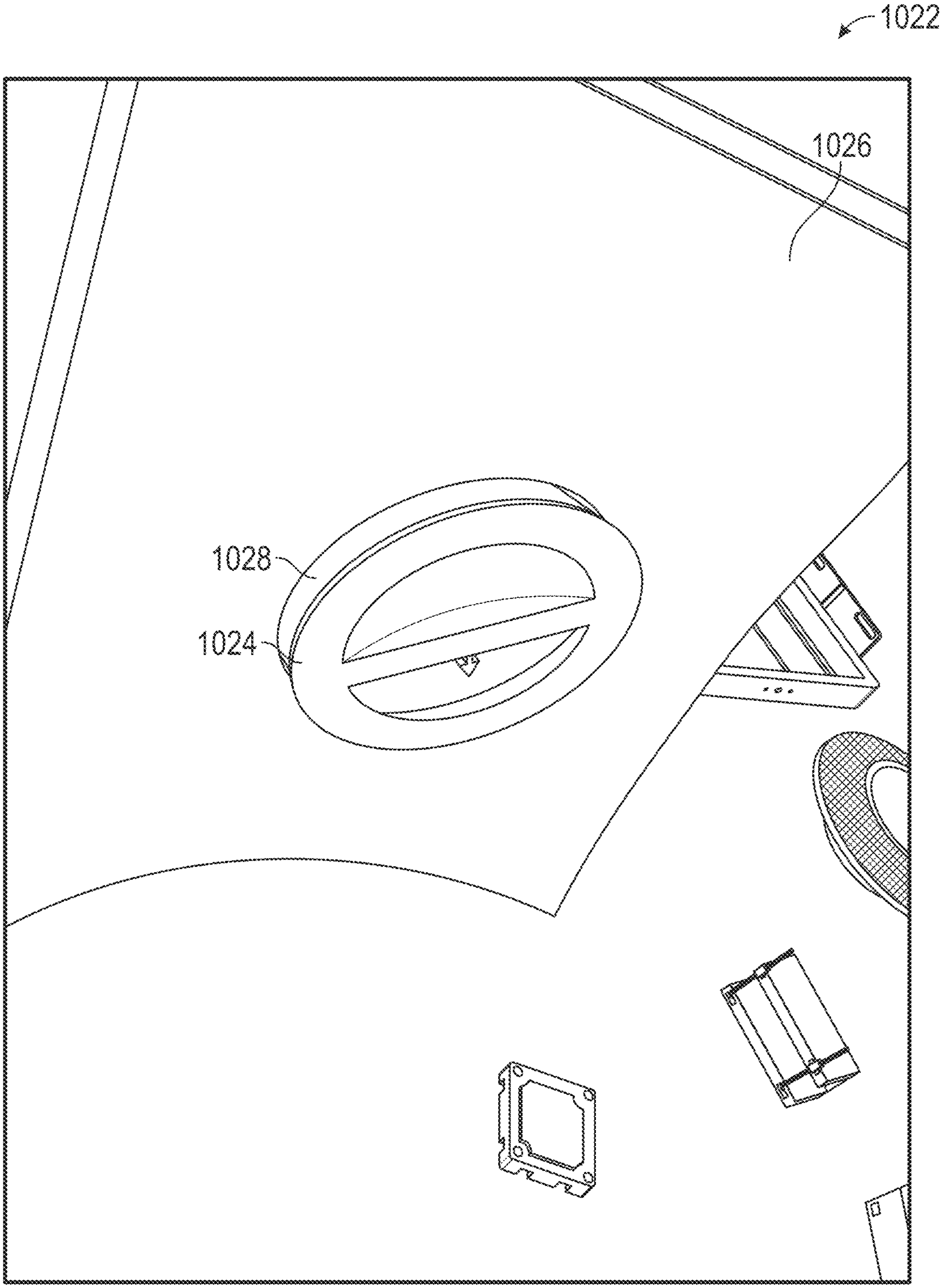
FIG. 11 is an image of a high-temperature tracking tag assembly, according to some embodiments.

Referring now to FIG. 10, various components of the asset management system 100 are shown, according to some embodiments. FIG. 10 shows a sensor node 112, according to some embodiments, and a gateway 202, according to some embodiments. FIG. 10 also illustrates several embodiments of tracking tag assemblies 1002, 1012, 1022. Tracking tag assembly 1002 includes a housing 1004 that encloses a tracking tag 116 and can be mounted to a surface of a larger asset, such as a vehicle, a weldment or other workpiece, or a work machine, such as a forklift or crane. Tracking tag assemblies 1012 are similar to or the same as the tracking tag assemblies 400 shown in FIGS. 4-6. Tracking tag assembly 1022 is shown disassembled. Tracking tag assembly 1022 is configured to be used in high-temperature environments and includes an enclosure 1024 configured to be inserted in an opening 1028 in an insulated backing 1026. The enclosure 1024 includes an inner portion 1023 and an outer portion 1025. The inner portion 1023 stores a battery 1030 and a tracking tag 1032 (e.g., similar to the tracking tag 116). The tracking tag 1032 may be powered by the battery 1030 (e.g., the tracking tag 1032 may be an active RFID tag), which can improve signal strength. The outer portion 1025 may include heat shielding 1034 to protect the battery 1030 and tracking tag 1032 from the high-temperature environment. The insulated backing 1026 may provide additional heat protection to the battery 1030 and tracking tag 1032. FIG. 11 shows the tracking tag assembly 1022 assembled, with the enclosure 1024 installed in the opening 1028 in the insulated backing 1026.

System Management Applications

Figure 12:
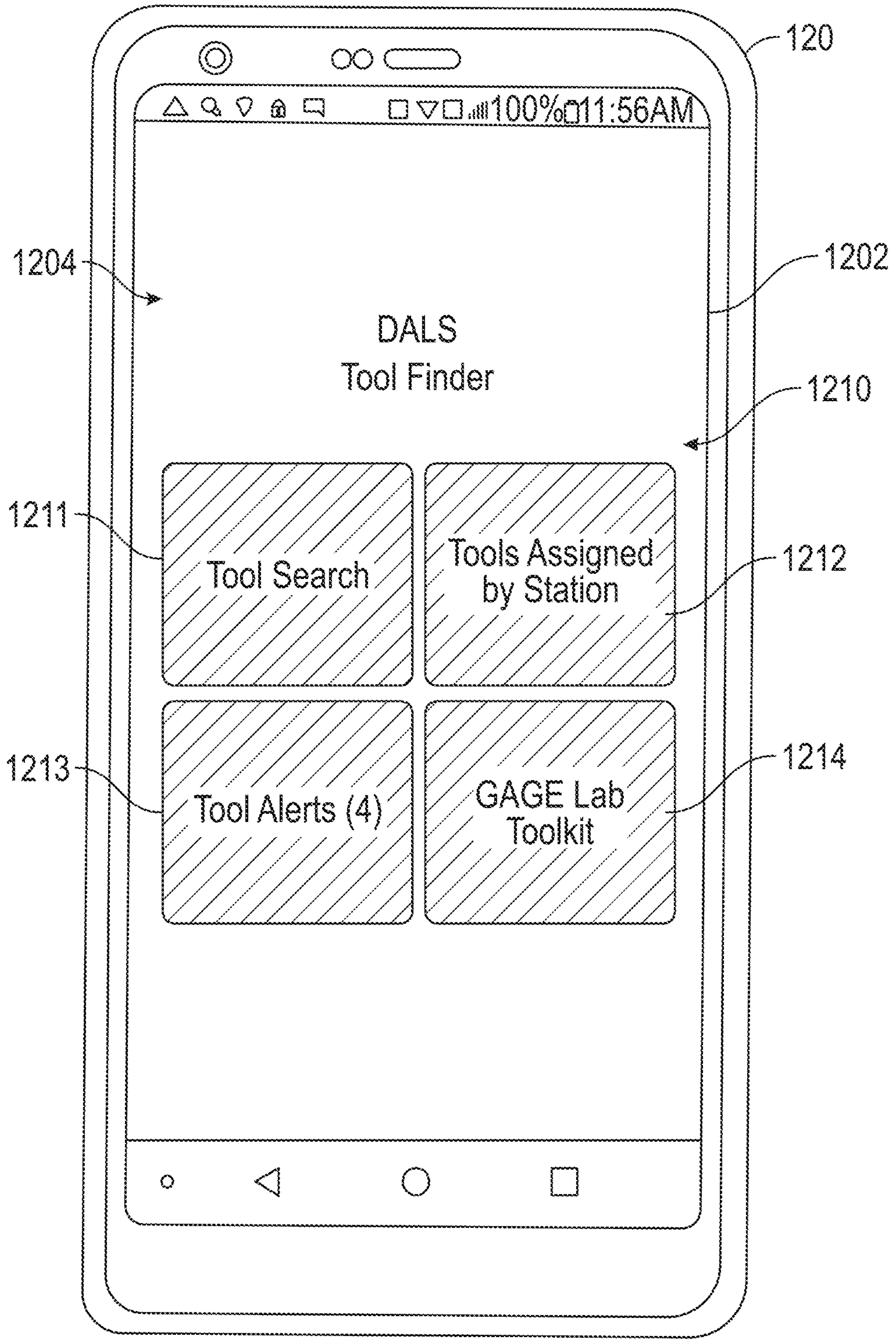
FIGS. 12-22 are images of a smartphone operating an asset management system application, according to some embodiments.

Referring now to FIGS. 12-22, a smartphone 120 is shown illustrating a tool finder application for interacting with the asset management system 100, according to some embodiments. The smartphone 120 includes a display screen 1202 (e.g., a touchscreen) configured to display a graphical user interface 1204 (GUI) that can display information to a user and receive commands from a user (e.g., by selecting buttons on the GUI 1204 by touching the display screen 1202). It should be understood that tablet computers, laptops, wired terminals, and other wired or wireless devices may be used to perform similar functions to those shown in the smartphone 120. FIG. 12 shows a home screen 1210, which may be a primary or main screen of the application that is first shown to the user when the application is opened. The home screen 1210 includes four selectable module buttons. The tool search module button 1211 may be used to locate tools and other devices using the asset location system 110. The tools assigned by station module button 1212 may be used to identify where tools are supposed to be stored. The tool alerts module button 1213 may be used to display alerts to a user when tools are in need of service or have been moved outside of an approved area. The lab toolkit module button 1214 may be used to assign tags to tools and to perform various managerial tasks for the asset management system.

Figure 13:
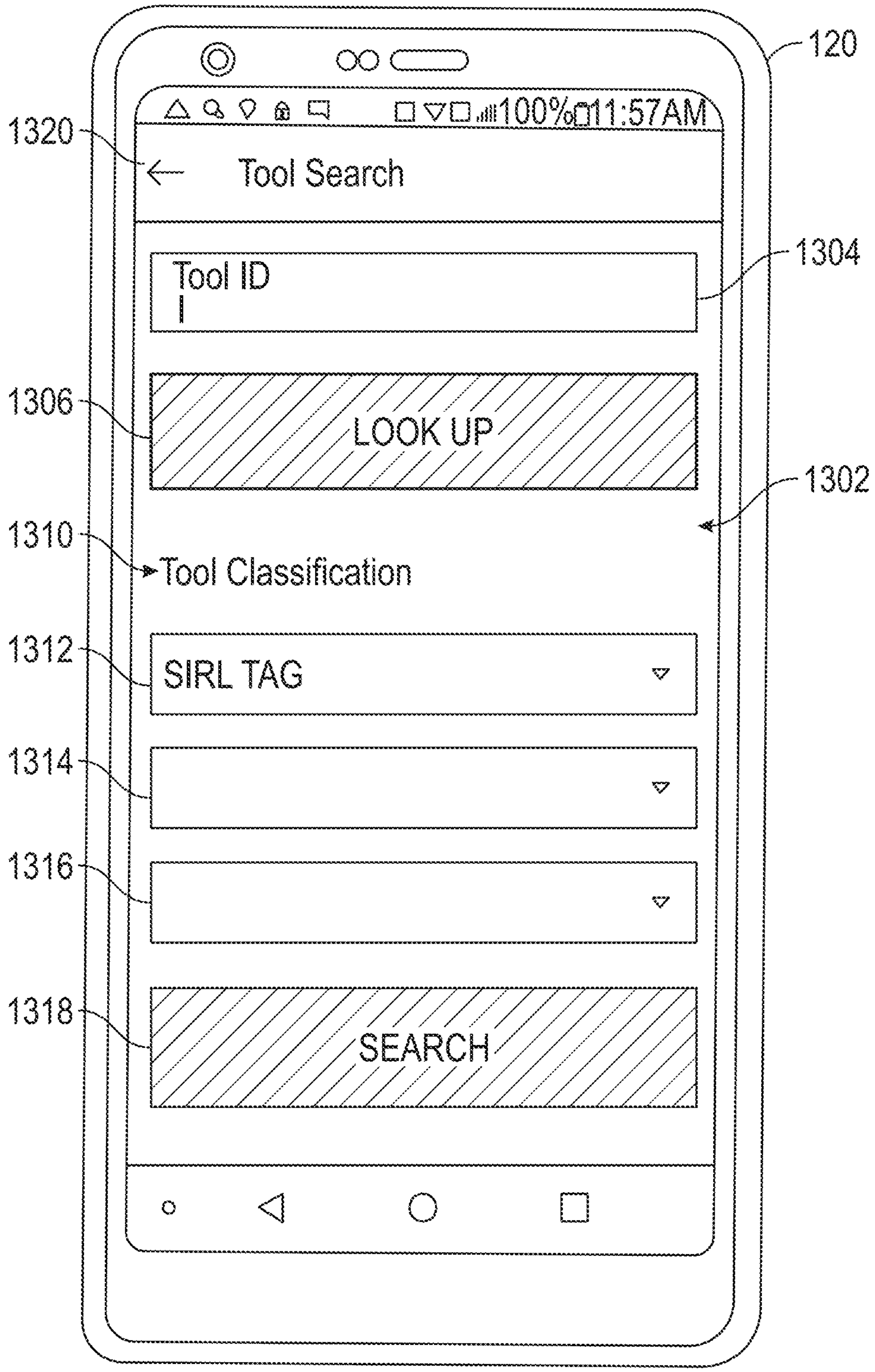
Figure 14:
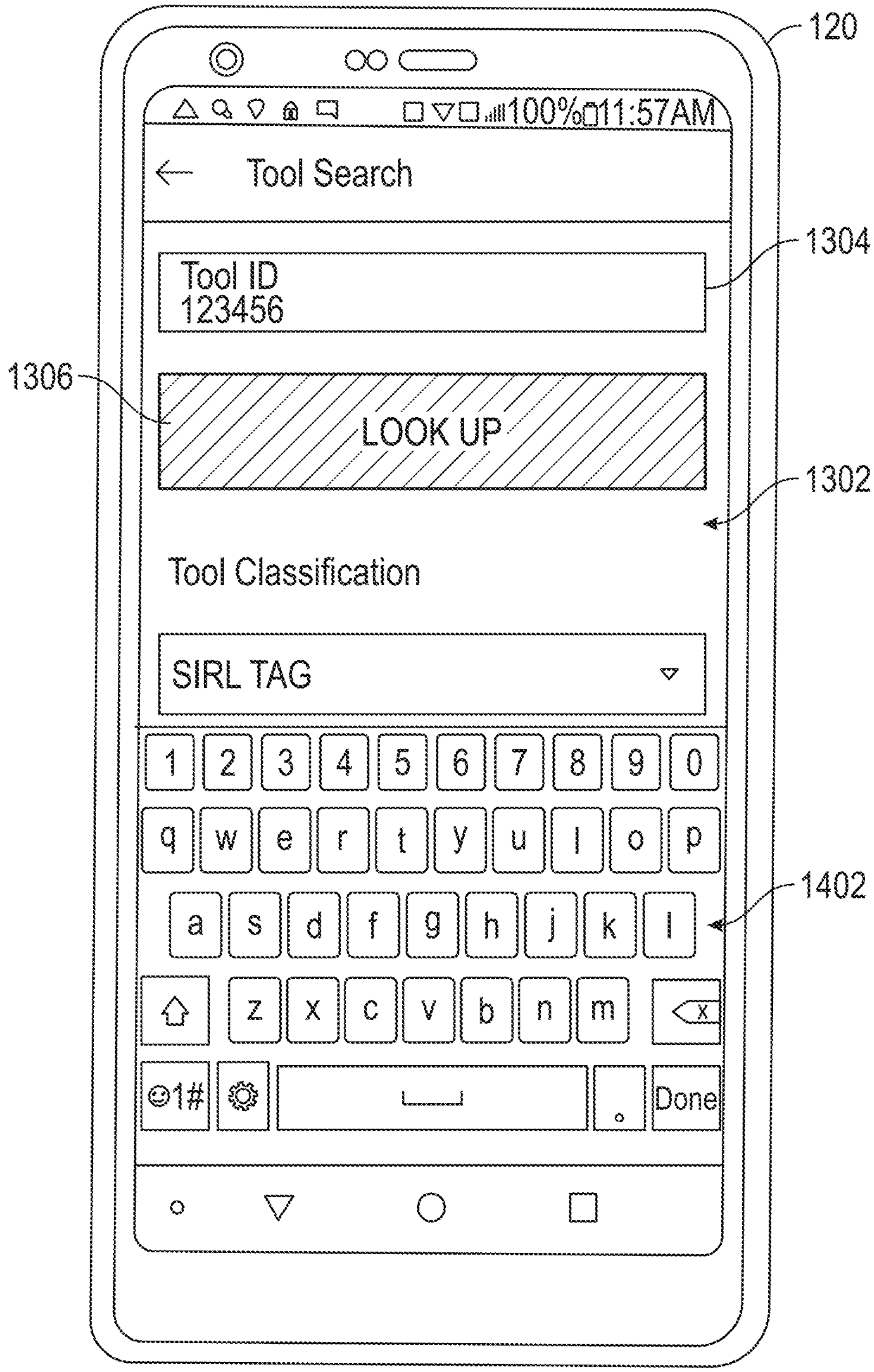
Figure 15:
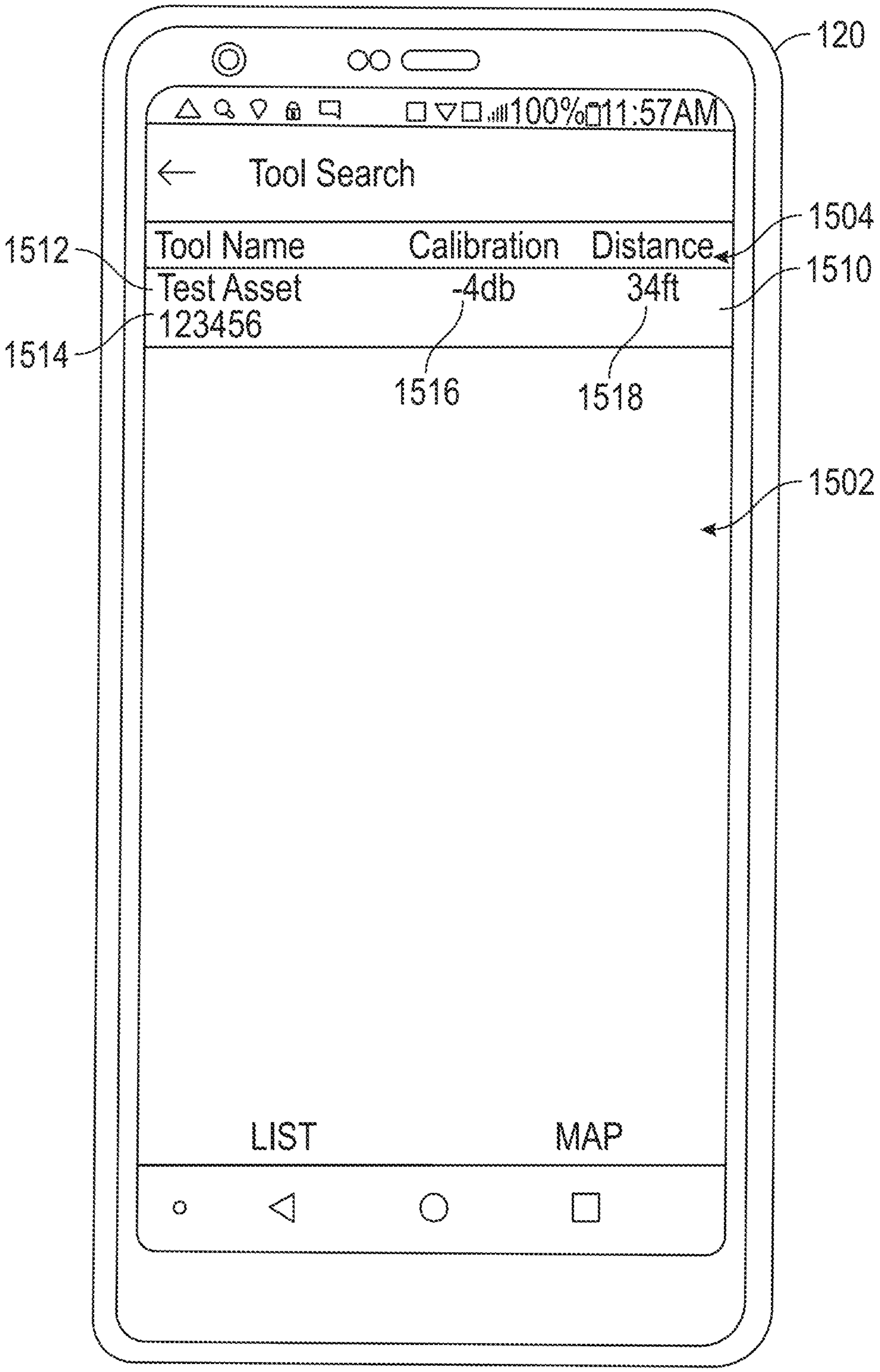
Figure 16:
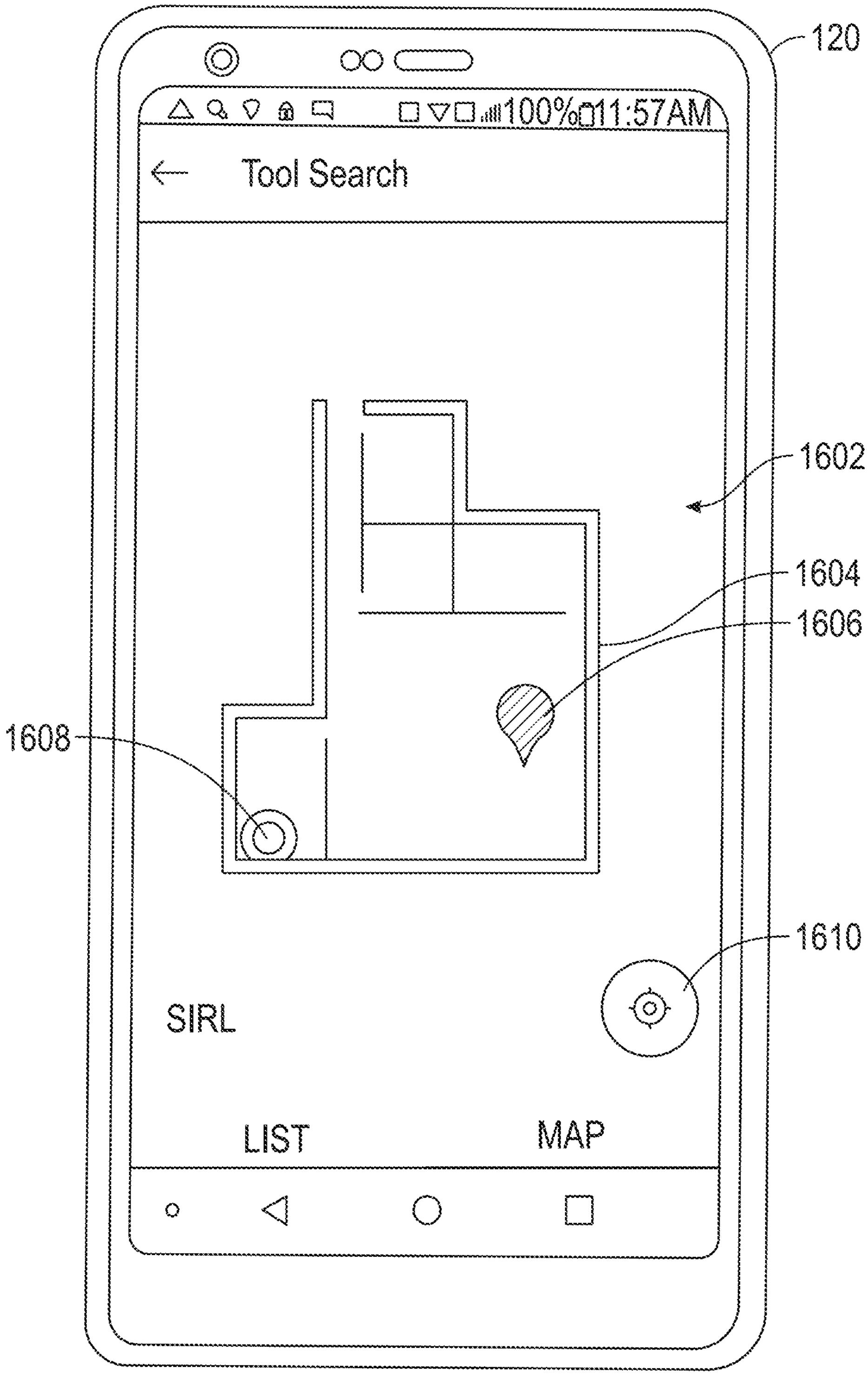
Figure 17:
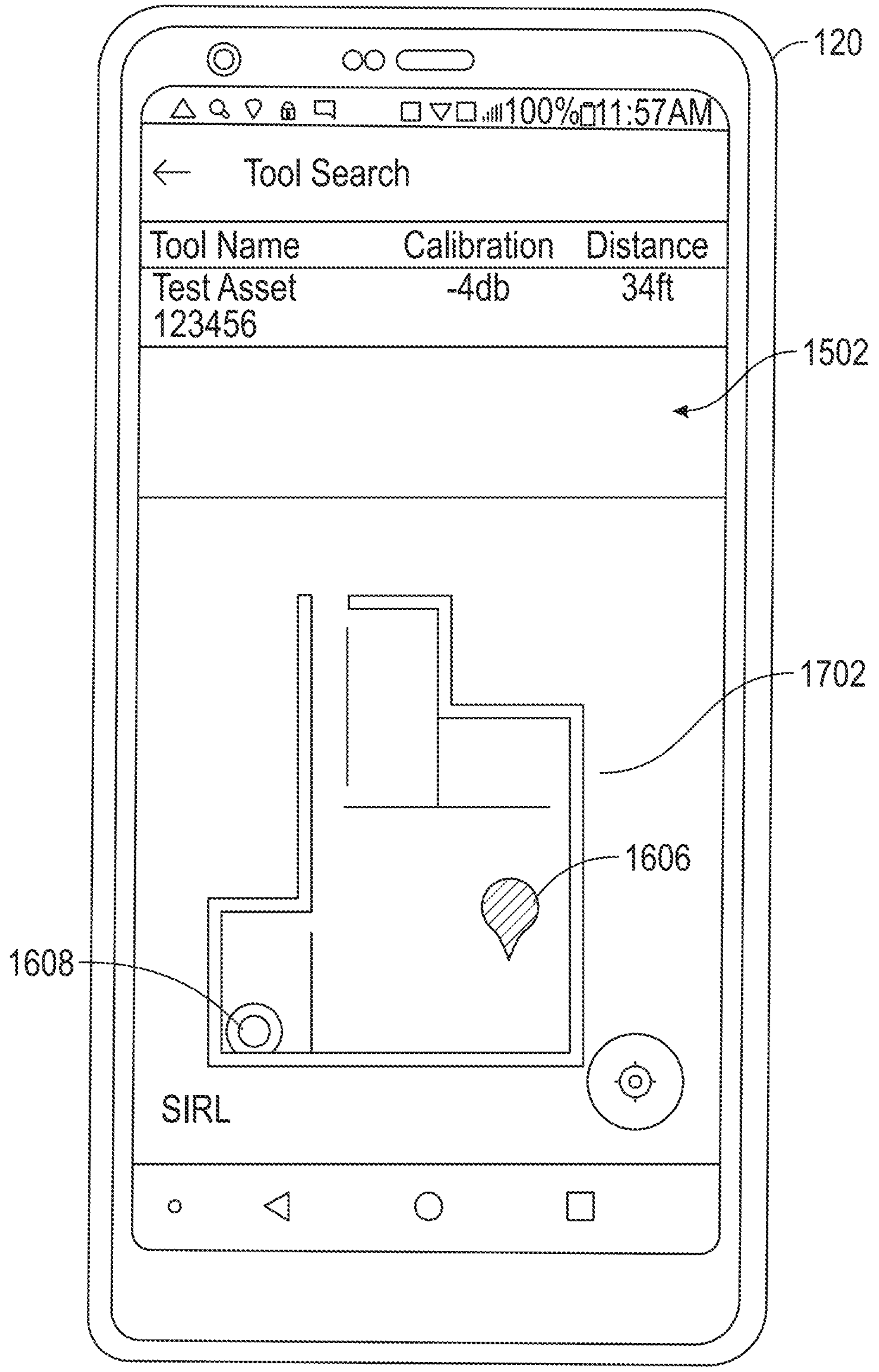

FIG. 13 shows a search screen 1302 of a tool search module, according to some embodiments. The search screen 1302 may be displayed when a user selects the tool search module button 1211 on the home screen 1210. The search screen 1302 includes a Tool ID entry field 1304 and lookup button 1306. A user may enter a specific tool ID into the Tool ID entry field 1304 and select the lookup button to locate a specific tool on a worksite associated with the tool ID. The search screen 1302 also includes a tool classification search feature 1310. A user may select a first search category 1312 via a dropdown menu and may further filter using additional subcategories 1314, 1316 using additional dropdowns. The user may then search using the selected categories 1312, 1314, 1316 by selecting the search button 1318, which may cause the application to identify all of the tools within the selected categories 1312, 1314, 1316 and their locations. The search screen 1302 also includes a return button 1320 that a user may select to return to the home screen 1210. In other portions of the application, the return button 1320 may return the user to the previous screen rather than to the home screen 1210. FIG. 14 shows the search screen 1302 after the user has selected the Tool ID entry field 1304, causing the keyboard 1402 of the smartphone 120 to appear on the display screen 1202. In FIG. 14, the user has entered a Tool ID of "123456" into the Tool ID entry field 1304 using the keyboard 1402. FIG. 15 shows a results screen 1502 including a list of assets 1504 identified in the search after the user enters a search into the Tool ID entry field 1304 and selects the lookup button 1306. As shown in FIG. 15, the user has entered a complete Tool ID (e.g., "123456") which has identified only a single asset, shown as entry 1510. In some embodiments, the user may enter a portion of a Tool ID and the list of assets 1504 may include each asset with Tool IDs that include that portion. The list of assets 1504 may include an entry 1510 for each asset including the name 1512 of the asset, the Tool ID 1514 of the asset, calibration information 1516, and the distance 1518 from the smartphone 120 to the asset. The results screen 1502 may also include a list/map toggle 1520 that allows the user to switch between a list view of the search results and a map view. FIG. 16 shows a map view 1602 of the results after the map view has been selected from the list/map toggle 1520. The map view 1602 shows a map 1604 of the worksite, and indicates the locations 1606 of the assets from the search results, as well as the location 1608 of the smartphone 120. The user may use the map view 1602 to find the assets from the list 1504 by following the map 1604 to the indicated location 1606 of the asset. The map view 1602 includes a recenter button 1610 that recenters the map on the location of the smartphone 120, which may be useful on large worksites in which the entire worksite map 1604 may not fit on the display screen 1202. The user may track his or her own movements by monitoring the smartphone location 1608. The user may return to the results screen 1502 by selecting the list view from the list/map toggle 1520. Referring now to FIG. 17, the user may also view a pop-up map 1702 by selecting an asset from the list of assets 1504 on the results screen. The pop-up map 1702 may overlay the results screen 1502, and the user can return to the results screen 1502 by touching the display screen 1202 above from the pop-up map 1702. In some embodiments, the pop-up map 1702 may indicate the location 1606 of only the selected asset and the location 1608 of the smartphone 120, rather than indicating the location 1606 of every asset in the list of assets 1504.

Figure 18:
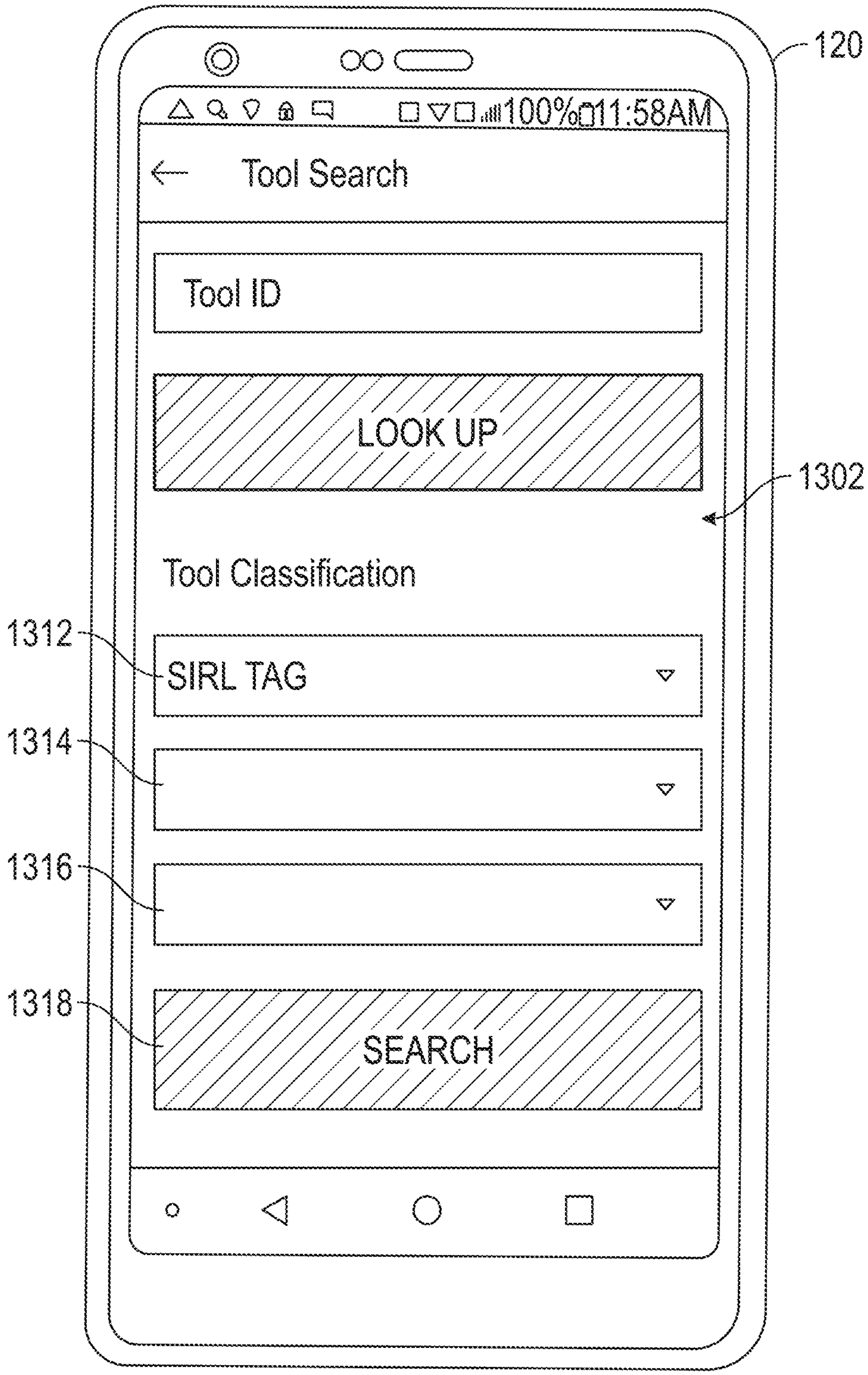
Figure 19:
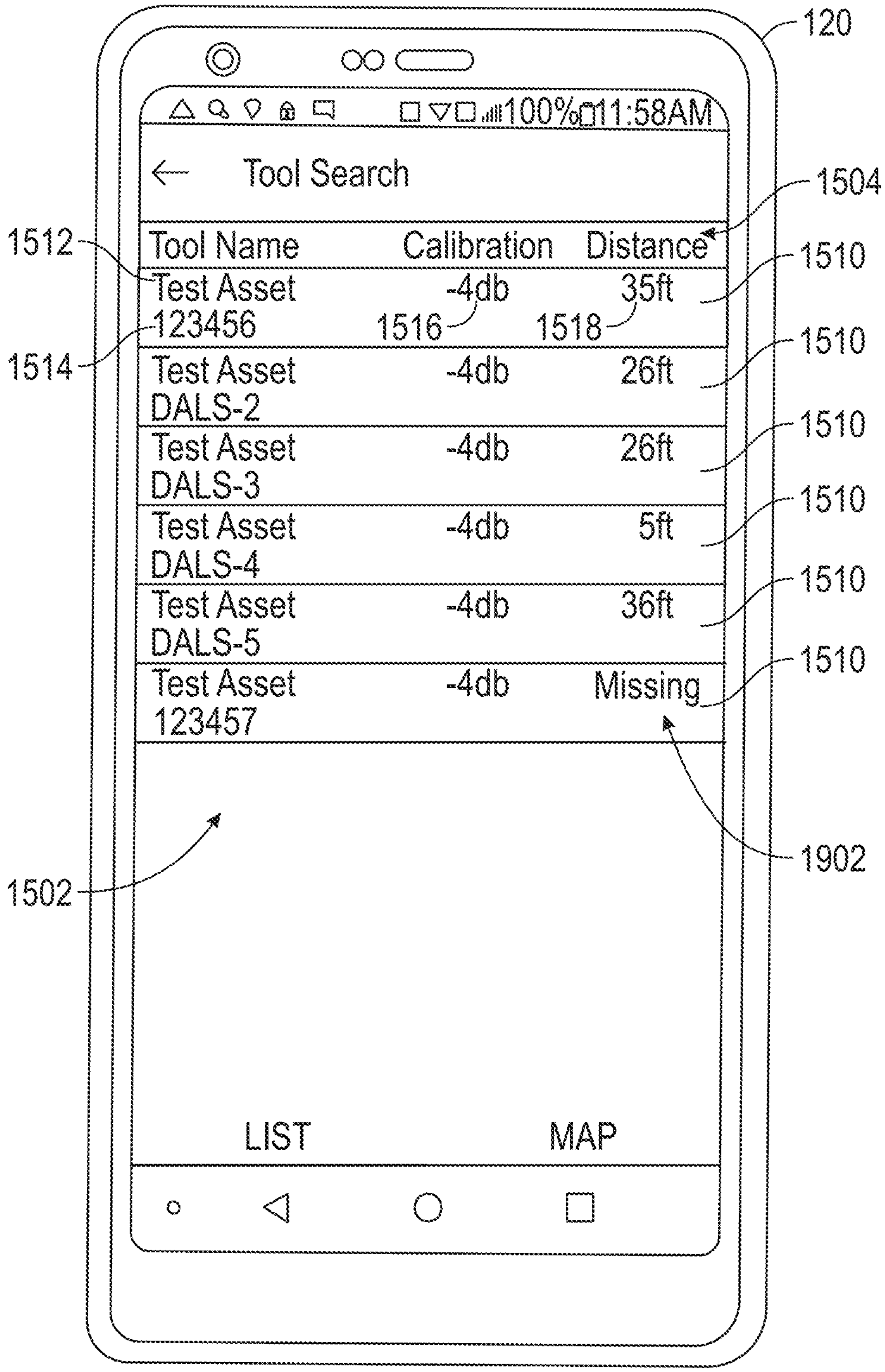
Figure 20:
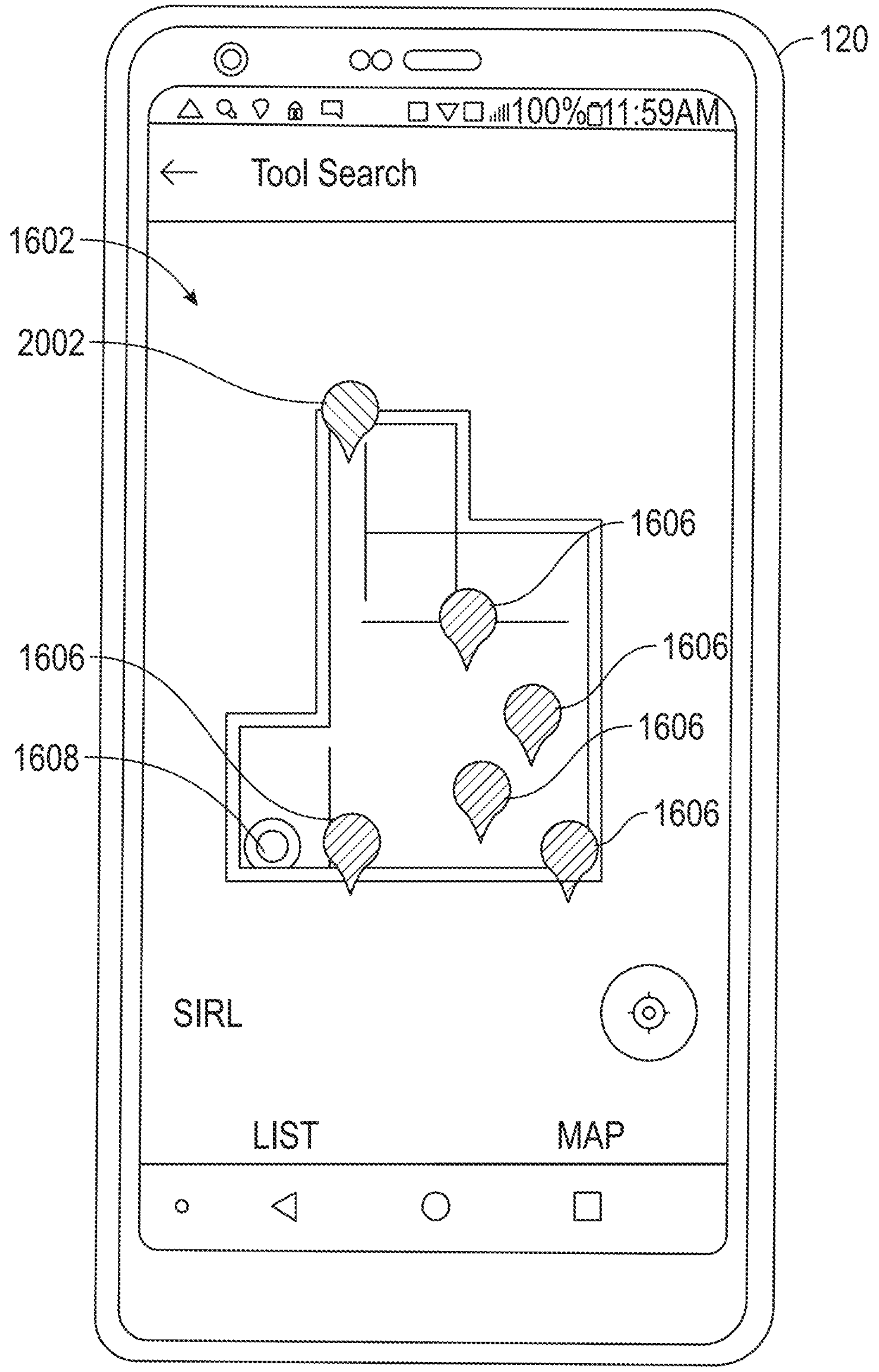

FIG. 18 shows the search screen 1302 of the tool search module with a first search category 1312 selected from a drop-down menu. The search may be further narrowed by selecting additional subcategories 1314, 1316. After the category or categories, 1312, 1314, 1316 are selected, a user may select the search button 1318 to view the results screen 1502 with the list of assets 1504 within the selected categories 1312, 1314, 1316. FIG. 19 shows the results screen 1502 for the category 1312 selected in FIG. 18. The list of assets 1504 includes entries 1510 for each asset within the selected category 1312, including the name 1512 of the asset, the Tool ID 1514 of the asset, calibration information 1516, and the distance 1518 from the smartphone 120 to the asset. When an asset is not located on the worksite, the entry 1510 for that asset may include a "missing" indicator 1902 rather than the distance 1518. FIG. 20 shows the map view 1602 of the results of the search from FIG. 19 after the map view has been selected from the list/map toggle 1520. The map view 1602 shows a map 1604 of the worksite and indicates the locations 1606 of the assets from search results, as well as the location 1608 of the smartphone 120. Each asset location indicator 1606 may be selectable on the map 1604, and selecting an asset location indicator 1606 may cause information about the associated asset (e.g., the asset name, Tool ID, distance, etc.) to appear on the screen 1202. The map view 1602 includes a missing asset indicator 2002, which indicates the most recently detected location of a missing asset before it was no longer detected. A user may search the area near this location for the missing asset or may infer that the asset was taken off of the worksite based on the location of the missing asset indicator 2002 (e.g., if the missing asset indicator points to a driveway leading away from the worksite).

Figure 21:
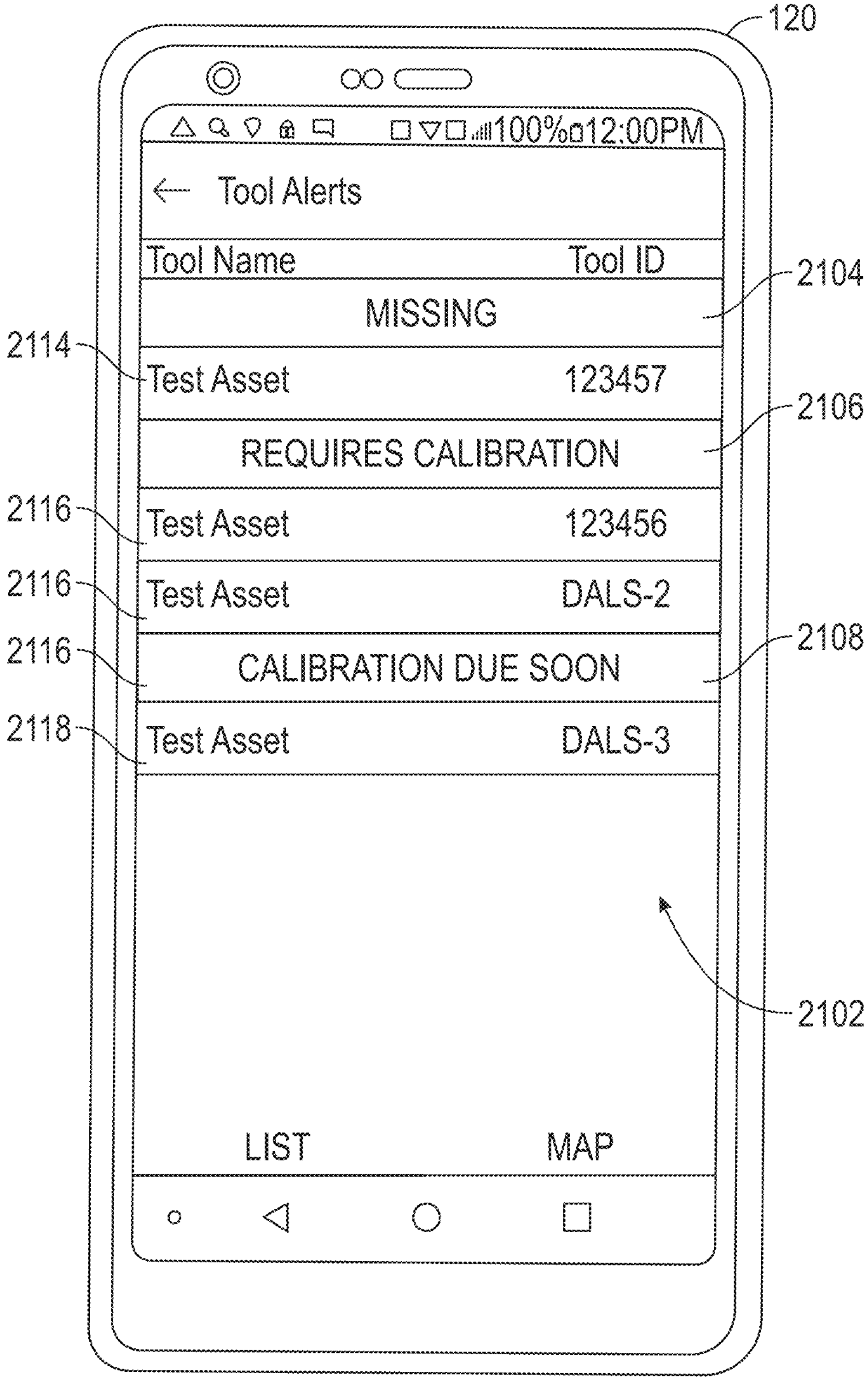

FIG. 21 shows a tool alerts screen 2102, according to some embodiments. The tool alerts screen 2102 may be displayed when the tool alerts module button 1213 is selected from the home screen 1210. The tool alerts screen 2102 shows alerts (e.g., notifications) for assets that may need service or are missing from the system. The tool alerts screen 2102 may include a list of missing assets 2104, a list of assets that require calibration 2106, and a list of assets that have upcoming calibration, inspection, or maintenance due dates 2108. The list of missing assets 2104 includes an entry 2114 for each asset that is not detected by the asset location system 110. A user may switch to a map view using the list/map toggle 1520 to view the "missing" indicator 1902 for any missing assets, indicating the most recent location where the missing asset was detected. The list of assets that require calibration, inspection, or maintenance 2106 may include an entry 2116 for each asset that requires calibration, and the locations of those assets can be displayed on the map view, similar to search results as shown in FIG. 19. The locations of the entries 2118 in the list of assets that have upcoming calibration due dates 2108 can also be displayed on the map view, similar to search results as shown in FIG. 19. Each entry 2114, 2116, 2118 can also be selected to view a pop-up map, similar to the pop-up map 1702 shown in FIG. 17.

Figure 22:
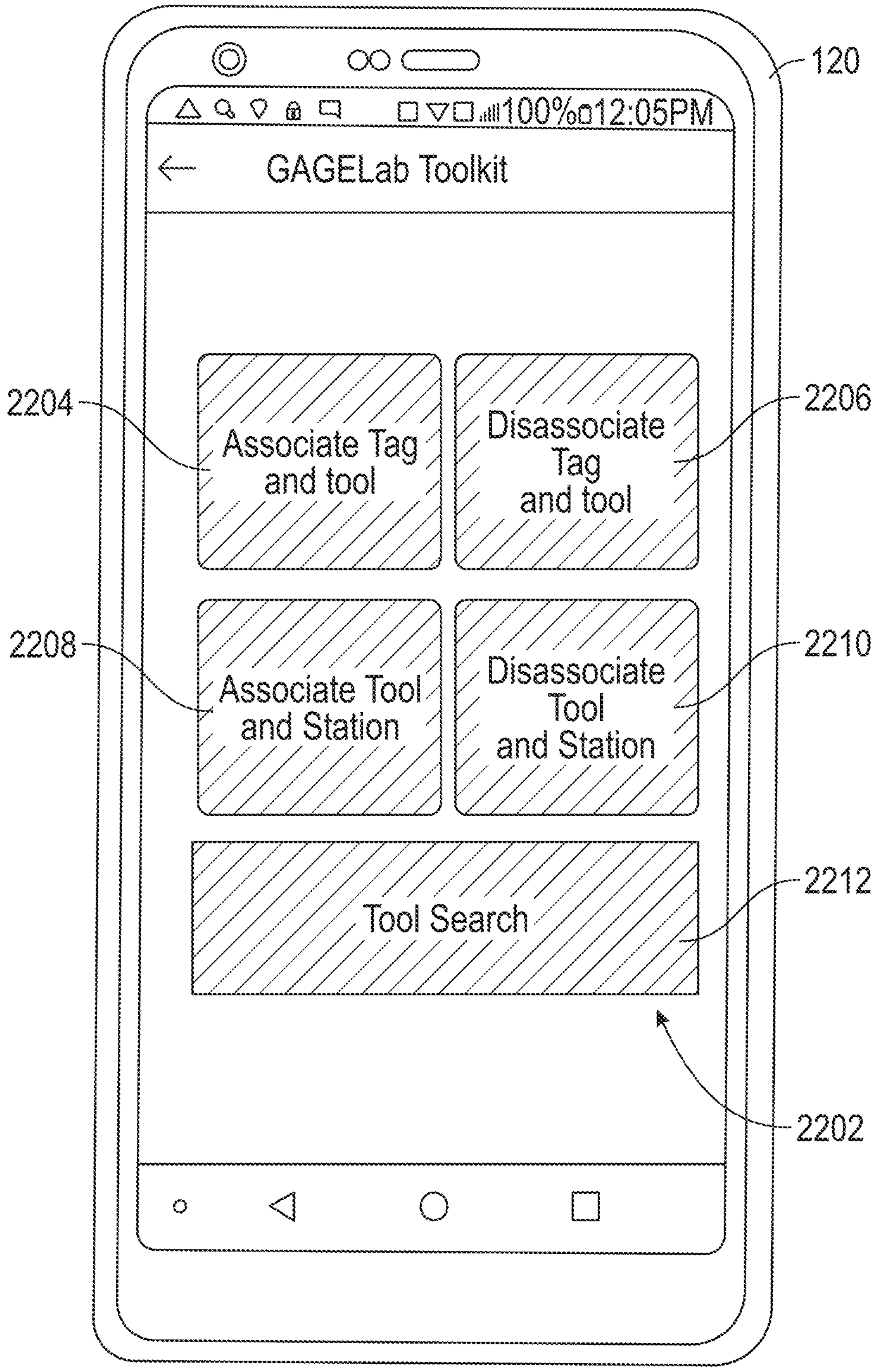

FIG. 22 shows a lab toolkit screen 2202, according to some embodiments. The lab toolkit screen 2202 may be displayed when the lab toolkit module button 1214 is selected from the home screen 1210. The lab toolkit screen 2202 may include an associate tag and tool button 2204, which, when selected, opens an entry screen in which a tracking tag 116 can be associated with the tool or other asset to which it is attached. For example, a user may couple a tracking tag 116 with a Tool ID number of "123456" to a wrench. The user may then select the associate tag and tool button 2204 and enter the Tool ID number and the name of the asset to which it is coupled. A new asset may be added to the asset management system 100 using this process, or the user may select an existing tool in the system 100 and associate it with a tracking tag 116. The user may select the disassociate tag and tool button 2206 to disassociate the asset with the tracking tag 116, for example, if the tracking tag 116 is damaged and needs to be replaced. The user may then use the associate tag and tool button 2204 to assign a different tracking tag 116 to the tool. The lab toolkit screen 2202 may include an associate tool and station button 2208 which, when selected, opens an entry screen in which a tool can be associated with a workstation on a worksite. A disassociate tool and station button 2210 can be used to disassociate the tool from the workstation so that it can be assigned to a different workstation. The lab toolkit screen 2202 may also include a tool search button 2212 that may open the search screen 1302 so that a user can confirm that any newly associated tracking tags 116 are detected by the asset location system 110.

Figure 23:
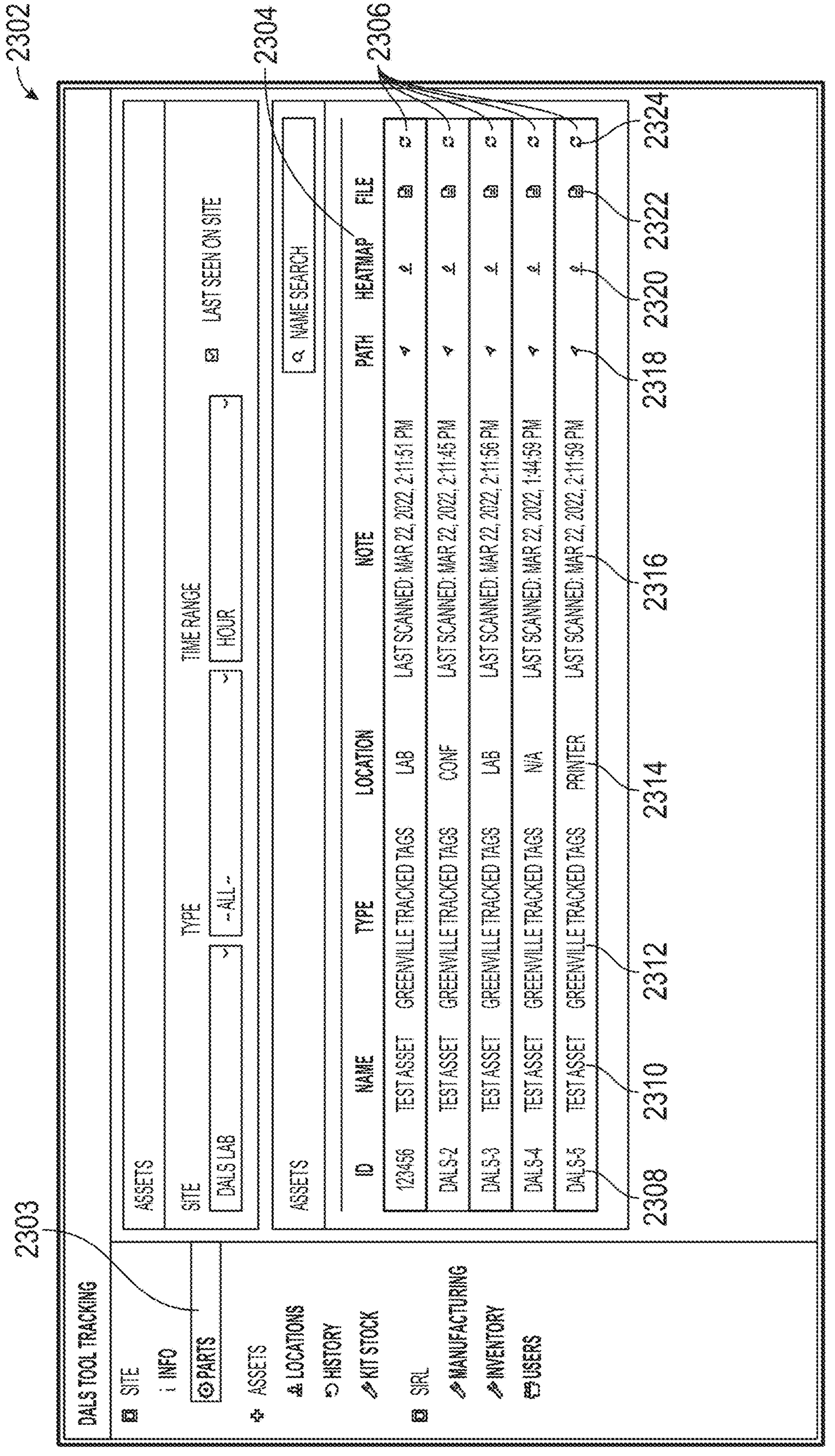
FIGS. 23-25 are representations of graphical user interface dashboards displayed within an asset management system application, according to some embodiments.
Figure 24:
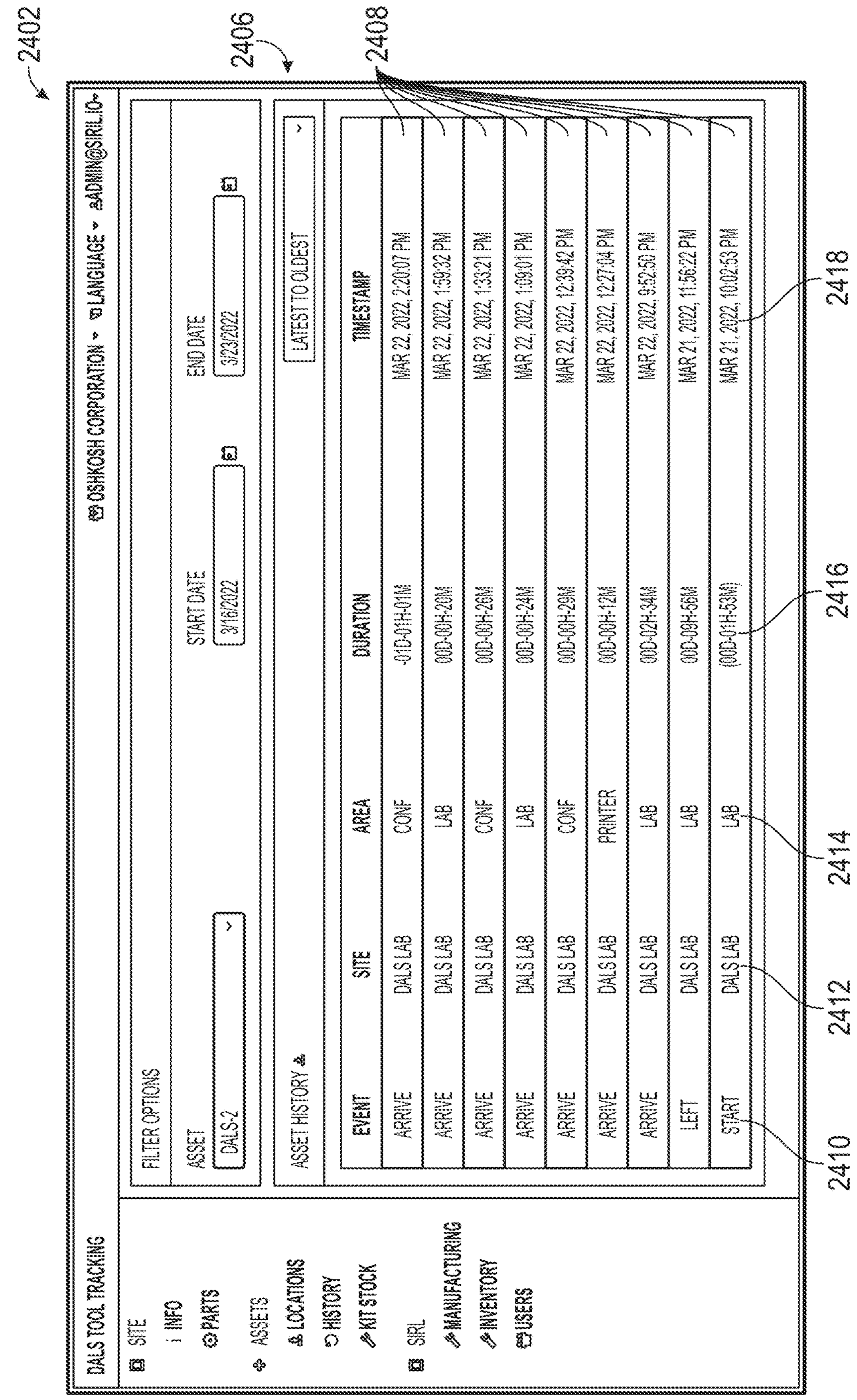
Figure 25:
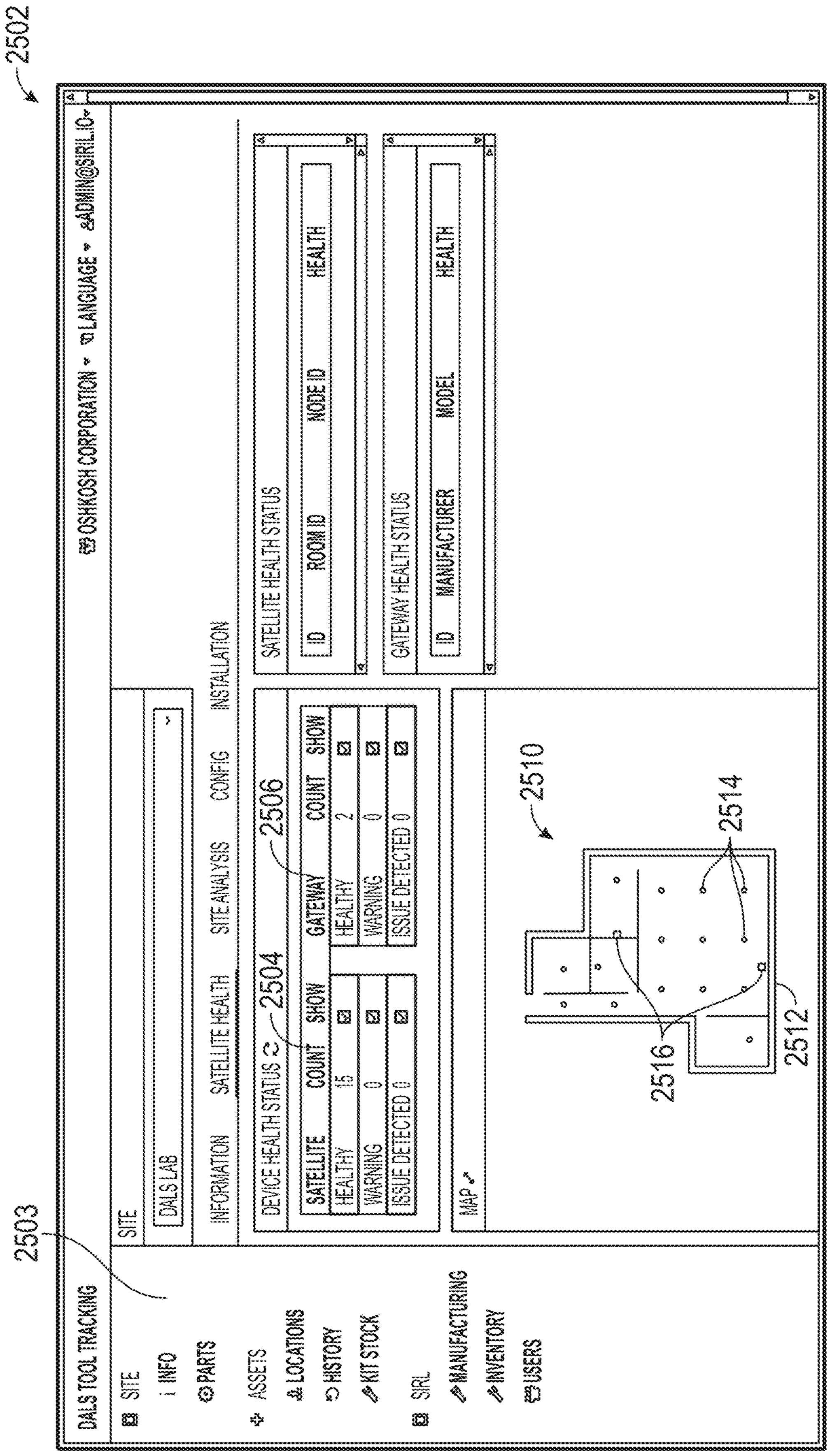

Referring now to FIGS. 23-25, asset management dashboards 2302, 2402, 2502 are shown, according to some embodiments. The dashboards may be displayed in the smartphone application shown in the application of FIGS. 12-22 or may be part of a separate management application. Dashboard 2302, accessible by selecting the parts button 2303, shows a list 2304 of assets, each asset having an entry 2306 on the list 2304. Each entry 2306 includes a Tool ID 2308, the name 2310 of the asset, an asset type 2312, a general location 2314 (e.g., a workstation, a room within a larger worksite), a last-scanned time 2316, a path button 2318, and a heatmap button 2320, a file button 2322, and a refresh button 2324. Selecting the path button 2318 may cause the application to display a path from the user device on which the application is running to the selected asset on a map, similar to the map 1604. Selecting the heatmap button 2320 may cause the map 1604 to appear with a heatmap indicating the locations where the selected asset has been during a predetermined period of time. For example, areas where the asset has been located for long periods of time may be indicated with dark marks on the map 1604, while areas where the asset has been located for brief periods of time may be indicated with lighter marks on the map 1604. The heatmap can be used to track where the tool is commonly moved, which can help worksite operators improve efficiency. For example, if a forklift is commonly used in two work areas on opposite sides of a worksite, the operators may determine that adding a second forklift to the worksite may be beneficial to improve efficiency. Alternatively, the operators may determine that the work done at the two work areas can all be done at a single location, and can move one of the work areas and the associated tools closer to the other work area.

FIG. 24 shows the dashboard 2402, accessible by selecting the history button 2403, which shows the tracking history 2406 for a specific asset. Each entry 2408 in the tracking history 2406 indicates a tracking update for the selected asset. The entries indicate the action 2410, the worksite 2412, the location 2414, the duration 2416 that the asset was in the location 2414, and a timestamp 2418 indicating the time and date that the action occurred. The actions 2410 may include a START action indicating that the tracking tag 116 coupled to the asset has been detected by the asset tracking system 110 for the first time, a LEFT action indicating that the tracking tag 116 is no longer detected by the asset tracking system 110, and an ARRIVE action indicating that the tracking tag 116 has arrived in a location 2414. The location 2414 may indicate a workstation or specific room within the worksite 2412. The user may view the tracking history 2406 to see how long an asset spends in each location 2414. For example, the asset may be a workpiece that goes through several steps of machining and coating in various locations 2414 within the worksite 2412. The tracking history 2406 may be used to determine how long each step of the process takes so that analysis can be performed to improve efficiency and to create accurate estimates of completion dates.

FIG. 25 shows the dashboard 2502, accessible by selecting the info button 2503, which shows information regarding the asset tracking system 110. The dashboard 2502 includes a sensor health window 2504 that shows the operational status of sensors 112 in the asset tracking system 110. For example, the sensor health window 2504 may indicate whether the sensors 112 are operating normally (e.g., are healthy), have a warning indicating a potential problem, or have issues detected that need to be addressed. For example, if a sensor 112 is not detected in the system 110, it may be included in the warning tab. If a sensor is in need of maintenance, it may be included in the issues detected tab. A user may select the tabs to see which sensors 112 are listed in each category so that issues or warnings can be addressed. The dashboard similarly includes a gateway health window 2506 showing similar information for each gateway 202. The dashboard 2502 also includes a map 2510 that shows a layout 2512 of a worksite with a sensor icon 2514 for each sensor 112 and a gateway icon 2516 for each gateway 202. The sensor icons 2514 and gateway icons 2516 may be color coded to indicate whether the corresponding sensor 112 or gateway 202 is fully operational or whether it has warnings or issues detected.

Figure 26:
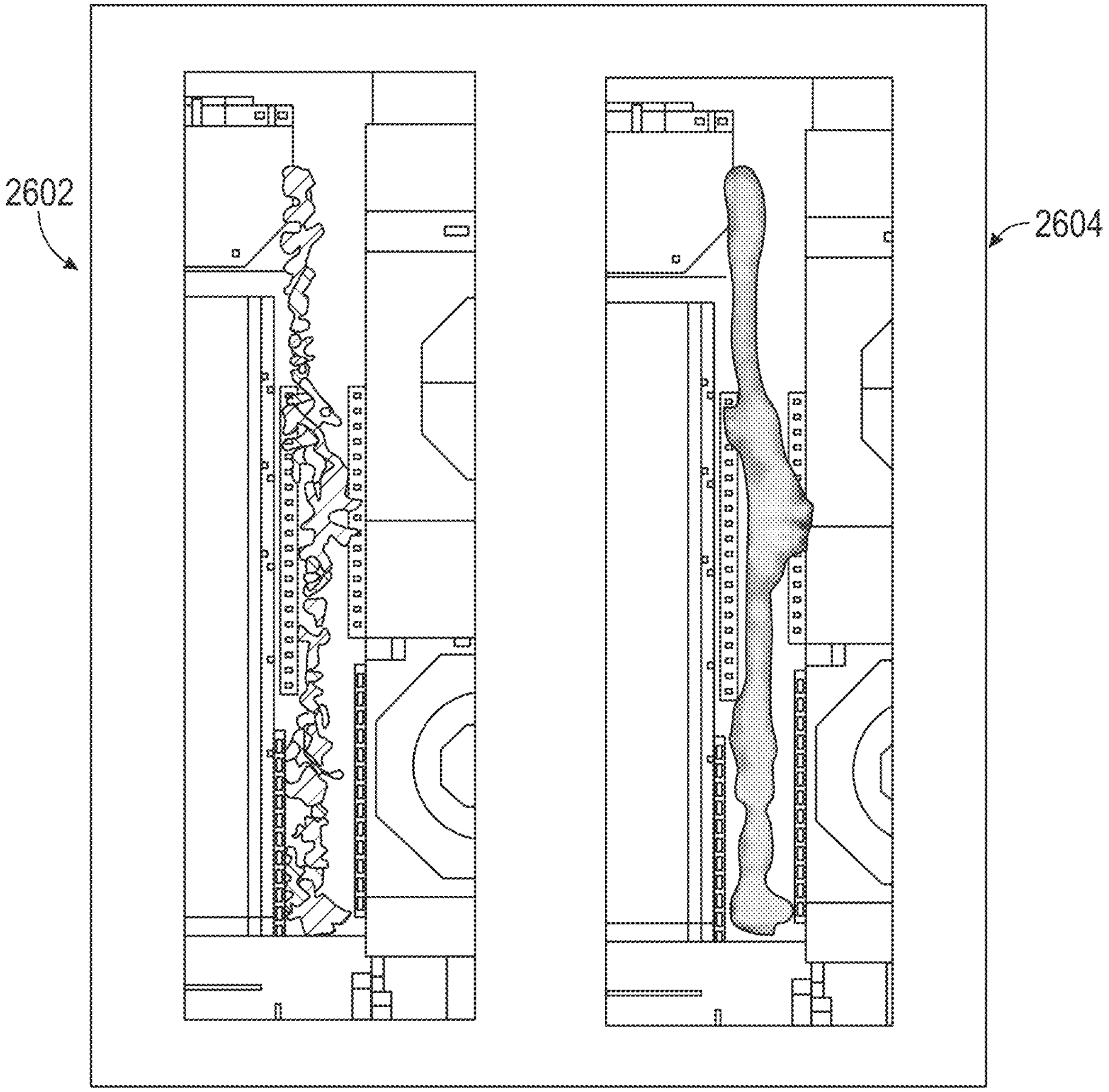
FIG. 26 is a representation of the location timeline and a heatmap of an asset in an asset management system, according to some embodiments.

Referring now to FIG. 26, two data visualizations 2602, 2604 are shown, according to some embodiments. The data visualizations 2602, 2604 may be accessible via the applications described above (e.g., via a smartphone 120 or tablet 124). The first visualization 2602 shows discrete points of locations where an asset was detected over a predetermined time period. The second visualization 2604 shows a heatmap of locations where an asset was detected over a predetermined time period. In some embodiments, the visualizations 2602, 2604 may be for a particular asset or a collection of similar assets. For example, if the assets are identical or similar manufacturing workpieces, the visualizations 2602, 2604 may show the average time that workpieces spent in a particular location, rather than data for one specific workpiece. Using several of the same or similar workpieces rather than a single workpiece can help identify how long each step of a manufacturing process takes and whether any improvements can be made. Changes over time can be used to identify productivity issues. For example, if one workstation on the heatmap 2604 becomes darker over time, it may indicate that the employees in that station are becoming less productive or the tools used in that station are wearing out over time. The manager of the manufacturing site can then perform further investigation to determine the source of the slowdown.

In some embodiments, the data visualizations 2602, 2604 may include overlaying the tracking data on an up-to-date image of the worksite, rather than a diagram of the worksite or a static image of the worksite. For example, a photograph of the worksite may be taken periodically (e.g., daily, hourly, every minute, etc.) or on-demand while the data from the tracking devices is received. Alternatively or additionally, a video stream of the worksite may be recorded. The photograph or video may be taken by static cameras placed at elevated locations on the worksite or a drone (e.g., a quad-copter drone, an unmanned aerial vehicle), may be flown above the worksite and take overhead pictures of the worksite. The photographs may provide additional information that can be used to contextualize the movements of the tracked assets. For example, a large truck not being tracked by the system may block the normal path of assets across a worksite from a first location to a second location. The system may then determine an optimal path to the second location taking into account the blocked path. The system may use image processing techniques to identify objects that may not be tracked by the system, for example, assets owned by third parties that are not connected to the system via an asset tag or other wireless connection.

Artificial intelligence may be used to predict future movements and behavior patterns based on changes in the heatmap and other tracking data. The system can execute a machine learning model that is configured or trained to predict future movements of assets on the worksite. The machine learning model can be a support vector machine, a neural network, a random forest algorithm, etc. For example, the asset tracking data, as well as the overhead photographs, can be input into the machine learning model, and the system can execute the machine learning model, applying learned weights and/or parameters to the tracking data to output predicted future movements of the assets. New tracking and image data can periodically or continuously be provided to the machine learning model. Over time, the machine learning model can be repeatedly executed to predict future movements of assets within the warehouse.

The machine learning model may be trained using supervised, semi-supervised, or unsupervised training methods. For example, a user can input labeled training data into the model. The labeled training data can include ground truth information regarding the movements of assets on the worksite including the location of the assets before and after the movements. The machine learning model may output predictions of movements for the items based on the input data, which may be compared to the recorded tracking information. The machine learning model can be trained using a loss function and backpropagation techniques, such as based on differences between the tracked movements and the labeled training data. The machine learning model can be trained in this manner until it is determined that the machine learning model is accurate to a threshold (e.g., an accuracy threshold). Responsive to determining that the machine learning model is accurate to within the threshold, the machine learning model can be deployed to predict future movements of assets on the worksite in real-time. As discussed above, the model may be continuously or periodically updated and trained with new tracking information. Referring again to the example discussed above, the system may determine based on the tracking measurements and photographs that the large truck blocking the path has been present in that location every morning from 9:00 am to 11:00 am. The machine learning model may update to expect that the truck will be present each morning in the future between 9:00 am to 11:00 am. The system may identify a new route from the first location to the second location that will be recommended between 9:00 am to 11:00 am, while a different, primary route may be recommended outside of those hours. On a specific morning, the system may receive an updated drone photograph indicating that the truck is not present and may revise the recommended route based on the path not being presently blocked. If the truck is not present for several days in a row, the model may be updated to predict that the path will no longer be blocked between 9:00 am to 11:00 am and may recommend the primary route during those hours. Thus, the system may predict the optimal route from the first location to the second location while adapting to changes in the environment in real-time.

Figure 27:
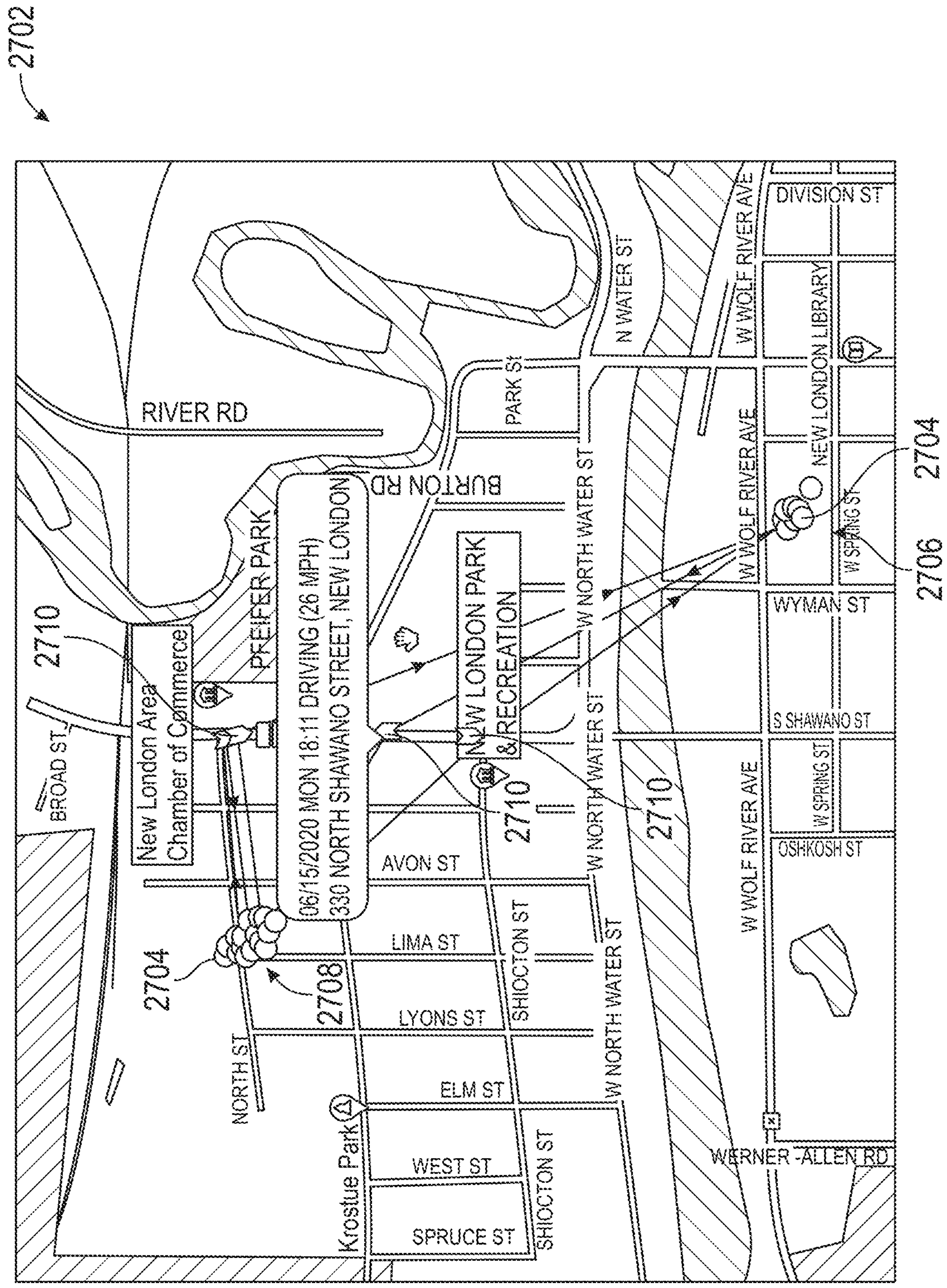
FIG. 27 is a representation of a longer-range outdoor tracking display in an asset management system, according to some embodiments.

FIG. 27 is an additional dashboard 2702 illustrating assets on multiple worksites, according to some embodiments. Various asset icons 2704 are shown at two worksites 2706, 2708. Additional asset icons 2710 are shown representing assets (e.g., vehicles) moving between the worksites 2706, 2708 or elsewhere in the vicinity of the worksites 2706, 2708. LoRa WAN sensors 902 may be used to track the assets at longer distances outside of the worksites 2706, 2708.

Figure 28:
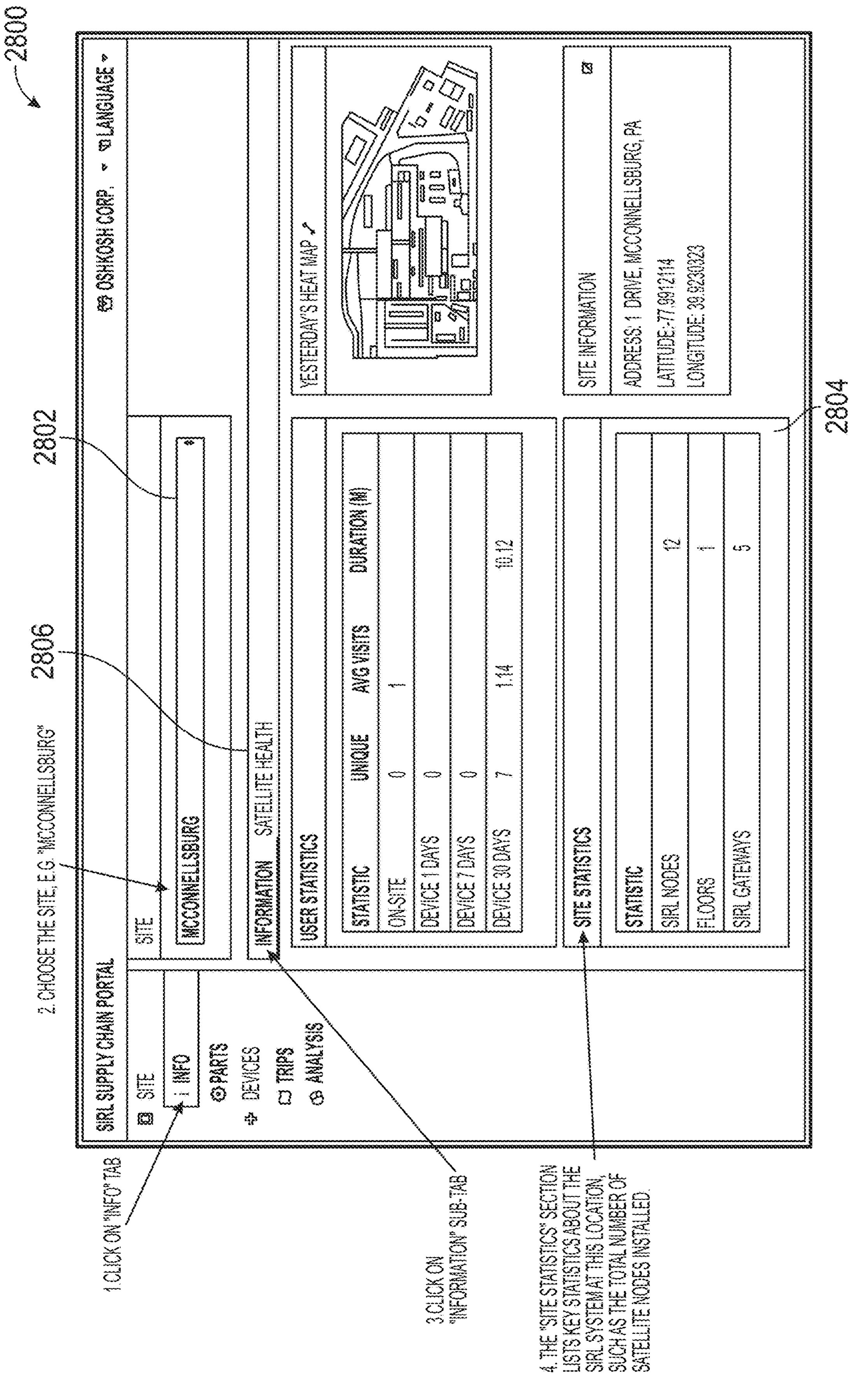
FIGS. 28-32 are representations of graphical user interfaces within an asset management system application, according to some embodiments.
Figure 29:
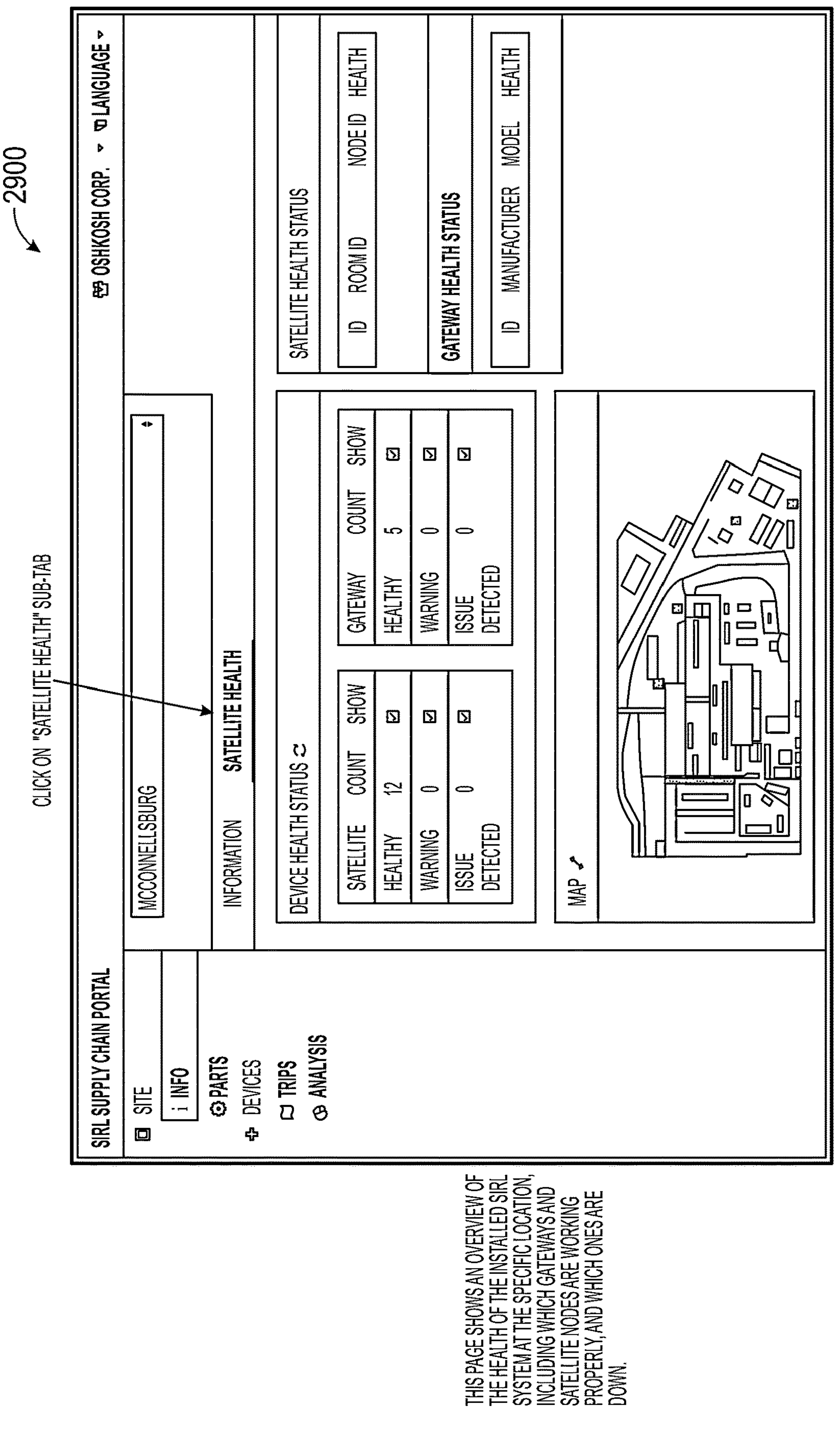
Figure 30:
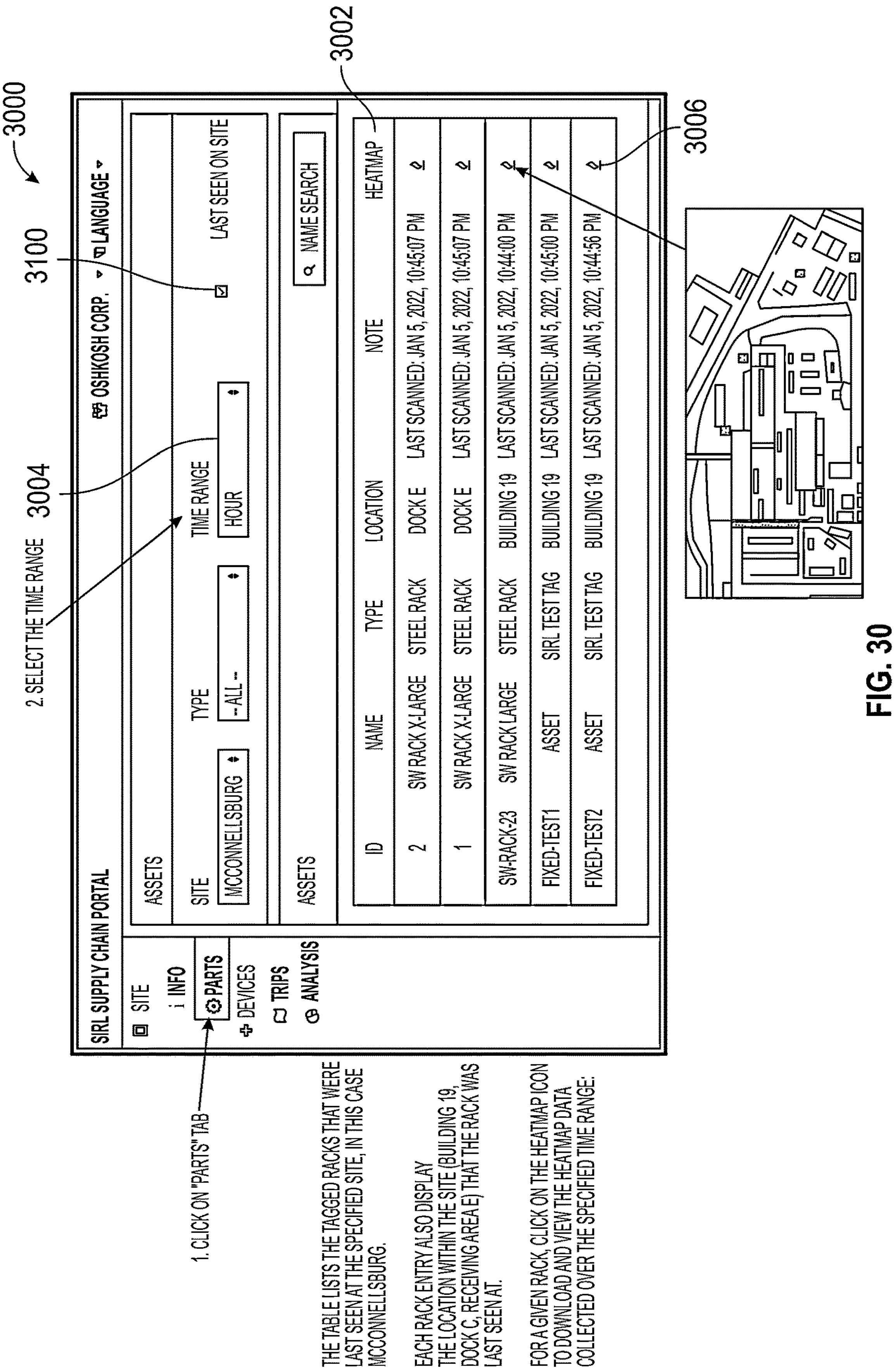
Figure 31:
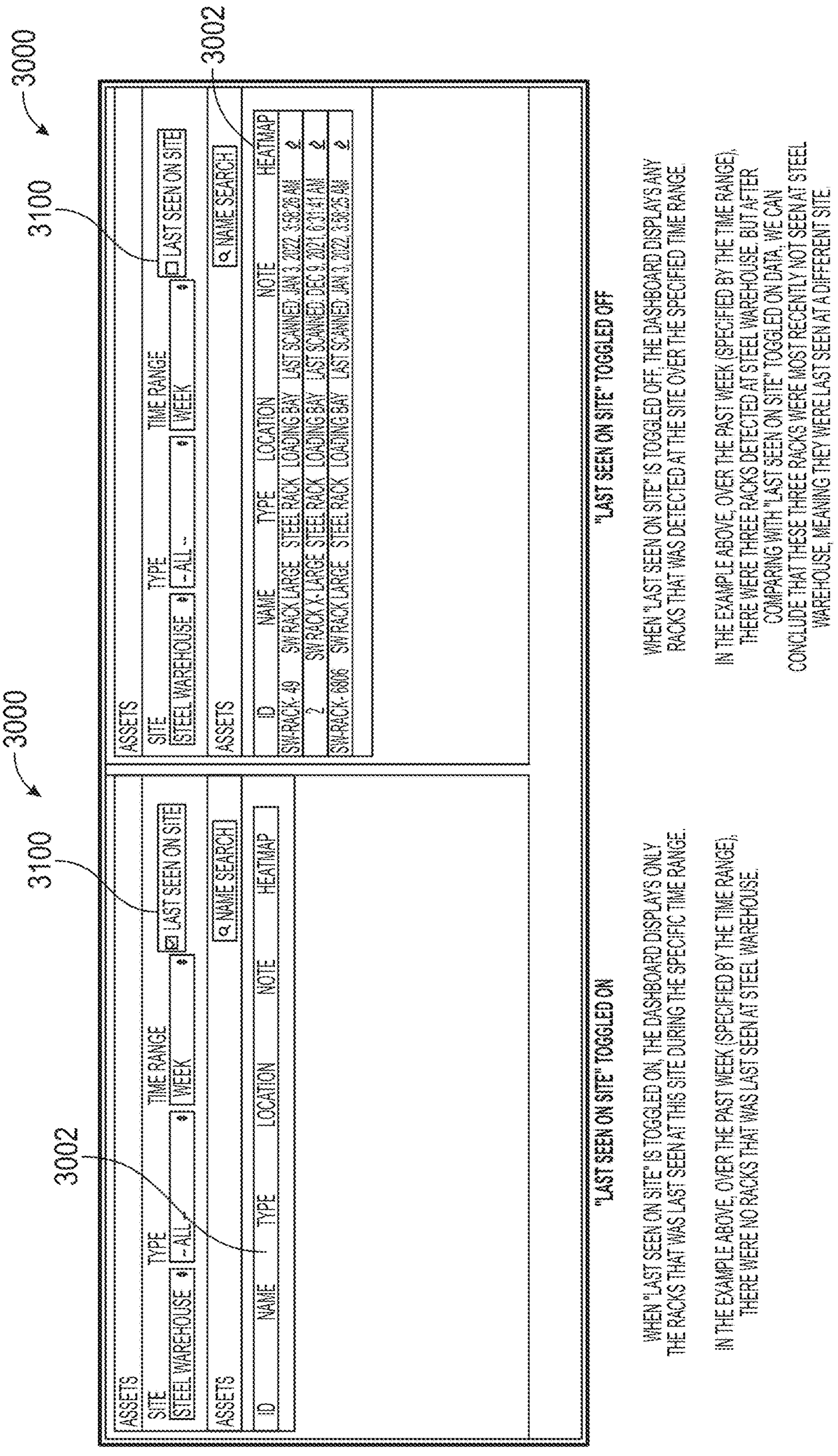
Figure 32:
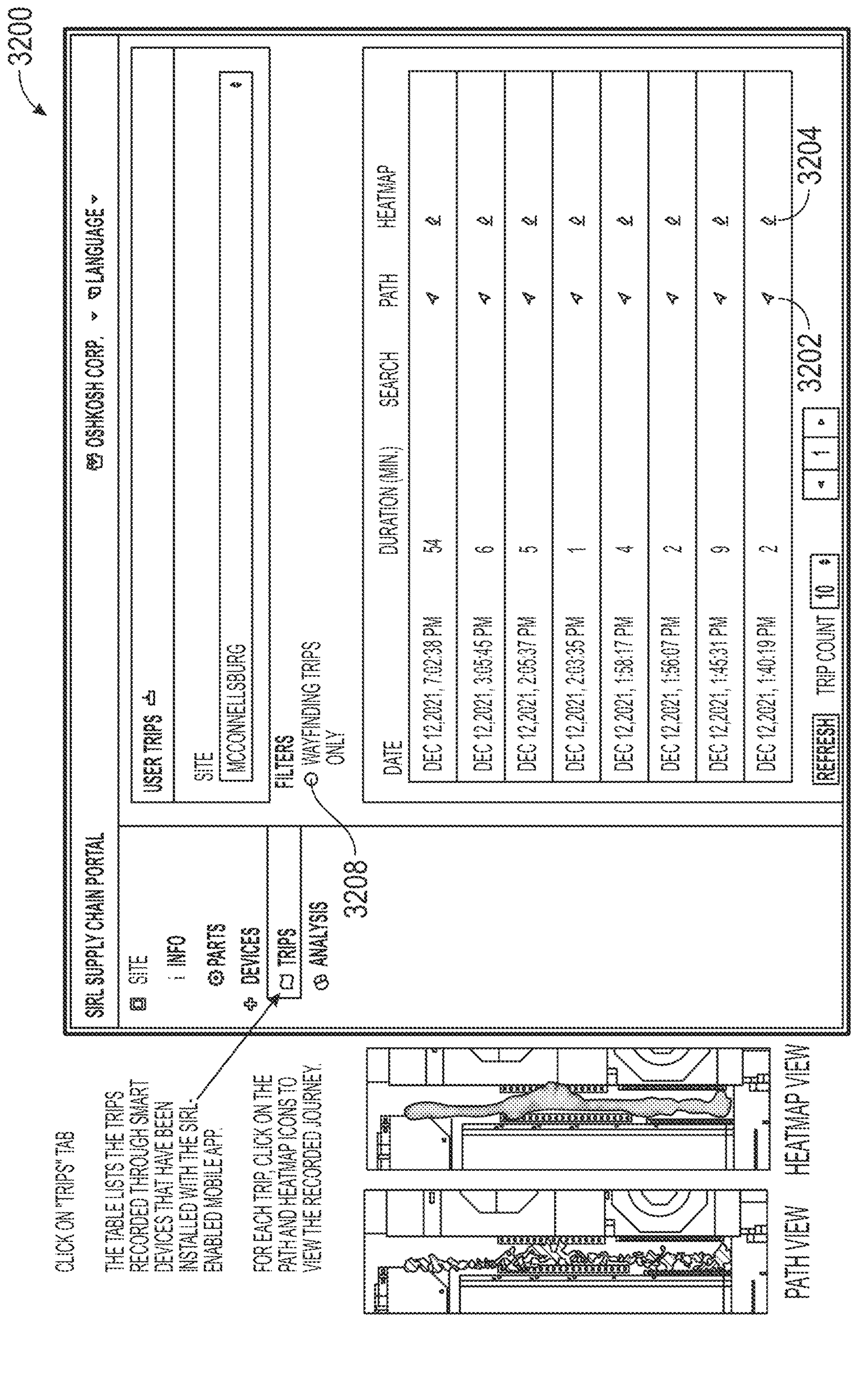

FIGS. 28-32 illustrate an application for interacting with the asset management system 100 similar to the application shown in FIGS. 23-27, according to some embodiments. FIG. 28 shows an info page 2800 where a user can select a worksite from a worksite dropdown 2802 and can review statistics relating to the equipment in the asset location system 110 in the site statistics window 2804. The user can select the satellite health button 2806 to view the operational statuses of the sensors 112 and gateways 202. FIG. 29 shows the satellite health page 2900 (e.g., similar to the dashboard 2502) where the operational statuses of the sensors 112 and gateways 202 can be monitored after selecting the satellite health button 2806. FIG. 30 shows an asset info page 3000 (e.g., similar to the dashboard 2402) including a list of assets 3002 on the selected worksite. The user may select a time range from the time range dropdown 3004 to see all assets that have been detected on the worksite within the selected time range. The user may select a heatmap button 3006 to view a heatmap (e.g., similar to the heatmap 2604) for the selected asset within the selected time range. FIG. 31 illustrates the functionality of a last seen on site toggle 3100 on the asset info page 3000, according to some embodiments. When the last seen on site toggle 3100 is selected, the list of assets 3002 includes only the assets most recently seen on the selected worksite. Assets that were more recently detected on a different worksite are excluded from the list of assets 3002. When the last seen on site toggle 3100 is deselected, all assets detected at the selected worksite within the selected time range are included in the list of assets 3002, even if they were more recently detected on a different worksite. FIG. 32 illustrates a trips dashboard 3200, according to some embodiments. The trips dashboard 3200 shows the movement of mobile devices (e.g., smartphone 120, tablet 124, etc.) on the worksite. Each trip taken by a mobile device is recorded on a list of trips 3202. A user may select a path icon 3204 to view the path of the mobile device (e.g., similar to the visualization 2602) or may select a heatmap icon 3206 to view a heatmap of the location of the mobile device (e.g., similar to the heatmap 2604). The user may select the wayfinding trips filter 3208, which may cause the list of trips 3202 to show only trips in which the application provided wayfinding directions to the user (e.g., directions to a specific asset).

System Functionalities

Figure 33:
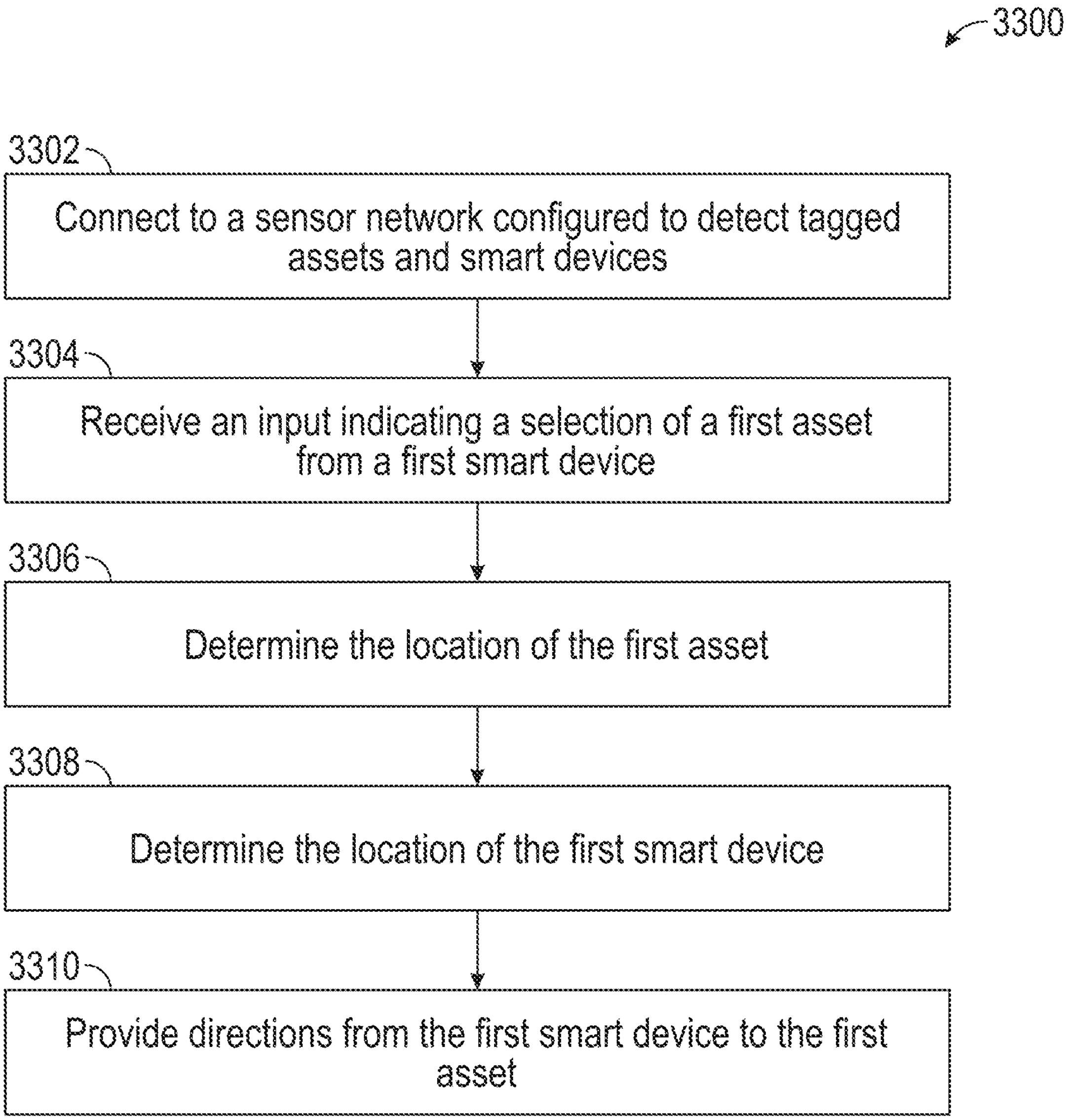
FIG. 33 is a flow diagram of a method 3300 of locating an asset, according to some embodiments.

Referring now to FIG. 33, a method 3300 of locating an asset is shown, according to some embodiments. The method may be performed, for example, by the local controller 130, a smart device such as a smartphone 120 or tablet 124, or by a cloud computing system 140 of the asset management system 100. At operation 3302 of the method 3300, a connection is made to a sensor network (e.g., asset location system 110). The sensor network may include a plurality of sensors (e.g., sensors 112) that are configured to detect assets (e.g., assets 114 coupled to tracking tags 116, etc.) and smart devices (e.g., smartphones 120, tablets 124, etc.). For example, the sensors may detect radio frequency signals from the tracking tags and the smart devices. The sensors may be configured to detect a signal strength from the tracking tags 116. A stronger signal from a tracking tag 116 may correlate to the tracking tag being closer to a sensor. Thus, the distance from a tracking tag 116 to a sensor may be estimated based on the signal strength (e.g., the RSSI). At operation 3304 of the method 3300, an input is received from a first smart device (e.g., a smartphone 120) indicating a selection of a first asset. The first asset may be selected from a list of assets that may be narrowed by category and subcategory (e.g., asset type, operational status, asset weight, etc.). In some embodiments, a user may search for the first asset via search field. At operation 3306 of the method 3300, the location of the first asset is determined based on sensor data from the sensor network. For example, multiple sensors 112 may detect the presence of a tracking tag 116 coupled to an asset 114, and a RSSI for the tracking tag 116 may be determined for each sensor 112 that detects the tracking tag 116. The location of the tracking tag 116 may be determined based on the RSSIs from each sensor 112 that detects the tracking tag 116. For example, a strong RSSI indicates that the tracking tag 116 is close to the sensor 112 and a weak RSSI indicates that the tracking tag 116 is farther from the sensor 112. With data from enough sensors 112, the specific location of the tracking tag can be determined.

In some embodiments, the location of each smart device or other asset with a tracking tag may be continuously or periodically determined and stored in a database. Thus, when an asset is selected at operation 3304, the database can be queried to determine the location of the asset. Additionally or alternatively, as discussed above, new measurements from the sensors 112 can be used to detect the current location of the asset. If the asset cannot be detected at the time of the request, a message may be displayed by the smart device indicating that the asset cannot be found, and the most recent location stored in the database can be provided. In still other embodiments, the selected asset may not include a tracking tag or any way for the sensors 112 to detect the location of the asset at all. Instead, the location may be determined based on predefined storage locations. For example, a warehouse may include various assets that are stored in specific storage locations (e.g., on a specific shelf in a specific bay in a specific aisle in a row of aisles). In this case, determining the location of the asset may include identifying the specific storage location by querying a database of storage locations rather than receiving data from the sensors 112. If the asset is stored in the correct location, identifying the storage location will also identify the location of the asset. At operation 3308 of the method 3300, the location of the first smart device is determined. The location of the first smart device can be determined in essentially the same way that the location of the first asset was determined in operation 3306. At operation 3310 of the method 3300, directions from the first smart device to the first asset are provided to the first smart device. The directions may be displayed as a list (e.g., turn-by-turn directions) and/or as a map with an arrow or path indicator highlighting the path from the smart device to the selected asset. In some embodiments, any other means of wayfinding can be provided to the smartphone to guide the user to the determined location of the asset. Using the method 3300, a user may choose an asset that the user wishes to find, and directions to the asset may be provided via the smart device. In some embodiments, a GUI may be generated and provided to the first smart device. The GUI may include a map showing the location of the smart device and the asset, as well as directions from the location of the smart device to the location of the asset.

Figure 34:
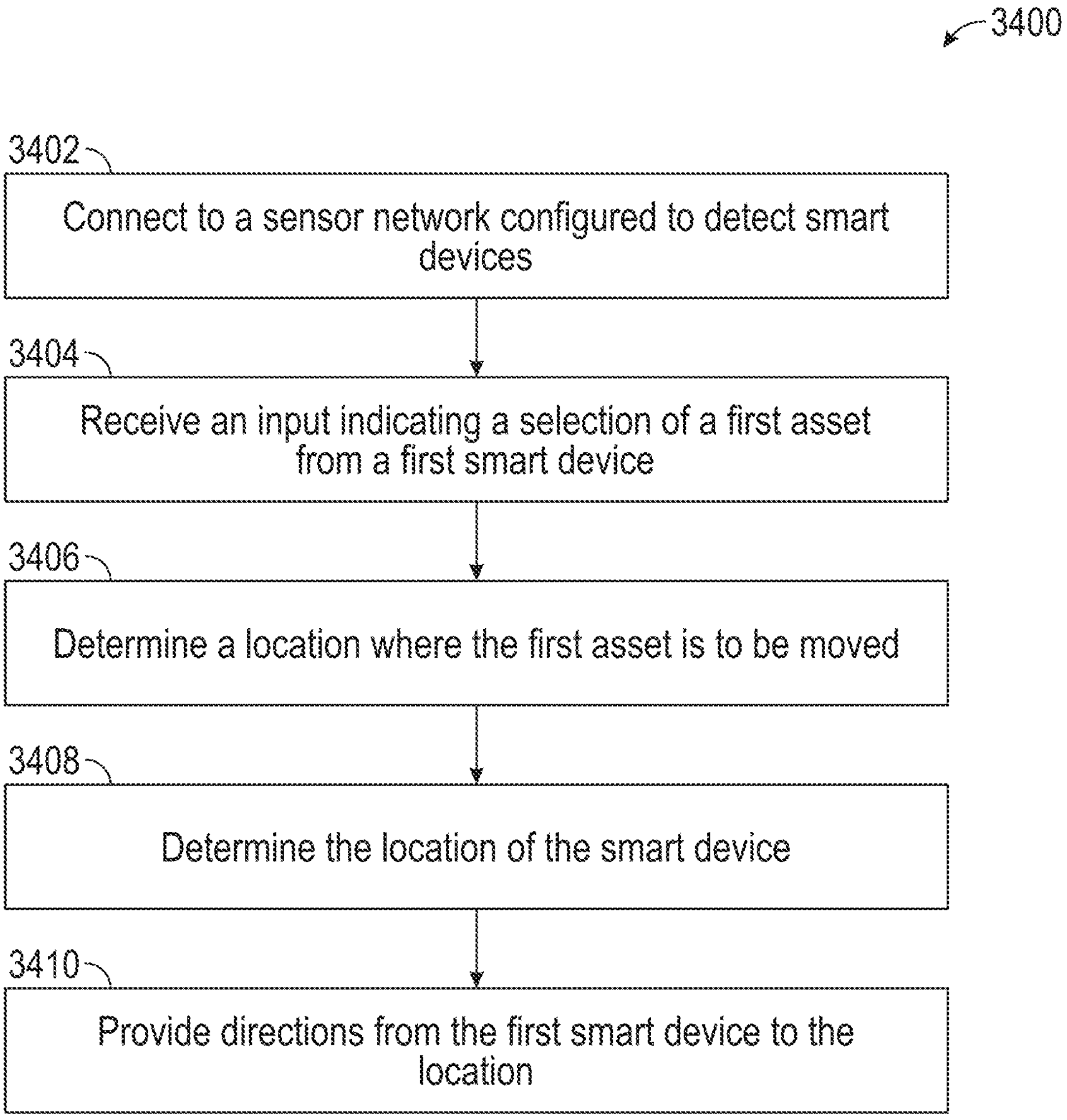
FIG. 34 is a flow diagram of a method 3400 of moving an asset, according to some embodiments.

Referring now to FIG. 34, a method 3400 of moving an asset is shown, according to some embodiments. The method may be performed, for example, by the local controller 130, a smart device such as a smartphone 120 or tablet 124, or by a cloud computing system 140 of the asset management system 100. At operation 3402 of the method 3400, a connection is made to a sensor network (e.g., asset location system 110). The sensor network may include a plurality of sensors (e.g., sensors 112) that are configured to detect smart devices (e.g., smartphones 120, tablets 124, etc.). For example, the sensors may detect radio frequency signals from the smart devices. At operation 3404 of the method 3400, an input is received from a first smart device indicating a selection of a first asset. In some embodiments, the first asset may be a machine, a tool, a vehicle, a manufacturing workpiece, or another piece of equipment. In some embodiments, the first asset may not include a tracking tag (e.g., a tracking tag 116). However, the first asset may be identifiable by name, by asset type (e.g., a wrench, a hammer, a forklift, etc.), or by an asset number (e.g., a serial number). The first asset may be selected by a user using the first smart device. For example, the user may enter the asset name or serial number into a search field and may select the first asset from a list of search results. In some embodiments, the user may be able to use a camera of the smart device to scan a serial number or barcode on the first asset to indicate the selection of the asset. At operation 3406 of the method 3400, a location where the first asset is to be moved is determined. For example, a user may be relocating tools to their workstations at the end of a workweek. A database relating tools to workstations may be queried to determine the workstation where the selected tool belongs. In other embodiments, the first asset may be a workpiece that is moved from station to station where different machining and coating processes may be performed. A database indicating which processes have been performed on a specific workpiece may be queried, and the next station in the manufacturing process may be determined to be the location where the workpiece is to be moved. For example, a workpiece may have a laser cutting process, a hole tapping process, and an anodizing process. The database may indicate that the laser cutting process and the hole tapping process have already taken place, and it may be determined that the location that the workplace is to be moved to is the anodizing station. At operation 3408 of the method 3400, the location of the first smart device is determined. Operation 3408 may be the same as or similar to operation 3308. At operation 3410 of the method 3400, directions from the first smart device to the determined location are provided to the first smart device. As discussed above with respect to operation 3310 of the method 3300, the directions may be provided in the form of turn-by-turn directions, a map with an arrow or path indicator leading to the determined location, or any other method that can be used to guide the user to the determined location. Thus, the user may receive the directions via the smart device and use them to bring the first asset to the determined location. Using the method 3400, a user may identify an asset, and directions to a location to which the asset is to be moved may be provided via the smart device. In some embodiments, a GUI may be generated and provided to the first smart device. In some embodiments, the GUI may include a map showing the location of the smart device and the asset.

Figure 35:
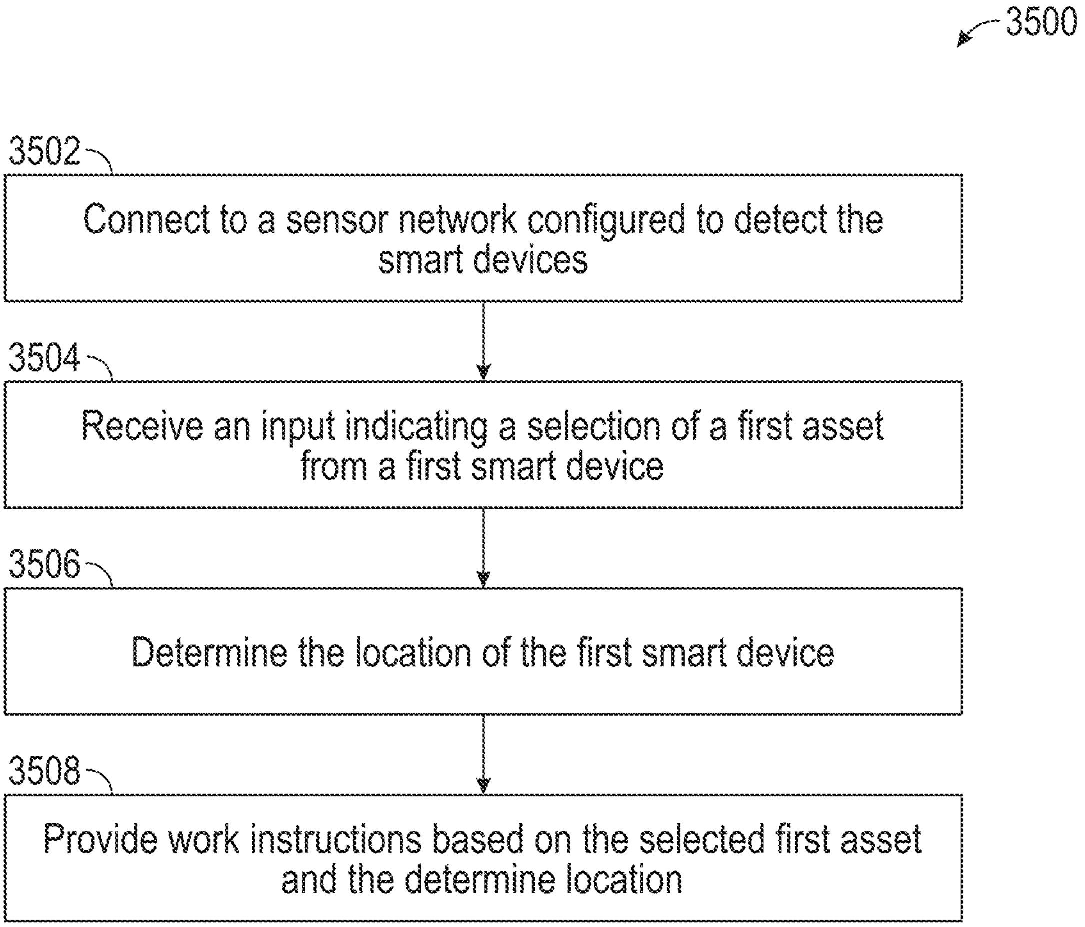
FIG. 35 is a flow diagram of a method 3500 of receiving location-based work instructions, according to some embodiments.

Referring now to FIG. 35, a method 3500 of receiving location-based work instructions is shown, according to some embodiments. The method may be performed, for example, by the local controller 130, a smart device such as a smartphone 120 or tablet 124, or by a cloud computing system 140 of the asset management system 100. At operation 3502 of the method 3500, a connection is made to a sensor network (e.g., asset location system 110). The sensor network may include a plurality of sensors (e.g., sensors 112) that are configured to detect smart devices (e.g., smartphones 120, tablets 124, etc.). For example, the sensors may detect radio frequency signals from the smart devices. At operation 3504 of the method 3500, an input is received from a first smart device indicating a selection of a first asset. Operation 3504 may be the same as or similar to operation 3404. At operation 3506 of the method 3500, the location of the first smart device is determined. Operation 3506 may be the same as or similar to operations 3308 and 3408. At operation 3508 of the method 3500, work instructions are provided based on the selected first asset and the location. For example, a user may identify a workpiece that requires a manufacturing process including a laser cutting process, a hole tapping process, and an anodizing process. If the location of the first smart device is determined to be a hole tapping station, hole tapping instructions specific to the identified workpiece may be provided. In another example, the user may identify a forklift as the selected first asset and the location may be determined to be a storage area. The instructions provided may be to lift a specific pallet of material in the storage area using the forklift and to bring the material to another location. In some embodiments, a GUI including the instructions may be generated and provided to the first smart device. The GUI may include a map indicating the location of the smart device and the destination for the pallet of material and directions to the location. In some embodiments, the work instructions may include moving the selected asset to another location. For example, the user may input the selected asset in operation 3504, and the instructions provided in operation 3508 may be to take the selected asset to a second location and use the asset in that location. The instructions may include directions to the second location and/or a map guiding the user to the second location. Upon arriving at the second location, the GUI may update from showing the directions or map to showing instructions for using the asset at the second location.

Figure 36:
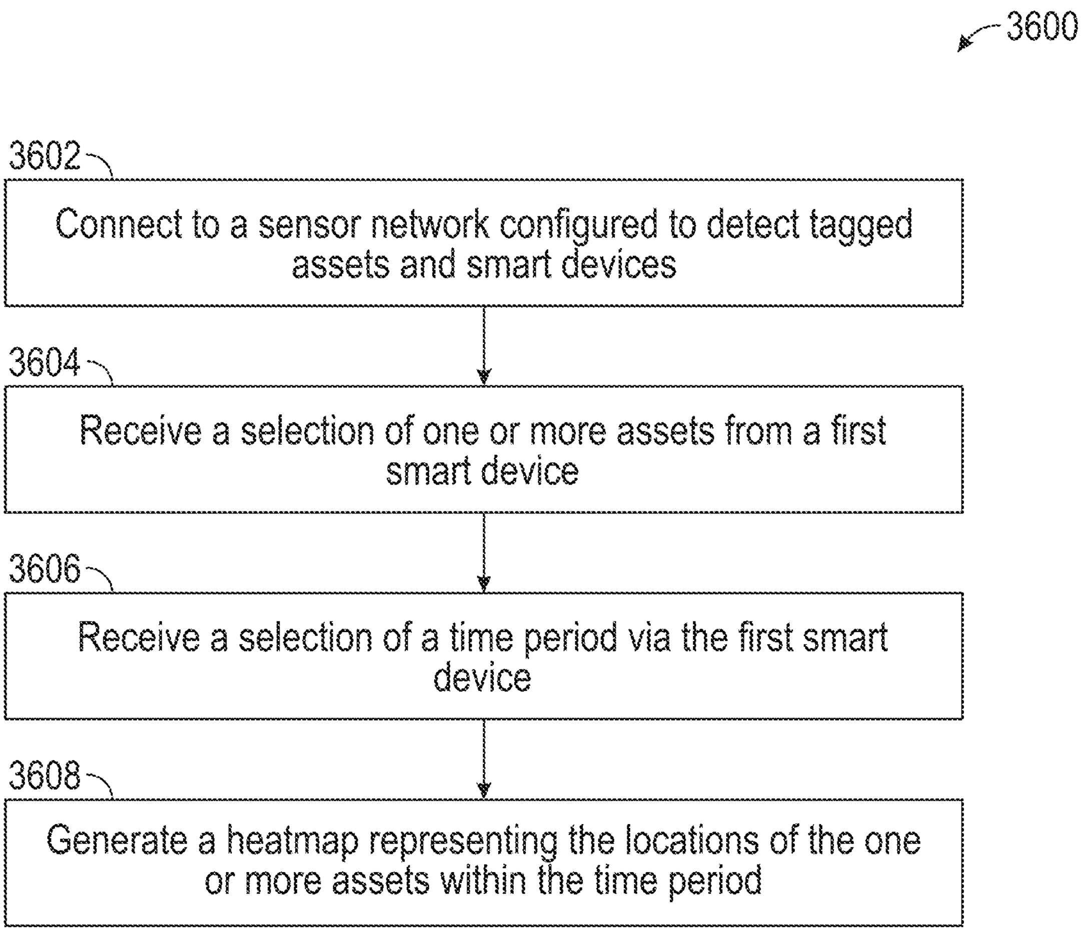
FIG. 36 is a flow diagram of a method 3600 of generating an asset tracking heatmap, according to some embodiments.
Figure 37:
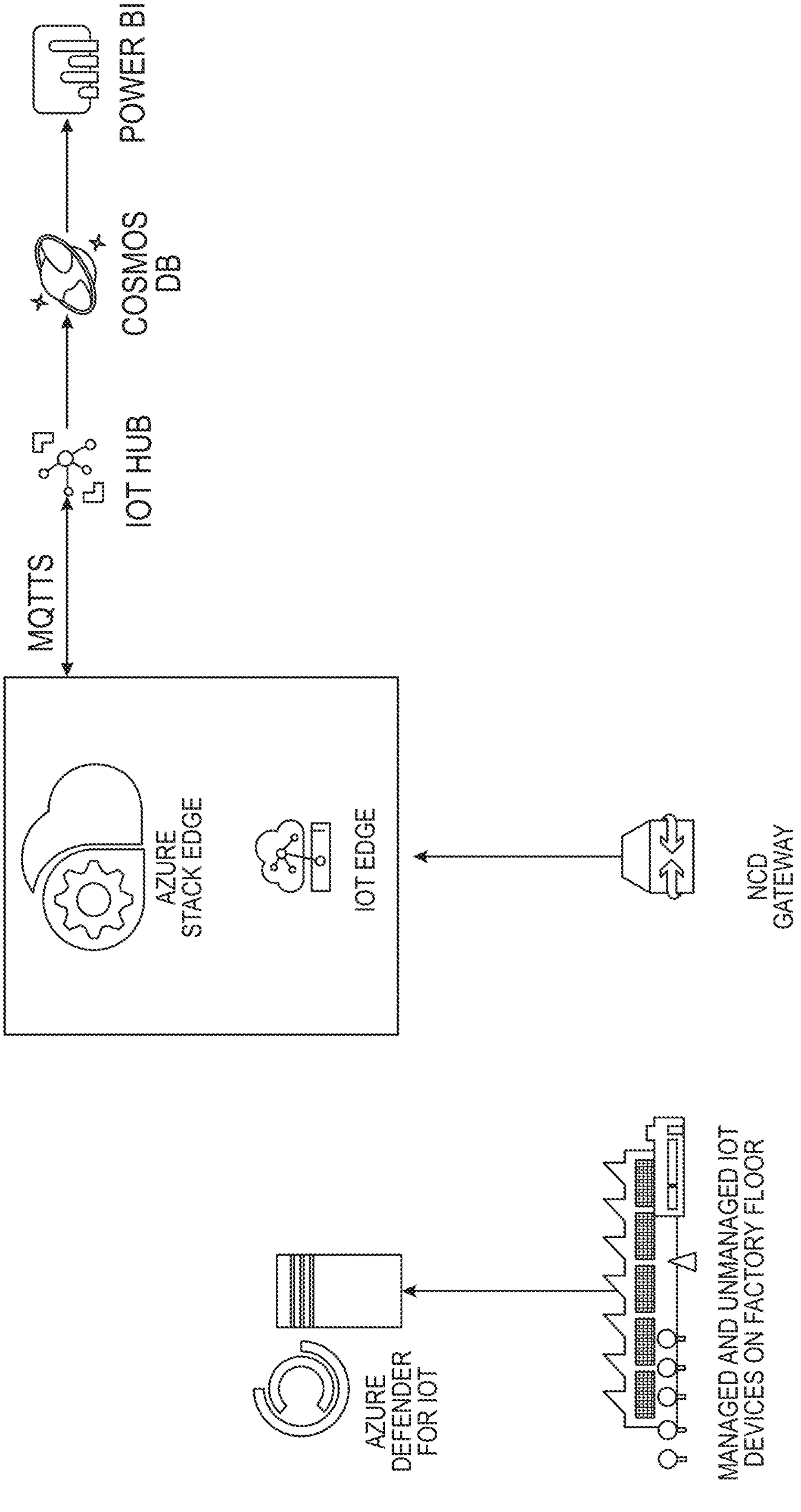
FIGS. 37-50 are schematic representations of asset management systems, according to some embodiments.
Figure 38:
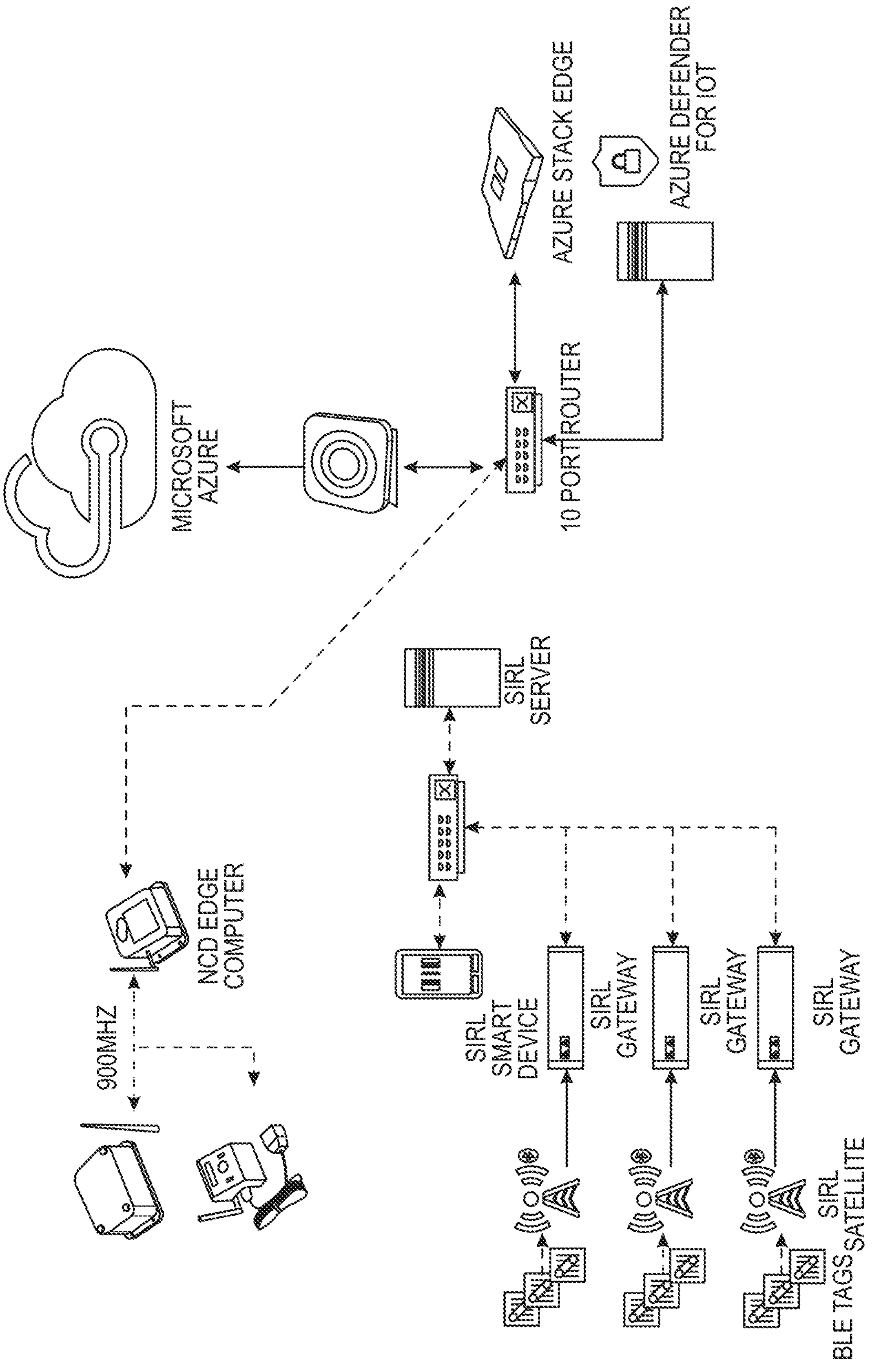
Figure 39:
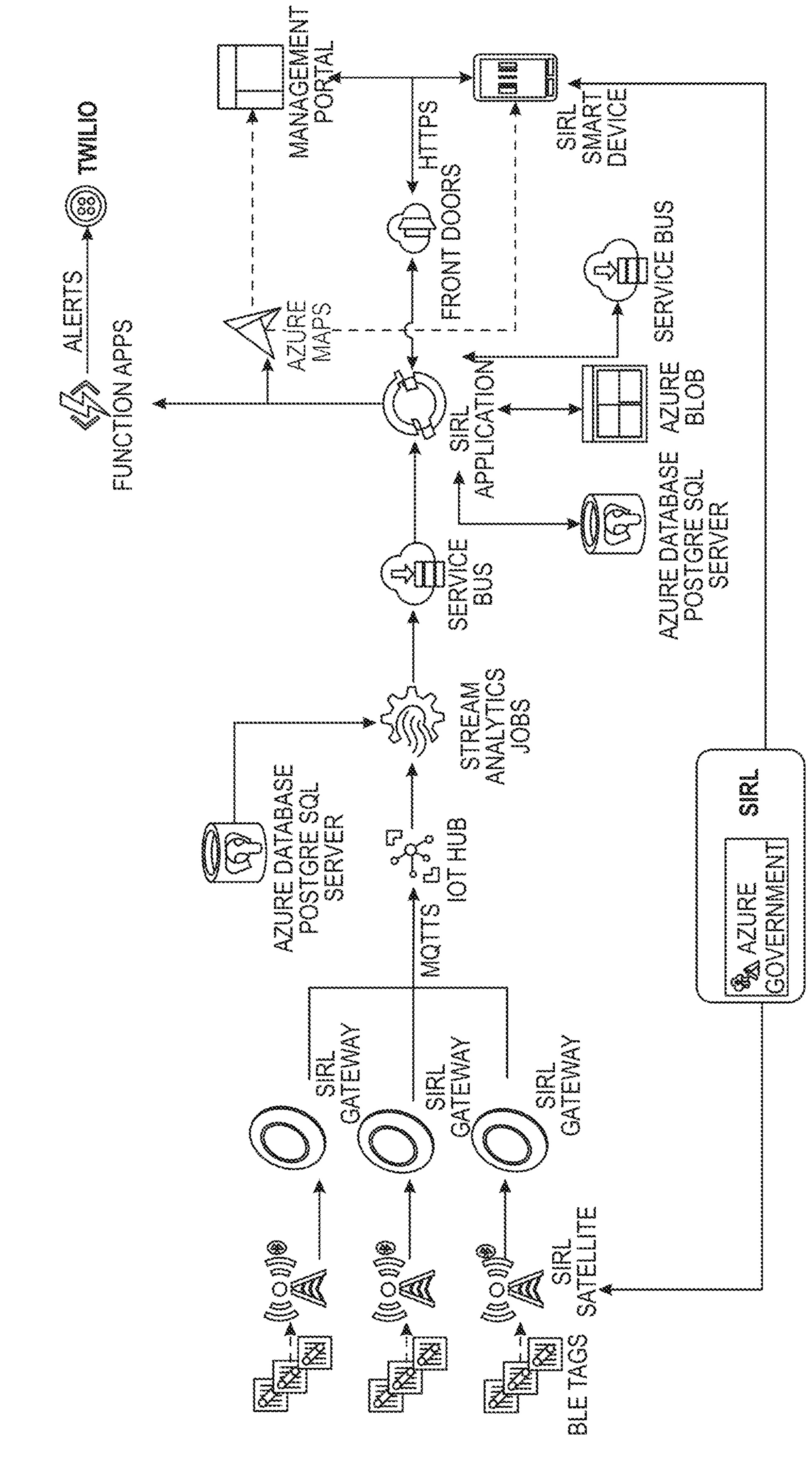
Figure 40:
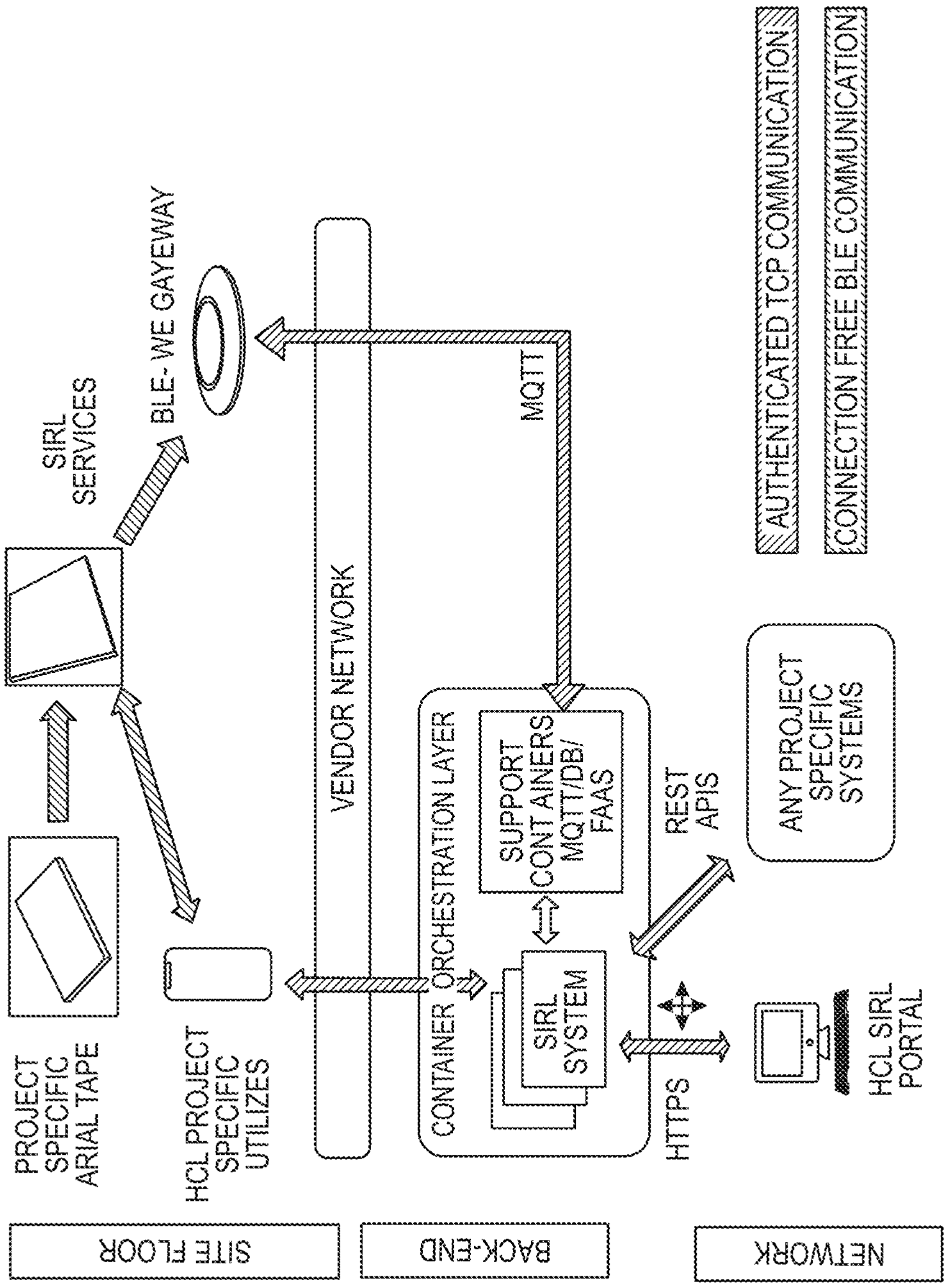

Referring now to FIG. 36, a method 3600 of generating an asset tracking heatmap is shown, according to some embodiments. The method may be performed, for example, by the local controller 130, a smart device such as a smartphone 120 or tablet 124, or by a cloud computing system 140 of the asset management system 100. At operation 3602 of the method 3600, a connection is made to a sensor network (e.g., asset location system 110). The sensor network may include a plurality of sensors (e.g., sensors 112) that are configured to detect assets (e.g., assets 114 coupled to tracking tags 116, etc.) and smart devices (e.g., smartphones 120, tablets 124, etc.). For example, the sensors may detect radio frequency signals from the tracking tags and the smart devices. The locations of the assets may be determined based on the signals and continuously monitored. At operation 3604 of the method 3600, a selection of one or more assets is received from a first smart device (e.g., a smartphone 120). For example, a user may select a group of similar workpieces or tools from a list of assets, or may search a list of assets by asset name, asset type, or asset number, etc. At operation 3606 of the method 3600, a selection of a time period is received from a first smart device. For example, a user may select a time period such as the past week, the past hour, a specific date, a specific range or list of dates, etc. At operation 3608 of the method 3600, a heatmap (e.g., heatmap 2604) is generated (e.g., on a GUI provided to the smart device) representing the locations of the one or more assets within the selected time period. Locations where assets spent more time within the time period may appear darker, while locations where the assets spent little or no time may appear lighter (or vice versa). This heatmap can be used to determine where assets are remaining for long periods of time in order to identify issues and improve efficiency.

Additional Asset Management System Embodiments

FIGS. 37-40 show additional schematic diagrams of asset management systems (e.g., similar to the asset management system 100) including short-range sensors, according to some embodiments.

Figure 41:
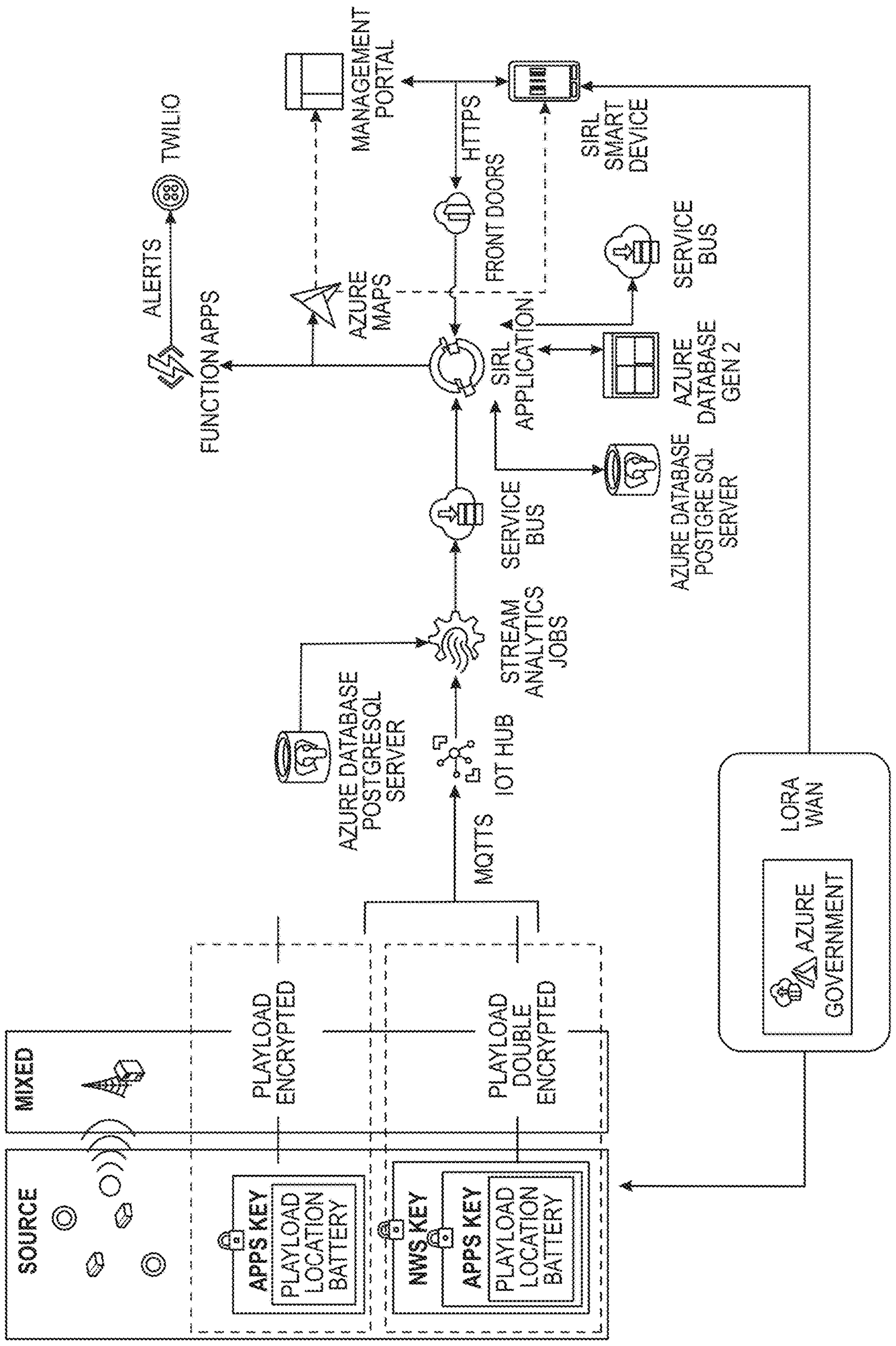
Figure 42:
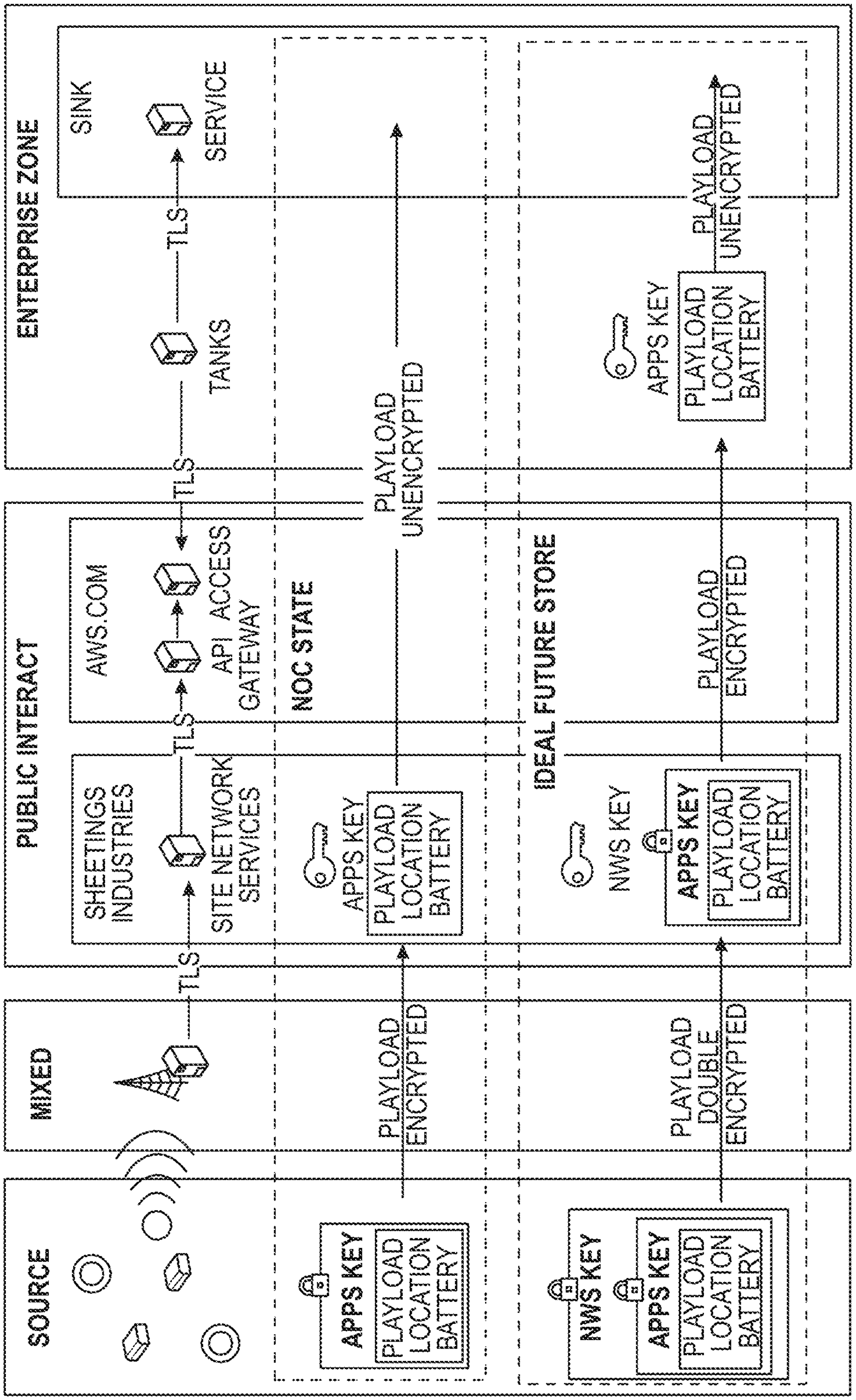

FIGS. 41 and 42 show additional schematic diagrams of asset management systems (e.g., similar to the asset management system 100) including long-range sensors (e.g., LoRa WAN sensors, according to some embodiments.

Figure 43:
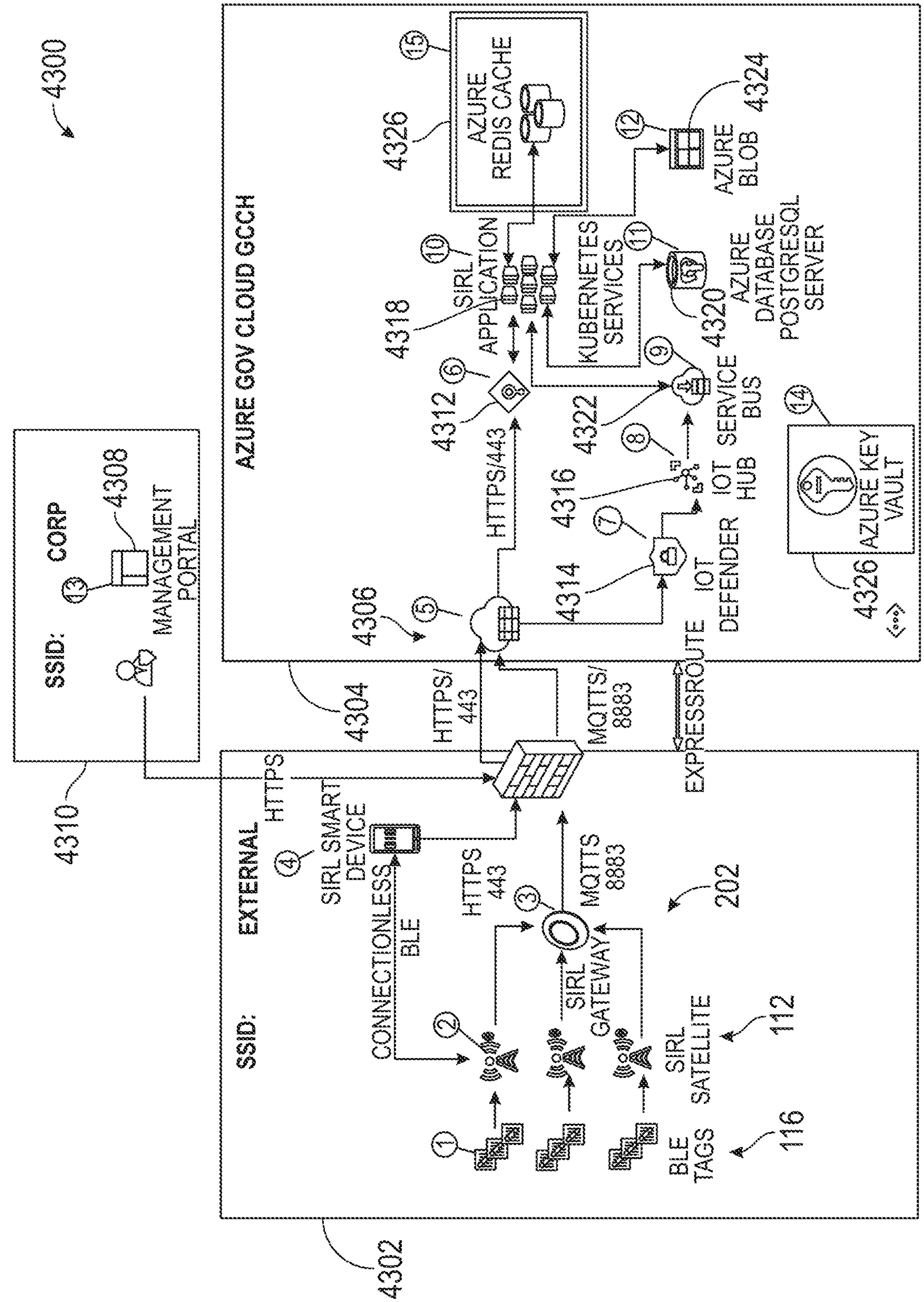
Figure 44:
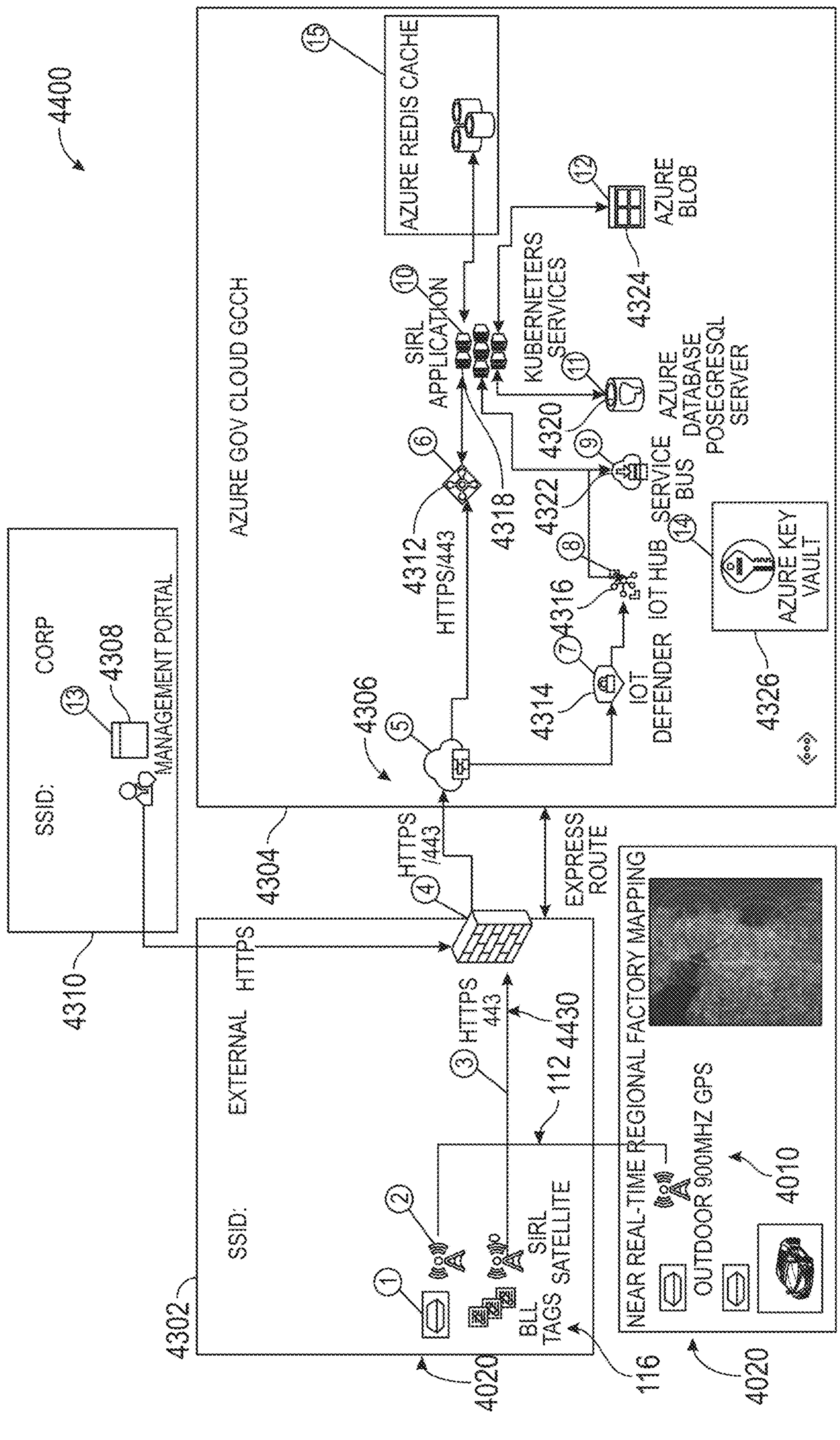

FIG. 43 show a schematic diagram of an asset management system 4300 (e.g., similar to the asset management system 100), according to some embodiments. The system 4300 includes a first service set 4302 including tracking tags 116, sensors 112, and smart devices (e.g., smartphone 120) as described above in a first service set 4302. The computing functions of the system 4300 are performed by components in a second service set 4304, which is separated from the first service set 4302 by a firewall 4306. A management portal dashboard 4308 is provided in a third service set 4310 provides advanced analytics and control functions via one or more dashboards to a user via an application. The second service set 4304 includes a load balancer 4312 and balancing network traffic and an IoT defender 4314 for malware protection. The second service set 4302 further includes an IoT Hub 4316 for managing messages between the management application 4318 and the on-premises assets (e.g., smartphone 120, tablet 124, etc.). The management application 4318 may be deployed to the Azure RedHat OpenShift (ARO) platform, which complements Kubernetes orchestration, simplifies platform support, and enhances container security. The two container types deployed in the Azure Kubernetes Service cluster consist of Backend/Worker Containers that service application requests and listen to IoT traffic, and a Frontend NGINX Container application hosting the Angular App. The second service set 4304 further includes a Post GRE SQL server 4320 for structured storage workloads and a service bus 4322, which provides a common messaging service to handle event and job processing in an asynchronous manner allowing both containers and functions to utilize queuing services as both producers and consumers. The storage device 4324 (e.g., an Azure Blob storage device) stores and retrieves mapping data, image files, etc. The key vault 4326 (e.g., Azure Key Vault or Hashicorp Vault, etc.) will be used to store, track, manage, and rotate security keys/certificates and other services. The Redis Cache 4326 is a data structure store configured for performance improvements.

FIG. 43 shows a schematic diagram of an asset management system 4400 (e.g., similar to the asset management system 4300), according to some embodiments. The asset management system 4440 includes most of the same components as system 4300, but also includes long-range detection sensors 4010 (e.g., LoRa WAN sensors, GPS) for detecting the movement of assets outdoors and between worksites. The assets may include larger, powered tracking tags 4020 that may emit radio frequencies in the range of 900 MHz to be detected by the long-range detection sensors 4010 at distances up to several miles away. The tracking tags 4020 may include short-range communications capability (e.g., via BLE) in addition to long-range communications capability.

Figure 45:
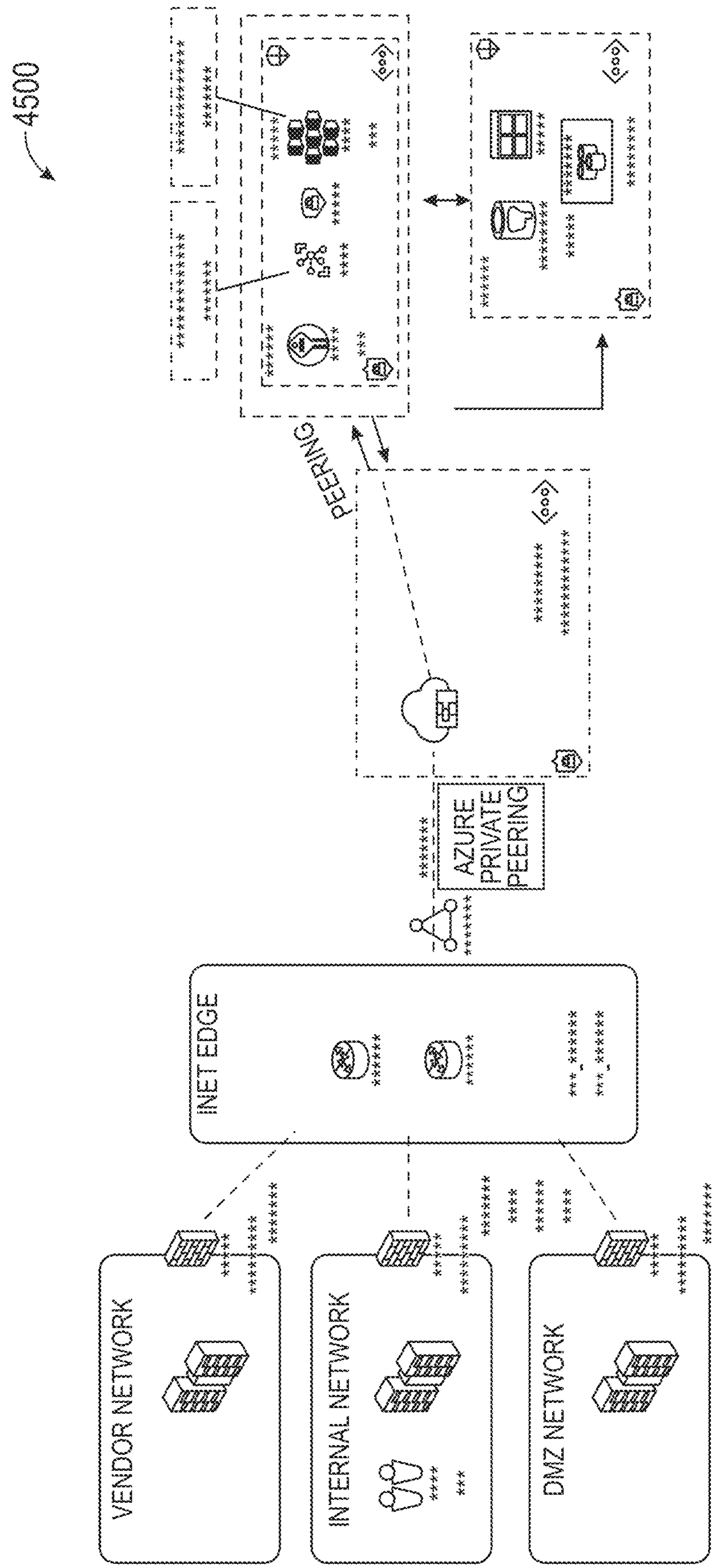
Figure 46:
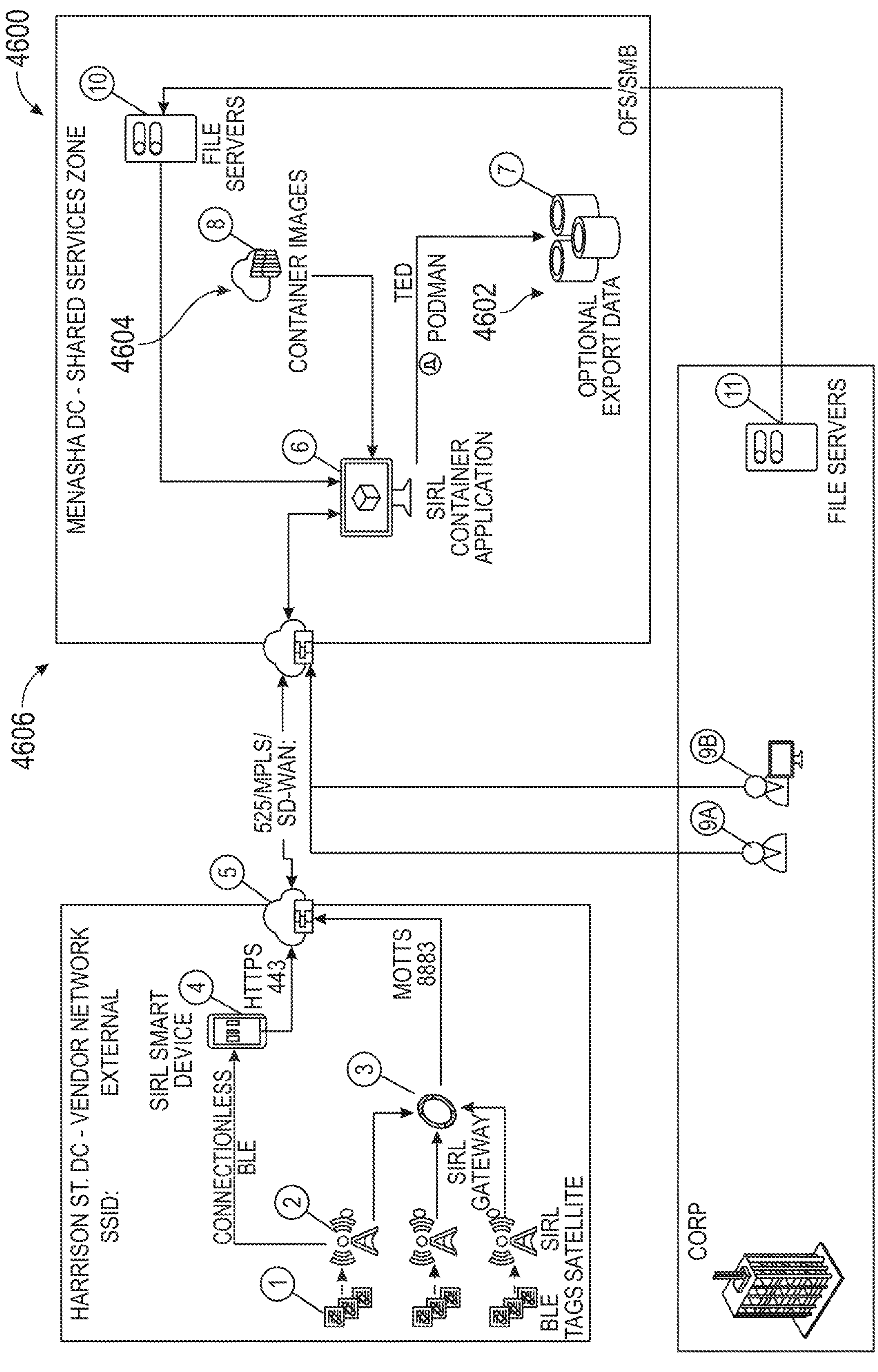
Figure 47:
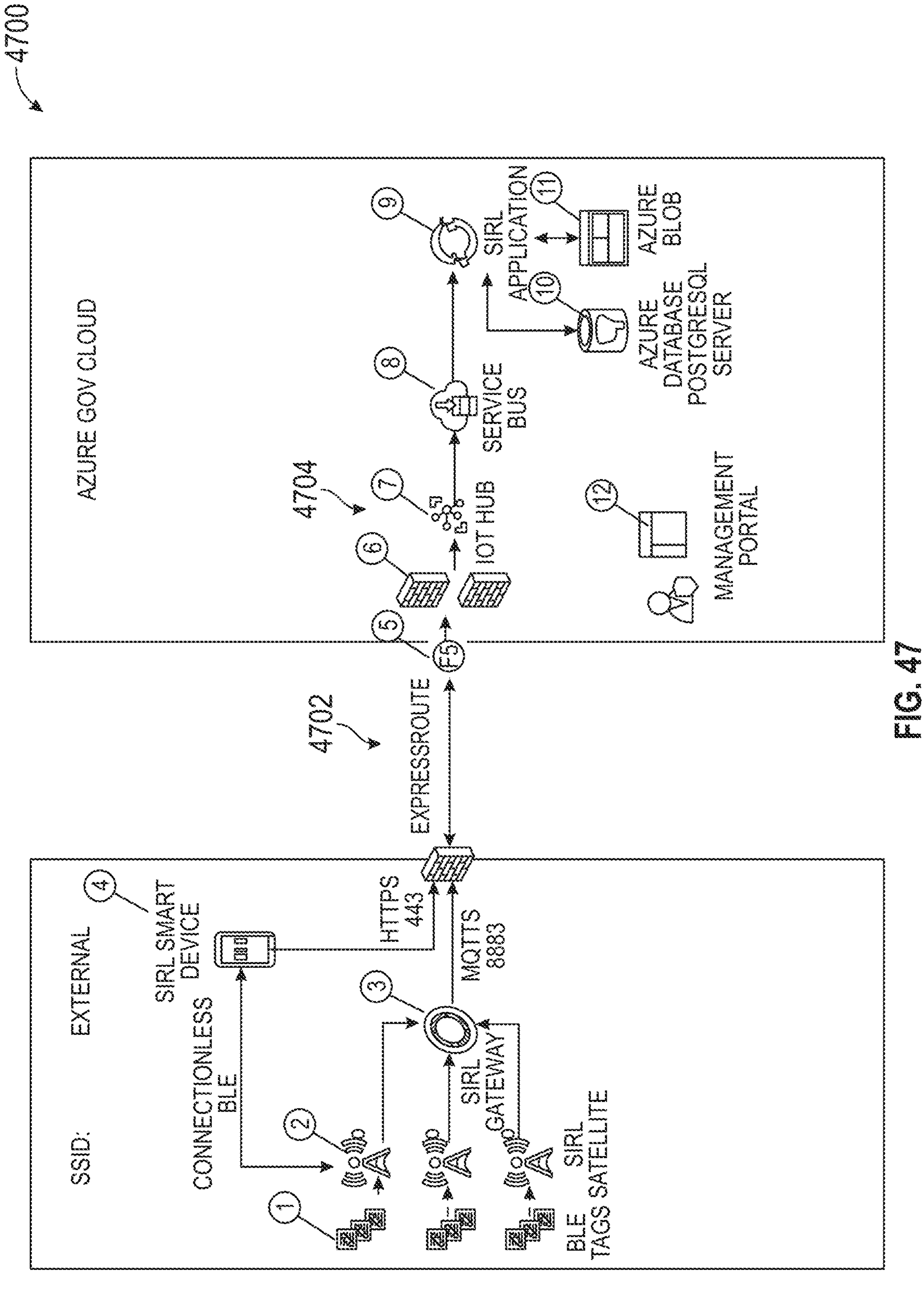
Figure 48:
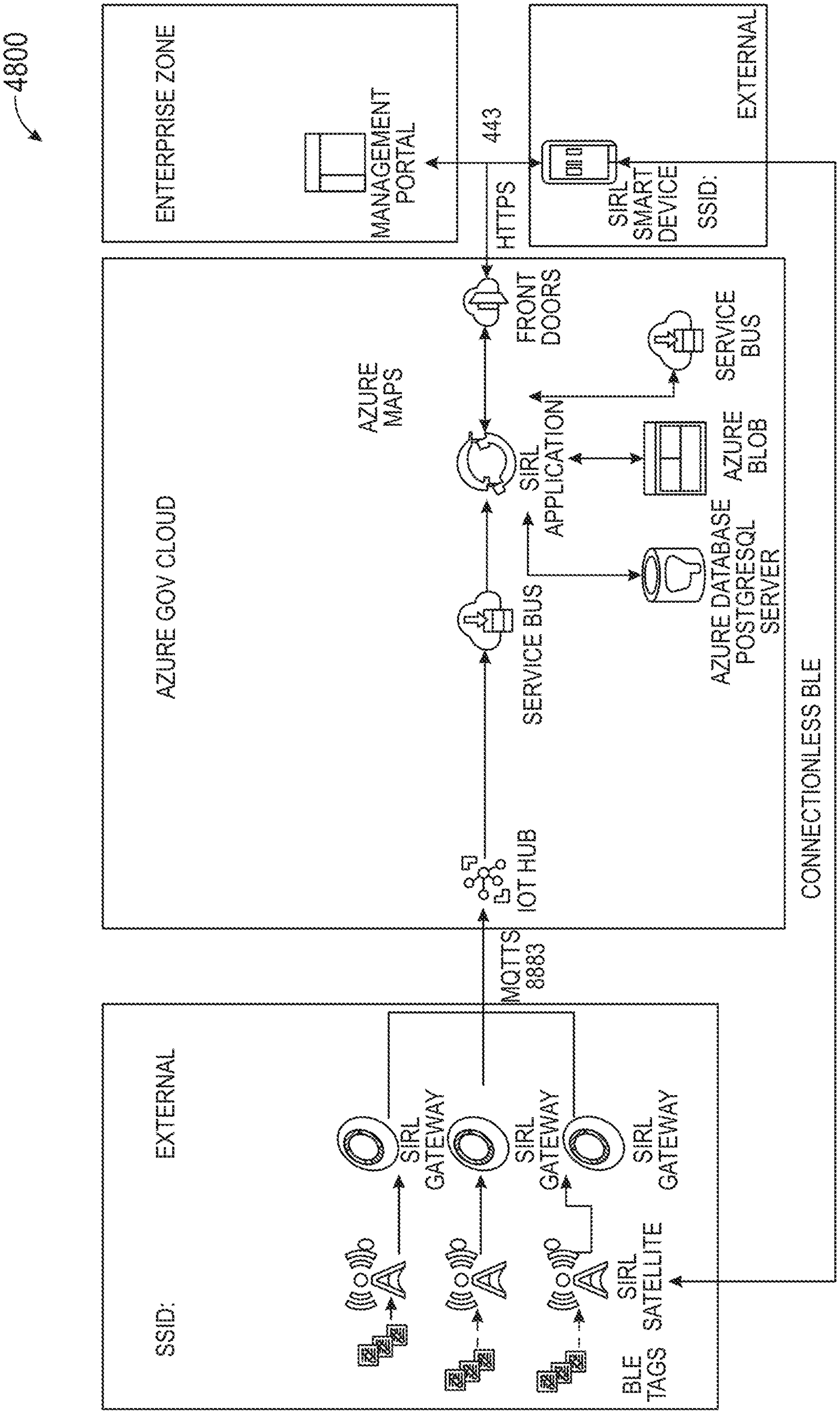
Figure 49:
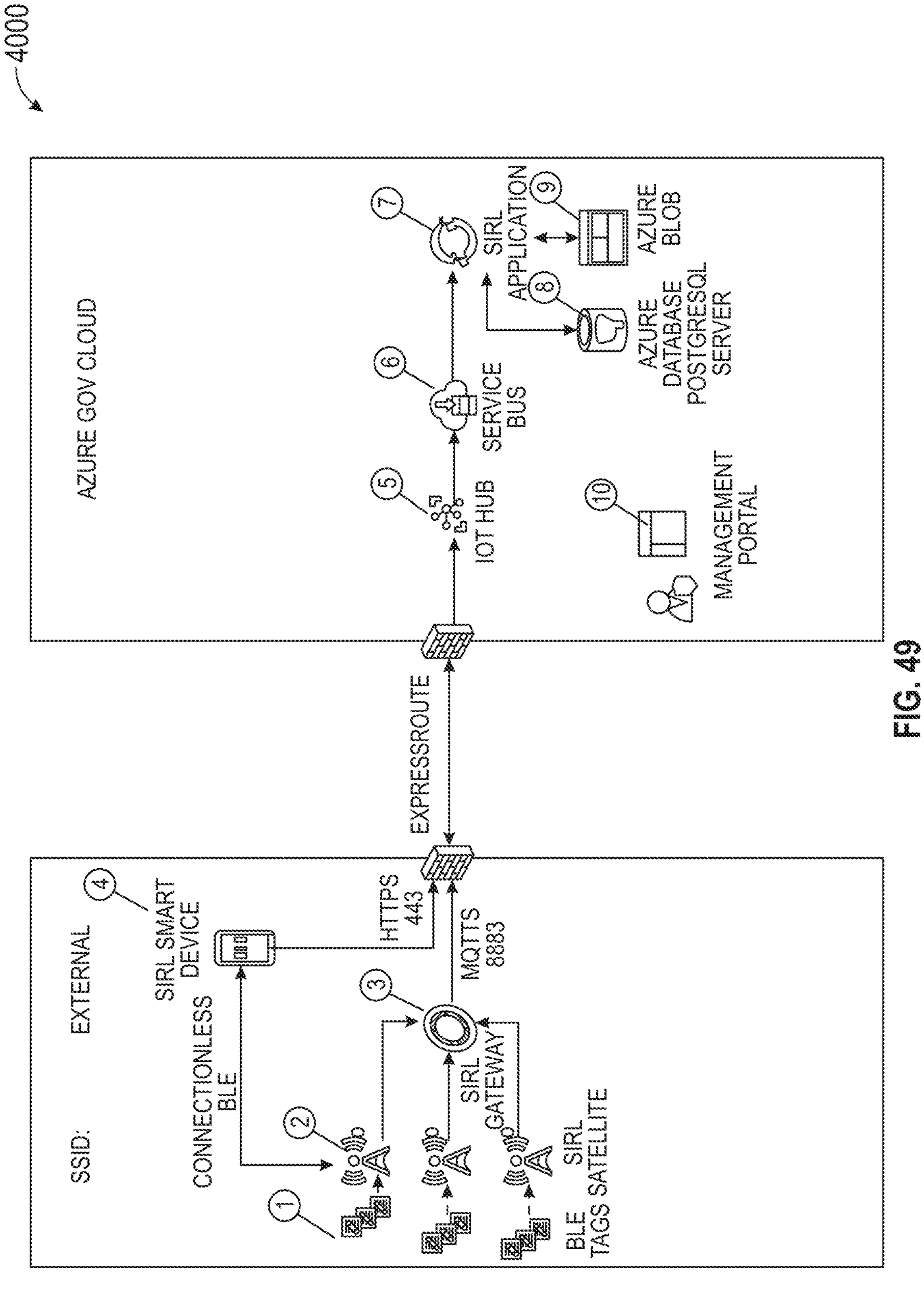
Figure 50:
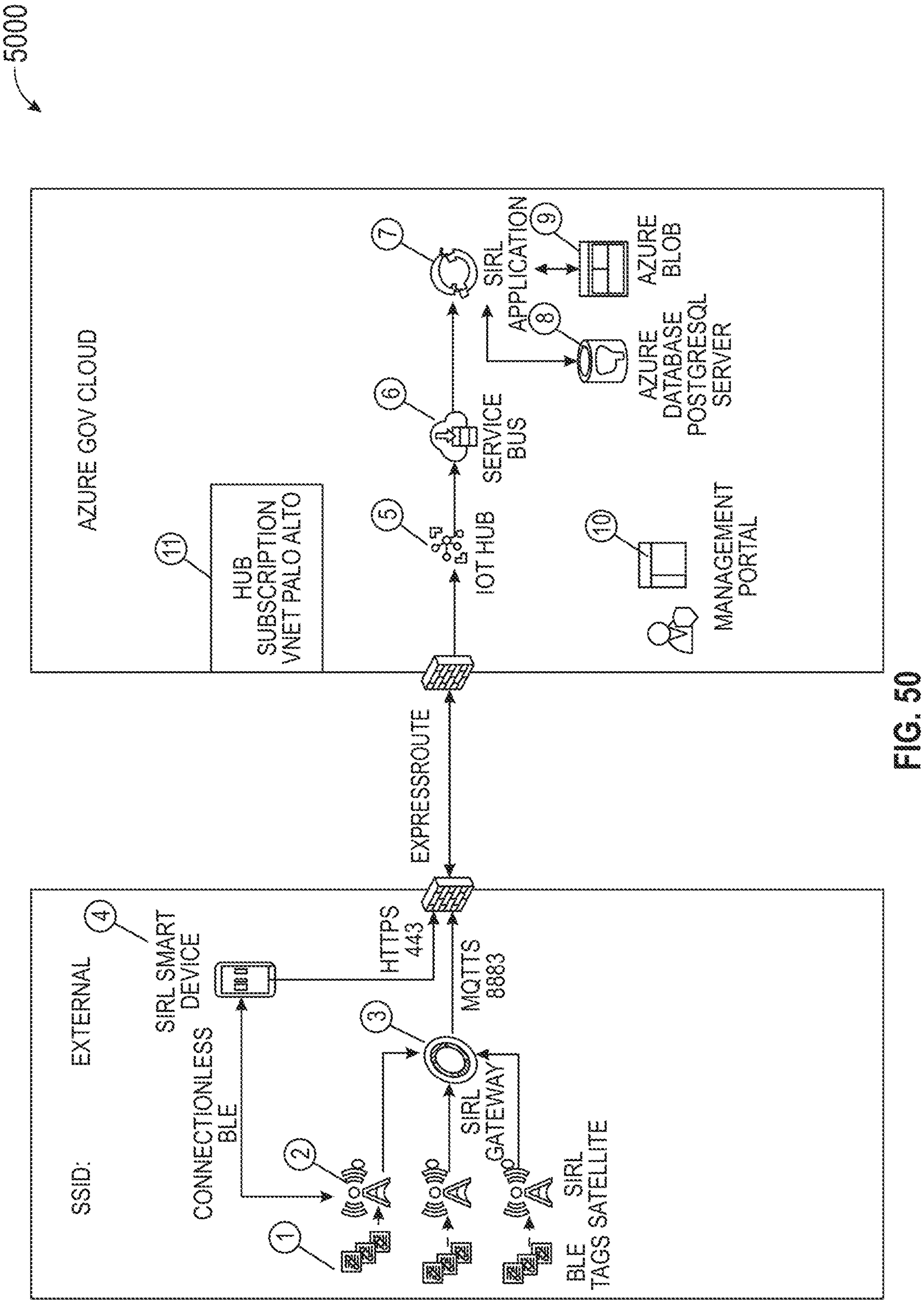
Figure 51:
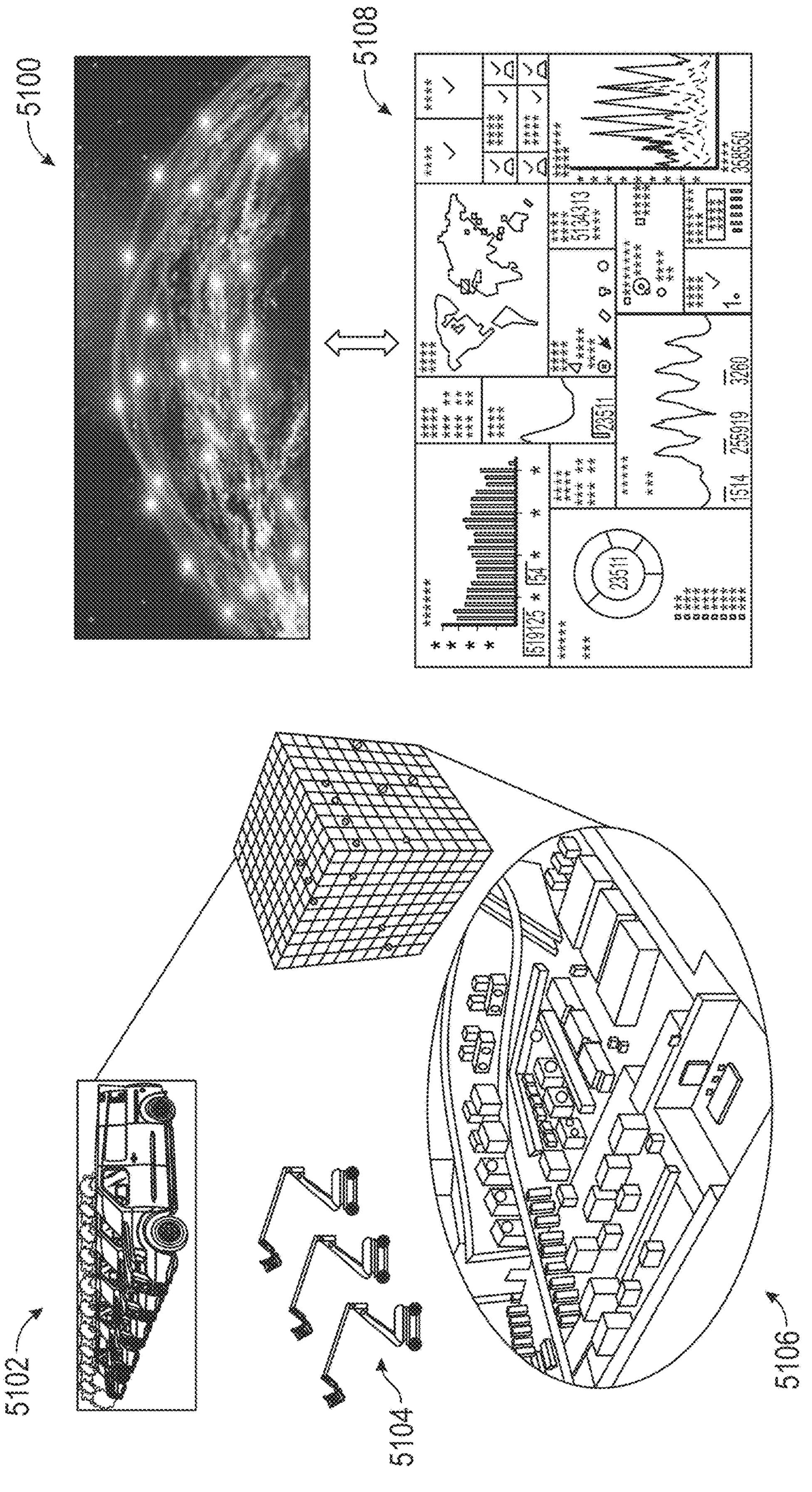
FIG. 51 is a diagram representing the features of an asset management system, according to some embodiments.

FIG. 45 shows a schematic diagram of an asset management system 4500 (e.g., similar to the asset management system 4300), according to some embodiments. FIG. 46 shows a schematic diagram of an asset management system 4600 (e.g., similar to the asset management system 4300), according to some embodiments. The system 4600 includes an additional export data storage 4602 for additional analytics and a storage directory 4604 for container images in a shared services zone 4606. FIG. 47 shows a schematic diagram of an asset management system 4700 (e.g., similar to the asset management system 4300), according to some embodiments. The system 4700 includes a load-balancing layer 4702 and a load-balanced firewall 2704. FIG. 48 shows a schematic diagram of an asset management system 4800 (e.g., similar to the asset management system 4300), according to some embodiments. FIG. 49 shows a schematic diagram of an asset management system 4900 (e.g., similar to the asset management system 4300), according to some embodiments. FIG. 50 shows a schematic diagram of an asset management system 5000 (e.g., similar to the asset management system 4300), according to some embodiments. FIG. 51 shows a diagram 5100 representing the features of an asset management system (e.g., similar to the asset management system 4300). The system 4300 may be used to track the locations of vehicles (including military vehicles 5102), work machines 5104 (e.g., forklifts, man lifts, excavators, etc.), and tracking tags 116 coupled to assets 114 on worksites (e.g., worksite 5106). The system 4300 can collect and data from multiple worksites across the globe, conduct analysis (including, e.g., algorithms, automated scripts, advanced analytics, artificial intelligence and or other techniques) on the data, and provide dashboards (e.g., dashboard 5108) providing human-readable analysis (e.g., charts, timelines, heatmaps, other visualizations, etc.) to enable improved decision support.

Figure 52:
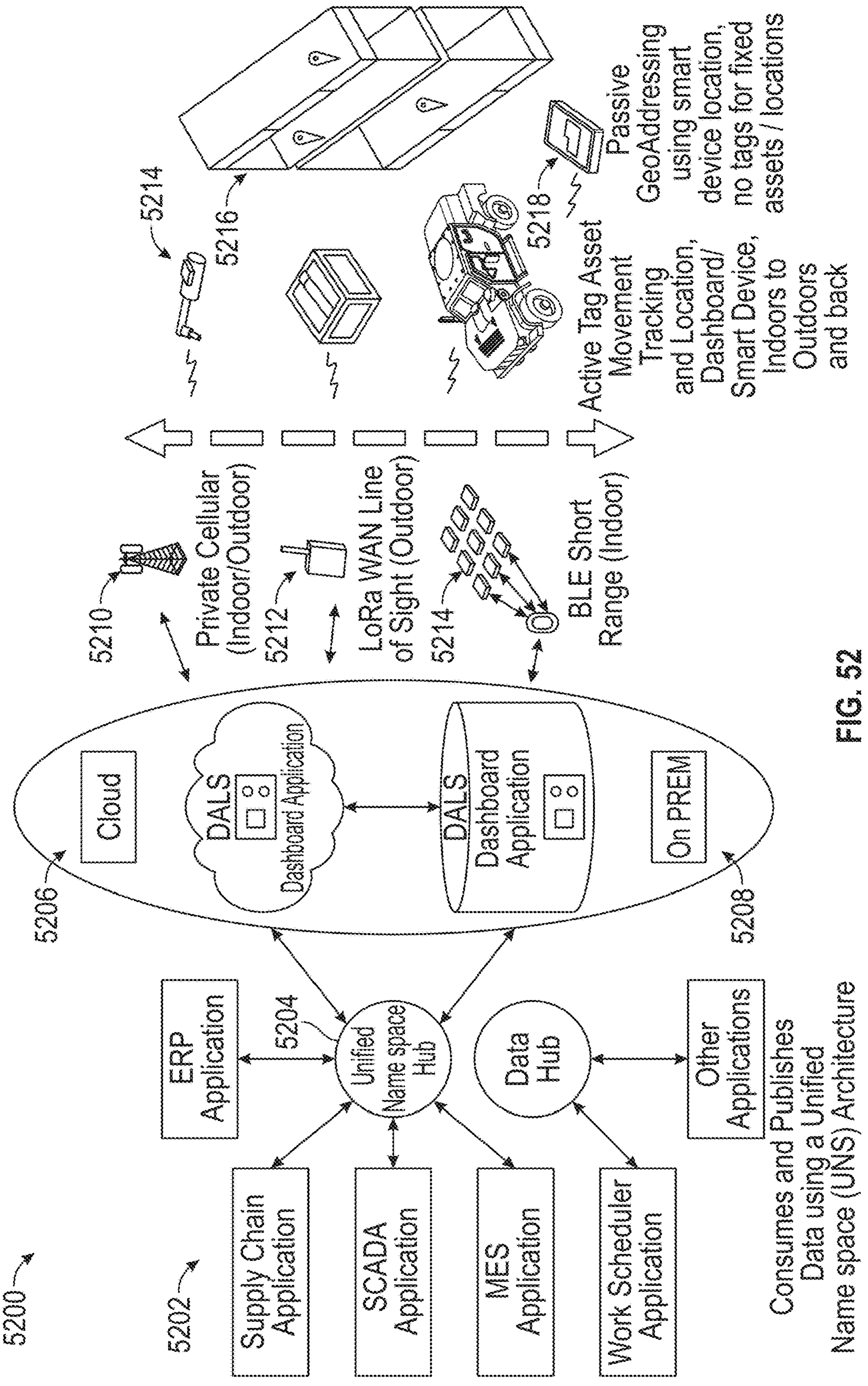
FIG. 52 is a schematic representation of an asset management system, according to some embodiments.

Referring now to FIG. 52, a schematic diagram of an asset management system 5200 is shown, according to some embodiments. The asset management system 5200 may be substantially similar to the asset management systems described above. The system 5200 may include multiple applications 5202 configured to communicate with a Unified Namespace System (UNS) 5204. The UNS 5204 is an architecture configured to receive and distribute data to and from a variety of systems and applications (e.g., applications 5202), acting as a centralized repository of asset management information. The applications 5202 may include an enterprise resource planning (ERP) application for managing various business activities such as accounting, procurement, project management, risk management and compliance, and supply chain operations. Other applications 5202 may include a dedicated supply chain application and a dedicated work scheduling application. The applications 5202 may also include a supervisory control and data acquisition (SCADA) application for gathering and analyzing real-time data to monitor and control equipment and a manufacturing execution system (MES) application for optimizing manufacturing processes by monitoring, tracking, documenting, and controlling the entire production lifecycle. Each application 5202 communicates with the UNS 5404, which receives data from each application and publishes the data for access by the other applications.

The UNS 5204 also communicates with a digital asset location system (DALS), which may include a cloud-based application 5206, a on-premises application 5208, or both. The DALS application 5206, 5208 may perform asset location tracking procedures as discussed above. For example, the DALS application 5206, 5208 may provide active asset tag tracking of assets 5214, such as tools, materials, and equipment. The DALS application 5206, 5208 may provide dashboards, including directions, instructions, and maps, to a smart device 5218. The DALS application 5206, 5208 may store and provide locations of fixed assets, such as locations on shelves 5216 where assets are to be stored and where those assets can be found later. The DALS application 5206, 5208 may communicate with the assets (e.g., via the asset tags) and/or smart devices via a cellular network 5210, via a LoRa WAN system 5212, or via a BLE connection 5214.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the local controller 130, sensors 112, gateways 202, or smart devices may be implemented in machine-readable medium for execution by various types of processors. An identified circuit of executable code may, for instance, include one or more physical or logical blocks of computer instructions, which may, for instance, be organized as an object, procedure, or function. Nevertheless, the executables of an identified circuit need not be physically located together, but may include disparate instructions stored in different locations which, when joined logically together, form the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for locating an asset on a worksite, the system comprising:

a sensor network comprising a plurality of sensors, each configured to detect radio frequency signals from assets and smart devices;

a first smart device; and at least one processor communicatively coupled to the first smart device and the sensor network and configured to:

receive, from the first smart device, a selection of a first asset;

identify a location of the first asset based on first signals emitted by the first asset;

determine the location of the first smart device based on second signals emitted by the first smart device and detected by a first subset of the plurality of sensors; and provide, to the first smart device, directions from the first smart device to the first asset.

2. The system of claim 1, wherein identifying the location of the first asset based on first signals emitted by the first asset comprises determining the location by detecting the first signals by a second subset of the plurality of sensors.

3. The system of claim 2, further comprising a radio frequency tracking tag coupled to the first asset, wherein the first signals emitted by the first asset are emitted by the radio frequency tracking tag.

4. The system of claim 2, wherein the first signals detected by the second subset of the plurality of sensors each comprise a received signal strength indicator (RSSI) and wherein determining the location of the first asset comprises performing a geometrical calculation based on a location of each of the second subset of the plurality of sensors and the RSSI detected by each of the second subset of the plurality of sensors.

5. The system of claim 1, wherein the second signals detected by the first subset of the plurality of sensors each comprise a received signal strength indicator (RSSI) and wherein determining the location of the first smart device comprises performing a geometrical calculation based on a location of each of the first subset of the plurality of sensors and the RSSI detected by each of the first subset of the plurality of sensors.

6. The system of claim 2, wherein the at least one processor is further configured to:

monitor the location of the first asset over a first time period;

train a machine-learning model based in part on the monitored location;

predict a most efficient route from the first smart device to the first asset based on the machine-learning model; and determine the directions from the first smart device to the first asset based on the predicted most efficient route.

7. The system of claim 6, further comprising a camera configured to photograph the worksite, wherein the at least one processor is configured to determine the directions from the first smart device to the first asset based in part on analyzing a photograph from the camera.

8. The system of claim 1, wherein providing the directions from the first smart device to the first asset comprises generating a graphical user interface (GUI) and providing the GUI to the first smart device.

9. The system of claim 8, wherein the GUI comprises a map of the worksite including an indicator of the location of the first asset and an indicator of the location of the first smart device.

* * * * *